(12) United States Patent
Jarkoi et al.

(10) Patent No.: US 12,323,741 B2
(45) Date of Patent: Jun. 3, 2025

(54) TECHNOLOGIES FOR UNDER VEHICLE SURVEILLANCE

(71) Applicant: Intelligent Security Systems Corporation, Woodbridge, NJ (US)

(72) Inventors: Roman Jarkoi, Sunrise, FL (US); Konstantin Chernikov, Rostov (RU); Andrey Smirnov, Pskov (RU); Alexey Anferov, Moscow (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 0 days.

(21) Appl. No.: 18/825,985

(22) Filed: Sep. 5, 2024

(65) Prior Publication Data

US 2025/0097388 A1 Mar. 20, 2025

Related U.S. Application Data

(60) Provisional application No. 63/538,685, filed on Sep. 15, 2023.

(51) Int. Cl.
*H04N 23/51* (2023.01)
*G06T 11/00* (2006.01)
(Continued)

(52) U.S. Cl.
CPC ............. *H04N 7/183* (2013.01); *G06T 11/00* (2013.01); *H04N 23/51* (2023.01); *H04N 23/52* (2023.01);
(Continued)

(58) Field of Classification Search
None
See application file for complete search history.

(56) References Cited

U.S. PATENT DOCUMENTS

| 4,225,881 | A |   | 9/1980 | Tovi |
| 5,899,416 | A | * | 5/1999 | Meister ................ B64C 21/06 244/87 |

(Continued)

FOREIGN PATENT DOCUMENTS

| CN | 103076641 | 5/2013 |
| DE | 102011003553 | 8/2012 |

(Continued)

OTHER PUBLICATIONS

International Search Report and Written Opinion of the International Searching Authority dated May 7, 2019 in corresponding International Application PCT/US2019/013907 (9 pages).

(Continued)

*Primary Examiner* — David H Chu
(74) *Attorney, Agent, or Firm* — Dentons US LLP

(57) ABSTRACT

Some disclosed technologies enable a board hosting a camera, a set of light sources, a dome, a first pair of walls spaced apart from each other, and a second pair of walls spaced apart from each other, where the dome encloses the camera, where the dome extends between the first pair of walls and the second pair of walls, where the camera images an undercarriage through the dome as the undercarriage is illuminated by the set of light sources when the undercarriage moves over the first pair of walls and the second pair of walls. However, other disclosed technologies may enable the board that may be configured differently.

30 Claims, 41 Drawing Sheets

(51) Int. Cl.
  *H04N 7/18* (2006.01)
  *H04N 23/52* (2023.01)
  *H04N 23/56* (2023.01)
  *H04N 23/61* (2023.01)
  *H04N 23/74* (2023.01)

(52) U.S. Cl.
  CPC ............ *H04N 23/56* (2023.01); *H04N 23/61* (2023.01); *H04N 23/74* (2023.01)

(56) References Cited

U.S. PATENT DOCUMENTS

| | | | |
|---|---|---|---|
| 6,525,303 B1 | 2/2003 | Gladnick | |
| 6,856,344 B2 | 2/2005 | Franz | |
| 7,029,935 B2* | 4/2006 | Negley | H01H 13/83 |
| | | | 257/E33.073 |
| 7,102,665 B1 | 9/2006 | Chandler | |
| 7,250,757 B1* | 7/2007 | Tiernan | G01N 27/9046 |
| | | | 324/228 |
| 8,067,719 B2 | 11/2011 | Herrera | |
| 8,540,383 B2 | 9/2013 | Pohlert | |
| 8,767,071 B1* | 7/2014 | Marshall | G08B 29/181 |
| | | | 320/108 |
| 8,767,075 B2 | 7/2014 | Bianco | |
| 9,033,281 B1* | 5/2015 | Adams | B64U 50/14 |
| | | | 244/190 |
| 9,648,256 B2 | 5/2017 | Ramsey | |
| 10,823,877 B2 | 11/2020 | Petruk et al. | |
| 12,043,225 B1* | 7/2024 | Jayaratne | B60S 1/54 |
| 2003/0185340 A1* | 10/2003 | Frantz | G01N 21/8806 |
| | | | 378/57 |
| 2006/0278631 A1* | 12/2006 | Lee | H05B 3/342 |
| | | | 219/544 |
| 2007/0040911 A1* | 2/2007 | Riley | H04N 7/181 |
| | | | 348/E7.086 |
| 2008/0136625 A1 | 6/2008 | Chew | |
| 2008/0239079 A1 | 10/2008 | Millar | |
| 2008/0292211 A1* | 11/2008 | Frantz | G01N 21/8806 |
| | | | 382/284 |
| 2010/0238290 A1 | 9/2010 | Riley | |
| 2011/0215699 A1 | 9/2011 | Le | |
| 2012/0170119 A1* | 7/2012 | Chu | G03B 11/00 |
| | | | 359/512 |
| 2012/0185214 A1* | 7/2012 | Icove | G01V 3/081 |
| | | | 340/657 |
| 2017/0036647 A1* | 2/2017 | Zhao | B08B 3/02 |
| 2017/0372143 A1* | 12/2017 | Barcus | G06V 20/54 |
| 2019/0235126 A1 | 8/2019 | Petruk | |
| 2019/0335119 A1* | 10/2019 | Shimizu | H04N 25/40 |
| 2019/0376196 A1* | 12/2019 | Mohri | C25B 15/02 |
| 2020/0074846 A1 | 3/2020 | York | |
| 2020/0275004 A1 | 8/2020 | Condron | |
| 2021/0041220 A1 | 2/2021 | Van Weeren | |
| 2021/0235015 A1 | 7/2021 | Hormozdyaran | |
| 2022/0250590 A1* | 8/2022 | Gimeno Ferrer | G01C 21/3476 |
| 2023/0182742 A1* | 6/2023 | Han | B60W 40/02 |
| | | | 701/23 |
| 2024/0183117 A1* | 6/2024 | Kim | E01H 10/00 |
| 2024/0369387 A1* | 11/2024 | Zhang | G01S 7/4813 |

FOREIGN PATENT DOCUMENTS

| | | |
|---|---|---|
| DE | 102012209224 | 12/2013 |
| DE | 102012211791 | 1/2014 |
| DE | 102013212495 | 12/2014 |
| EP | 1854297 | 10/2017 |
| GB | 2516321 | 1/2015 |
| WO | WO2004110054 | 12/2004 |
| WO | WO2006071198 | 7/2006 |
| WO | WO2006091874 | 8/2006 |
| WO | WO2016010441 | 1/2016 |

OTHER PUBLICATIONS

ISS, SecurOS UVSS, Data Sheet, downloaded from internet Sep. 4, 2024, https //issivs.com/securos-uvss/ (1 pages).
ISS, SecurOS UVSS, YouTube Video, The most powerful Under Vehicle Surveillance System, uploaded 4 years ago, downloaded from internet Sep. 4, 2024, https:/www.youtube.com/watch?v=hoiBT2TX0lQ (2 pages).
ISS, SecurOS UVSS, Webpage, Under Vehicle Surveillance System, downloaded from Internet Sep. 4, 2024, https://issivs.com/securos-uvss (7 pages).
International Search Report and Written Opinion of the International Searching Authority dated Feb. 13, 2025 in corresponding International Application PCT/US2024/045352 (17 pages).

* cited by examiner

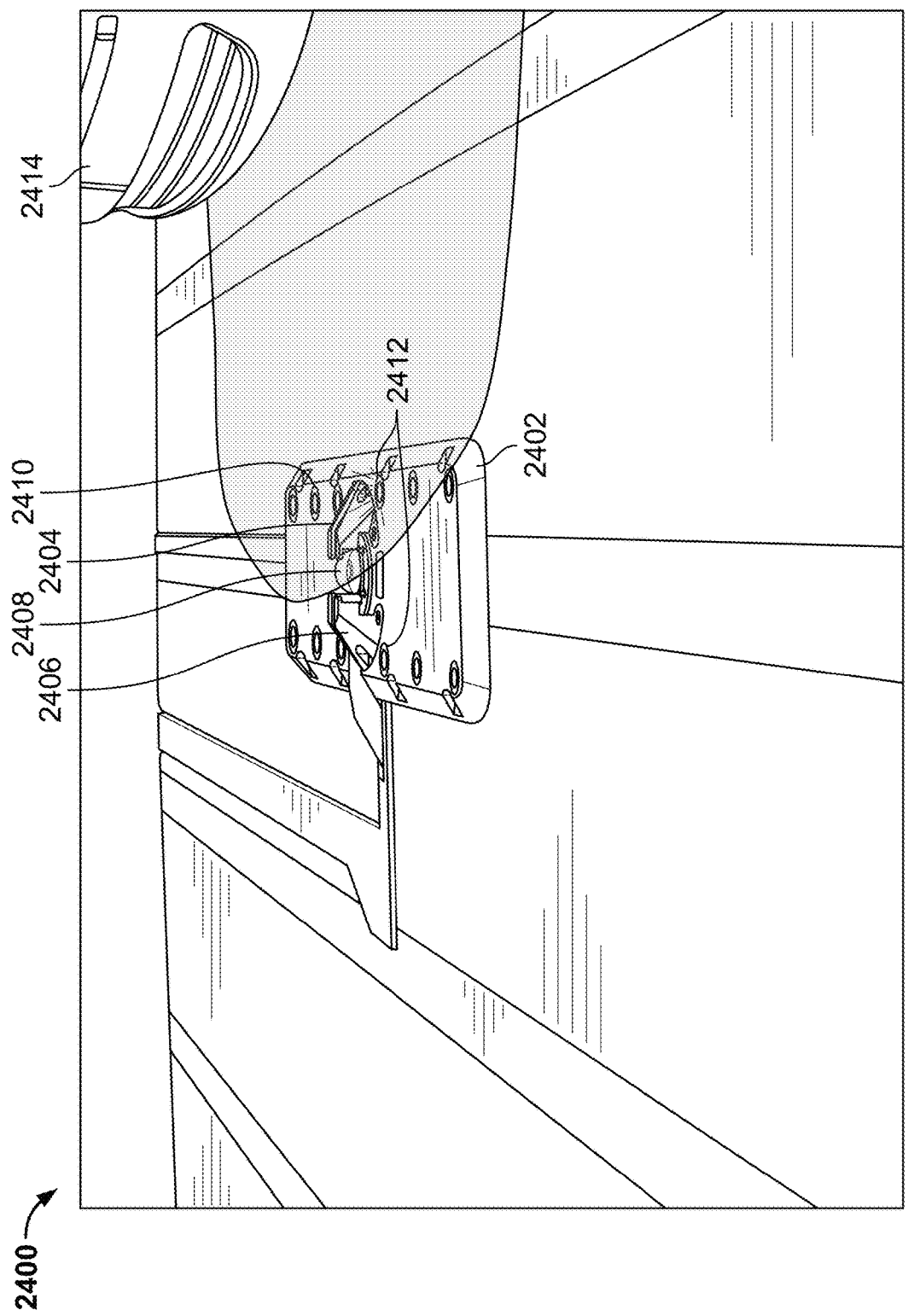

TECHNOLOGIES FOR UNDER VEHICLE SURVEILLANCE

CROSS-REFERENCE TO RELATED PATENT APPLICATION

This patent application claims a benefit of priority to U.S. Provisional Patent Application 63/538,685 filed 15 Sep. 2023; which is incorporated by reference herein for all purposes.

TECHNICAL FIELD

This disclosure relates to under vehicle surveillance.

BACKGROUND

An undercarriage of a vehicle, such as a car, a bus, a trailer, or a truck, is often used to smuggle drugs, explosives, stolen goods, weapons, people, or other forms of contraband. As such, an inspection station can be built to monitor the undercarriage in order to minimize smuggling of such items. For example, the inspection station can employ an inspector that operates a mirror mounted onto an end of a stick such that the mirror is positioned underneath the undercarriage and the inspector can visually inspect the undercarriage through the mirror, without having to kneel down or crawl under the vehicle. However, this approach is technologically problematic for several reasons. First, the inspector is placed in a physical danger, i.e., close proximity to potentially harmful substances, such as explosives, caustic chemicals, or others. Second, the inspector generally spends a considerable amount of time inspecting the undercarriage, which often leads to traffic congestion, especially in places where such congestion is not desired at least for security purposes. Third, the inspector may not be optimally focused or sufficiently motivated on thoroughly inspecting the undercarriage, such as via being tired, cold, hot, rushed, distracted, or others, which may cause the inspector to miss an important detail during inspection, thereby limiting the inspector's reliability.

In light of such concerns with manual inspection of the undercarriage, the inspection station may employ, whether overtly or covertly, an automatic system of inspecting the undercarriage. For example, one such system employs a line-scan camera that is stationary. The line-scan camera captures an image of a portion of the undercarriage, as the vehicle is driven over the line-scan camera, and sends the image to a workstation operated by an inspector for a manual analysis of the image. However, this technique is technologically problematic for various reasons. First, the inspector generally spends a considerable amount of time reviewing the image, which often leads to traffic congestion, especially in places where such congestion is not desired at least for security purposes. Second, the inspector may not be optimally focused or sufficiently motivated on thoroughly reviewing the image, such as via being tired, cold, hot, rushed, distracted, or others, which may cause the inspector to miss an important detail in the image, thereby limiting the inspector's reliability. Third, the image is often of poor quality, such as blurry or stretched, as the vehicle can drive over the line-scan camera at inconsistent speeds or impart a significant mechanical vibration to the line-scan camera, as the vehicle approaches or passes over the line-scan camera. Fourth, the line-scan camera is not capable of selectively focusing on a suspicious area of the undercarriage or adjusting an imaging view around a difficult angle. As such, the line-scan camera is unable to inspect various undercarriage areas, such as a wheel well, which are often used for covertly stowing drugs, explosives, stolen goods, and other forms of contraband. Fifth, when no vehicle is present above the line-scan camera, then the line-scan camera is idle, which is inefficient.

Another automatic system of inspecting the undercarriage involves an unmanned ground vehicle (UGV) equipped with a camera, where the UGV moves underneath the vehicle to image the undercarriage, and send such imagery to a workstation operated by an inspector for a manual review of the imagery. However, this technique is also technologically problematic for various reasons. First, the inspector generally spends a considerable amount of time reviewing the image, which often leads to traffic congestion, especially in places where such congestion is not desired at least for security purposes. Second, the inspector may not be optimally focused or sufficiently motivated on thoroughly reviewing the image, such as via being tired, cold, hot, rushed, distracted, or others, which may cause the inspector to miss an important detail in the image, thereby limiting the inspector's reliability. Third, the UGV can provide the inspector with a poor and inconsistent image quality due to frequent image transmission failures, such as due to signal interference, or image blur or jitter, such as due to various movements of the UGV. Fourth, since the UGV has a fixed size, the UGV is unable to effectively adapt to various undercarriage height clearances. Fifth, the UGV is not able to effectively travel along irregular surfaces, such as mud, gravel, or sand. Sixth, the UGV is programmed to operate randomly, as the UGV moves around selected areas of the undercarriage, rather than uniformly imaging the undercarriage, especially longitudinally, which leads to incomplete imaging of the undercarriage. Seventh, the UGV is not able to effectively image certain areas of the undercarriage, such as a wheel well, which are often used for covertly stowing drugs, explosives, stolen goods, and other forms of contraband. Sixth, when the UGV is not used, the UGV is idle, which is inefficient.

Furthermore, the automatic system of inspecting the undercarriage, whether stationary, as the line-scan camera, or mobile, such as the UGV, is often adversely affected by environmental conditions, such as debris or changing weather, or an inability maintain a precise spatial relationship with the undercarriage. For example, the environmental conditions may involve various ambient substances, such as dirt, snow, ice, or mud, that come in contact with various components of the automatic system, thereby impeding its ability operate as designed. Likewise, the environmental conditions may involve hot or cold temperatures that can cause various sensitive components, such as digital image sensors, to perform sub-optimally. Similarly, the inability to maintain and track the precise spatial relationship with the undercarriage can be based on the vehicle's inconsistent speed, direction, elevation, orientation, or others, and may become even more pronounced with the UGV since the UGV may be unable to precisely track its own position, due to movement on regular or irregular surfaces. Therefore, such state of being makes the automatic system becomes even more costly to operate and maintain in order to ensure its reliability.

Although some inspection stations may exist to address some technological problems mentioned above, those inspection stations are still technologically problematic for various reasons. First, some of those inspection stations employ a stem, where a road surface may need to be modified (e.g., bored, drilled, dug, milled, deepened) for hosting the stem, which may be time-consuming, laborious, or unjustified for temporary use. Second, some of those inspection stations may employ a structure to protect a camera, where the structure may be exposed to a horizontal load (e.g., a rotary brush of a street sweeper, a snowplow of a vehicle), which may damage the structure. Third, some of these inspection stations may have a plastic dome to protect the camera, where the plastic dome may be prone to scratches, cracks, holes, or other forms of wear and tear, whether vehicular or weather-based. Fourth, some of these inspection stations may not catch contraband that is visually camouflaged on or in the undercarriage. Fifth, some of these inspection stations may variably illuminate the undercarriage, which may cause under-illumination or over-illumination of the undercarriage that interferes with imaging or image processing, especially when the undercarriage may vary in size or shape. Sixth, some of these inspection stations may involve the plastic dome that may be covered in rain, snow, or ice, which may interfere with imaging or image processing. Seventh, some of these inspection stations may involve a board over which the undercarriage moves, which may be covered in rain, snow, or ice, which may interfere with operation of an internal component (e.g., the camera), imaging or image processing, or traction of a vehicle hosting the undercarriage moving on the board. Eighth, some of these inspection stations may involve the plastic dome that may be covered with rain, snow, ice, sand, mud, dust, leaves, branches, or other natural debris, which may interfere with imaging or image processing.

SUMMARY

Broadly, this disclosure enables various technologies that at least partially address various technological problems identified above. For example, some of those technologies enable a board hosting a camera, a set of light sources, a dome, a first pair of walls spaced apart from each other, and a second pair of walls spaced apart from each other, where the dome encloses the camera, where the dome extends between the first pair of walls and the second pair of walls, where the camera images an undercarriage through the dome as the undercarriage is illuminated by the set of light sources when the undercarriage moves over the first pair of walls and the second pair of walls. However, other technologies may enable the board that may be configured differently. For example, some of those technologies may enable a board having a configuration, as disclosed herein. For example, some of these technologies may enable a processing unit (e.g., a processor) programmed to perform a set of actions, as disclosed herein, or a non-transitory storage medium storing a set of instructions for execution by a processing unit to enable a performance of a set of actions, as disclosed herein.

DESCRIPTION OF DRAWINGS

FIGS. 24A to 24F show an embodiment of a board illuminating an underside of a vehicle according to this disclosure.

DETAILED DESCRIPTION

Figure 1:
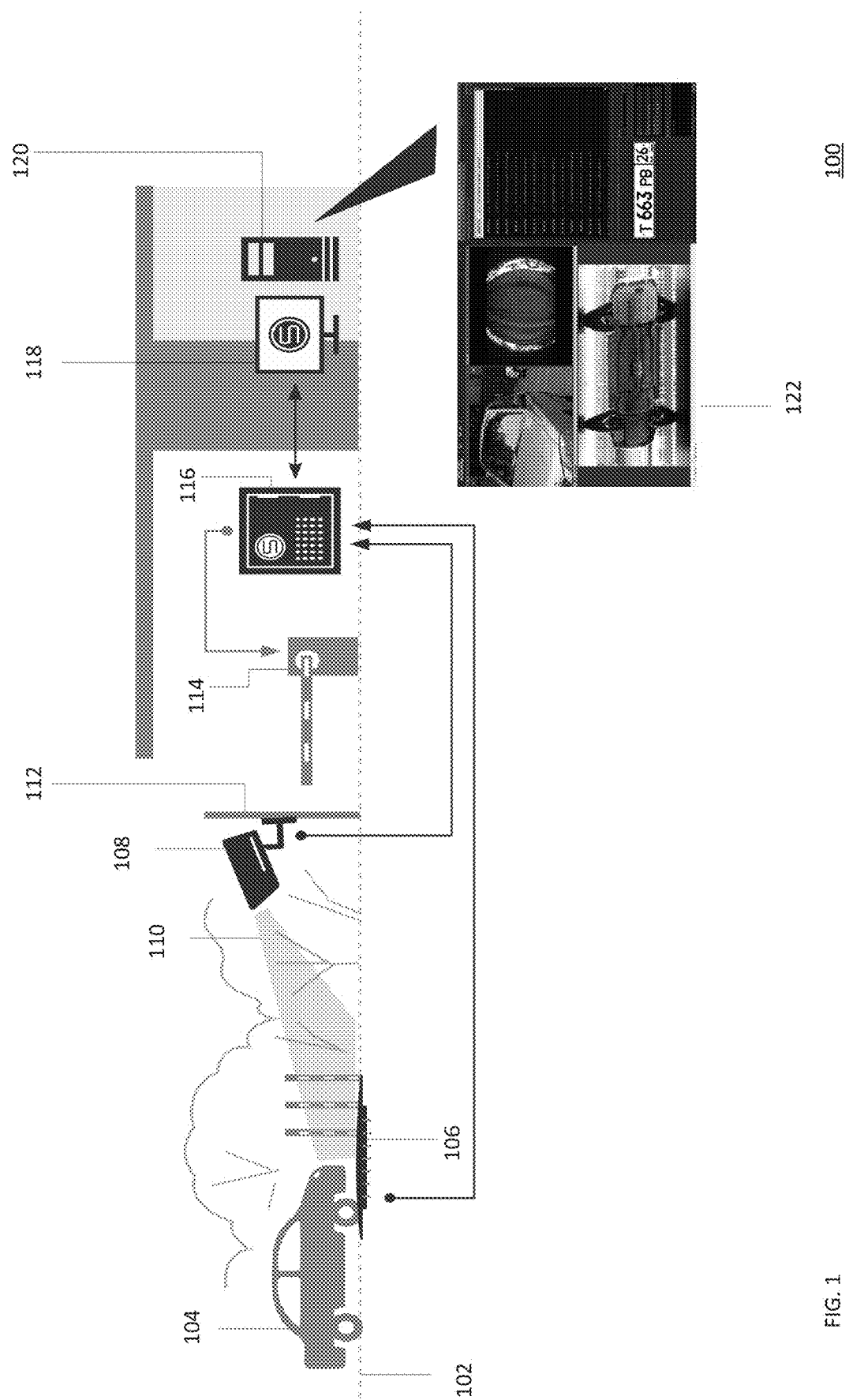
FIG. 1 shows a schematic diagram of an embodiment of an under vehicle surveillance system according to this disclosure.

This disclosure is now described more fully with reference to drawings, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms (e.g., two, three, four, five, six, seven, eight, nine, ten, tens) as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

FIG. 1 shows a schematic diagram of an embodiment of an under vehicle surveillance system (UVSS) according to this disclosure. In particular, an under vehicle surveillance system 100 includes a surface 102, a vehicle 104, a board 106, a camera 108 having a field of vision 110, a wall 112, a gate 114, a server 116, a display 118, a workstation 120, and a graphical user interface (GUI) 122. As such, the under vehicle surveillance system 100 can function as a checkpoint before an entry or an exit of the vehicle 104 into an area, such as a parking lot, a street, or others.

The surface 102 can be of any type, whether regular or irregular, whether smooth or rough, whether extending along a horizontal, vertical, or diagonal plane, whether in a rectilinear, sinusoidal, or arcuate manner, or others. For example, the surface 102 can include asphalt, concrete, pavers, mud, gravel, sand, wood, rubber, metal, plastic, ice, snow, or others. For example, the surface 102 can include a road, a highway, a parkway, a street, a runway, a lot, or others. The surface 102 can be at a ground, below ground, or above ground level. For example, the surface 102 can be exposed to ambient surroundings or covered, such as via a dome, a bridge, a tunnel, a garage, or others. The surface 102 can be heated or be weatherproof. Note that the surface 102 can mobile, such as a moving platform, a conveyor, a truck, a railcar, a trailer, a helicopter, an airplane, a boat, a ferry, or others. For example, the surface 102 can be within a transport vehicle, whether land, marine, or aerial, whether manned or unmanned.

The vehicle 104 can be of any type, whether land, marine, or aerial, whether manned or unmanned, whether wheeled, tracked, or railed, whether for personal, commercial, industrial, governmental, military, or any other use. For example, the vehicle 104 can include a car, a bus, a truck, a van, a jeep, a tank, a tractor, a trailer, a towed transport, a bulldozer, a locomotive, a railcar, a buggy, a rickshaw, a wagon, a trolley, a tram, a funicular, a golf cart, a motorcycle, a skateboard, a carriage, a stroller, a snowboard, a bicycle, a boat, a ship, a submarine, an airplane, a helicopter, a drone, a suitcase, a bed, a wheelchair, a gurney, or any other apparatus or machine that can transport a person or a cargo. For example, the vehicle 104 can include an ambulance or a fire truck. The vehicle 104 includes an undercarriage, which includes at least a portion of an underside of the vehicle 104. For example, the undercarriage can include a chassis, a wheel well, a muffler, a chain, a belt, a transmission, a depression, a projection, or others.

The board 106 is stationed on, below, or above the surface 102 or secured on or to the surface 102 or earth/dirt/soil/rocks or a structural framework on, below, or above the surface 102, such as via fastening, mating, interlocking, adhering, anchoring, staking, chaining, or others. For example, the board 106 can be bolted through the surface 102 into a soil underneath the surface 102 such that the board 106 is staked and anchored thereby. For example, the board 106 can be flush with the surface 102 or non-flush with the surface 102, whether raised or dropped.

The board 106 is solid, rigid, and rectangularly shaped. However, such structure can vary where the board 106 can be perforated or meshed or latticed, flexible, or shaped as a square, a circle, an oval, a triangle, a trapezoid, a pentagon, a heptagon, an octagon, a disc, a ring, a U-portion, a J-portion, a W portion, an M portion, a D portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others, whether open or closed shape, whether having a uniform or varying length, width, or height along a horizontal, vertical, or diagonal plane. The board 106 can include a depression or a projection. The board 106 can include metal, plastic, rubber, wood, or others. The board 106 can be weatherproof. Accordingly, the board 106 is configured such that the vehicle 104 can travel on or over or rest on or over the board 106.

The board 106 is configured to output a light and capture an image of the undercarriage of the vehicle 104 based on the light, such as via a reflection of the light off the undercarriage of the vehicle 104, as the vehicle 104 approaches the board 106 or moves over the board 106 or passes the board 106 or rests on the board 106, as further disclosed below. The board 106 is positioned such that the board 106 longitudinally extends along a width of the vehicle 104. For example, the board 106 may have a major side extending along the width of the vehicle 104. However, this positioning can vary where the board 106 is positioned such that the board 106 longitudinally extends along a length of the vehicle 104 or such that the board 106 longitudinally extends along a diagonal of the vehicle 104. For example, the board 106 can be positioned traverse to the longitude of the vehicle 104. The board 106 is powered via a mains electricity source, such as via a power cable or a data cable. Note that the board 106 can be powered via at least one of an onboard rechargeable battery, such as a lithium-ion battery, which may be charged via an onboard renewable energy source, such as a photovoltaic cell, a wind turbine, or a hydropower turbine. Note that the board 106 can host a sensor configured to sense at least one of a presence or an absence of the vehicle 104 in operational proximity thereof, which can be within operational proximity of the camera 108. For example, the sensor can be an optical sensor, a ultrasonic sensor, an ultrasound sensor, a laser sensor, a radar, a lidar, a heat sensor, an actuator, a mechanical linkage, a load cell, a pressure sensor, a ferromagnetic sensor, or others. For example, the sensor can be coupled to the board 106 via fastening, mating, interlocking, adhering, or others. In some embodiments, the sensor can be an all-weather sensor. Note that the sensor can be hosted via the surface 102 or the wall 112.

The camera 108 has the field of vision 110. The camera 108 includes an optical instrument for capturing and recording images from the field of vision 108, and the images may be stored locally, transmitted to another location, or others. The images may be individual still photographs or sequences of images constituting videos. The images can be analog or digital, whether color or grayscale. For example, the camera 108 can be a pan-tilt-zoom (PTZ) camera, which may be a virtual PTZ camera, an infrared camera, a non-line-scan camera, or others. The camera 108 can comprise any type of lens, such as convex, concave, wide-angle, fisheye, or others. The camera 108 can comprise any focal length, such as wide angle or standard. The camera 108 can be stationary or movable. The camera 108 is powered via a mains electricity source, such as via a power cable or a data cable. Note that the camera 108 can be powered via at least one of an onboard rechargeable battery, such as a lithium-ion battery, which may be charged via an onboard renewable energy source, such as a photovoltaic cell, a wind turbine, or a hydropower turbine. The camera 108 can be configured for geo-tagging, such as via modifying an image file with a set of geolocation or coordinates data. The camera 108 can include or be coupled to a microphone. The camera 108 can be configured for a name-stamping, date-stamping, or time-stamping the image, such as what date or time the image was captured or naming the image with a naming convention, as pre-programmed in advance. The camera 108 can comprise a flash illumination output device or another artificial illumination output device. Note that the camera 108 can comprise an infrared illumination output device. The camera 108 is positioned such that the field of vision 110 captures an identifier of the vehicle 104, such as a vehicle registration plate or others, such as a license plate or others. For example, when the vehicle 104 includes a cabin and hosts the identifier on or in the cabin, then the camera 108 can be oriented towards the area. Note that in poor illumination conditions, such as darkness, the flash illumination output device can output a light to assist the camera 108. Note that the identifier can be captured non-optically, such as via a radio frequency interrogation, an acoustic identification, a thermal signature, a weight value, or others. As such, in these embodiments, a suitable sensor can be used, whether additional or alternative to the camera 108. The camera 108 can be weatherproof. Note that the system 100 can be configured for a bilateral operation mode (entry and exit). As such, the system 100 can include another camera 108 that is in communication with the server 116 in order to capture the identifier from a front or back portion of the vehicle 104. Note that the cameras 108 can be identical to or different from each other in structure or mode of capture. Note that the system 100 can include a camera configured to provide a surveillance overview of the system 100 or a locale in which the system 100 is installed. For example, such camera can be configured as the camera 108, whether in structure or mode of capture, and can be in communication with the server 116, similar to the camera 108.

The wall 112 hosts the camera 108, such as via fastening, mating, interlocking, adhering, or other securing techniques. For example, the wall 112 can include a post or a column. Although the wall 112 extends vertically with respect to the surface 102, the wall 112 can extend horizontally or diagonally with respect to the surface 102. The wall 102 can include metal, plastic, wood, rubber, concrete, bricks, leather, siding, drywall, or others. The wall 112 can be a part of another structure, whether stationary or mobile, such as a building or a vehicle, or stand by itself, such as a post. The wall 112 can be weatherproof.

The gate 114 includes an entrance or exit gate that can be opened or closed via a power mechanism, which can be electric, such as a motor, an actuator, or others. However, note that the power mechanism can include a hydraulic system, a pneumatic system, or others. For example, the gate 114 is powered via a mains electricity source, such as via a power cable or a data cable. Note that the gate 114 can be powered via at least one of an onboard rechargeable battery, such as a lithium-ion battery, which may be charged via an onboard renewable energy source, such as a photovoltaic cell, a wind turbine, or a hydropower turbine. The gate 114 can include a swing gate, whether articulated, underground, or sliding. The gate 114 can be weatherproof.

The server 116 includes a processor and a memory coupled to the processor. For example, the processor can be a single core, a multi core, or others. For example, the memory can include a mechanical memory, an electronic memory, or others. For example, the memory can include a semiconductor memory, such as a flash memory or others. The memory stores a set of instructions that are executable by the processor for performance of various operations, as further disclosed below. The server 116 is in communication with the board 106, the camera 108, the gate 114, and the workstation 120. Such communication can be wired, wireless, or waveguide based. For example, such communication can be over a network, which can include a plurality of nodes that allow for sharing of resources or information. For example, the network 102 can be a local area network (LAN), a wide area network (WAN), a cellular network, or others. The server 116 is powered via a mains electricity source, such as via a power cable or a data cable.

The server 116 can run an operating system, which can be embedded, such as Windows®, or others, and an application, such as a video analytics application, on the operating system. The server 116 can include or be coupled to an input device, such as a mouse, a keyboard, a camera, whether forward-facing or back-facing, an accelerometer, a touchscreen, a biometric reader, a clicker, a microphone, or any other suitable input device. The server 116 can include or be coupled to, an output device, such as a display, a speaker, a headphone, a printer, or any other suitable output device. Note that the input device and the output device can be embodied in one unit, such as a touch-enabled display, which can be haptic. Note that the server 116 can host a database which includes a data structure suitable for storing a set of data of any format, such as images, sounds, text, or others. For example, the database can be a relational database, an in-memory database, a NoSQL database, a graphical database, or others, which can store data, such as in a record field, and allow access to such data, whether in a raw state, a formatted state, an organized stated, or any other accessible state. For example, such data can include an image file, a sound file, a text file, an alphanumeric text string, or any other data. The database is configured for various data Input/Output (I/O) operations, including reading, writing, editing, modifying, deleting, updating, searching, selecting, merging, sorting, encrypting/decrypting, de-duplicating, or others.

The workstation 120 is operably coupled, whether wired, wireless, or waveguide, to the display 118, which can be touch-enabled or haptic. The workstation 120 runs an operating system, such as Windows®, or others, and an application, such as an administrator application, on the operating system. For example, the workstation 120 can be embodied as a terminal, a kiosk, a laptop, a tablet, a smartphone, a vehicle, whether manned or unmanned, whether land, aerial, or marine, or others. The workstation 120 can include or be coupled to an input device, such as a mouse, a keyboard, a camera, whether forward-facing or back-facing, an accelerometer, a biometric reader, a clicker, a microphone, or any other suitable input device. The workstation 120 can include or be coupled to an output device, such as a speaker, a headphone, a printer, or any other suitable output device. Note that the input device and the output device can be embodied in one unit, such as a touch-enabled display, which can be haptic. As such, the application presents the GUI 122 depicting a page, where the page can include a visual element, such as a menu, enabling a control of an aspect of the system 100, such as any hardware, software, or any other logic or functionality. For example, the workstation 120 can be configured to control at least one of the board 106, the camera 108, the gate 114, the server 116. As shown in FIG. 1, the GUI 122 concurrently depicts the vehicle 104, the identifier of the vehicle 104, an image of a portion of the undercarriage of the vehicle 104, an image of the undercarriage of the vehicle 104, and a menu.

In one mode of operation, the server 116 receives a first imagery (e.g., a photo, a video) of the undercarriage of the vehicle 104 from the board 106 and a second imagery (e.g., a photo, a video) of the identifier of the vehicle 104 from the camera 108. The server 116 dewarps the first imagery, if necessary, and stitches the first imagery such that a first image (e.g., a composite image) is formed. The server 116 extracts a set of symbols (e.g., depicted on a license plate) corresponding to the identifier from the second imagery. The server 116 stores the first image and the set of symbols in a database such that the first image is retrievable based on the set of symbols. As such, the first image functions as a template or reference image for the identifier. Subsequently, when the vehicle 104 again approaches the board 106, the server 116 receives a third imagery (e.g., a photo, a video) of the undercarriage of the vehicle 104 from the board 106 and a fourth imagery (e.g., a photo, a video) of the identifier of the vehicle 104 from the camera 108. The server 116 dewarps the third imagery, if necessary, and stitches the third imagery such that a second image (e.g., a composite image) is formed. The server 116 extracts the set of symbols corresponding to the identifier from the fourth imagery. The server 116 retrieves the first image from the database based on the set of symbols, as currently extracted and previously matched to the set of symbols stored in the database. The server 116 compares the second image against the first image and identifies a difference, such as a structural change or a color change, between the second image and the first image, if any. The server 116 takes an action or avoids taking the action if the difference exists or does not exist. For example, the server 116 can request the display 118 to present the second image via the GUI 112 such that the second image is augmented, such with the difference being marked (e.g., via a bounding box). Likewise, the server 116 can take an action or avoid taking the action if the difference does not exist or does exist. For example, the server 116 can request a motor, a pump, or an actuator to activate responsive to no substantial difference (e.g. at least about 51, 55, 60, 65, 70, 75, 80, 85, 90, or 95 percent similar or identical in pixel coloration or patterns) between the second image and the first image being determined, whether via an operator of the workstation 120 or via the server 116, such as based on a set of criteria or thresholds, as preprogrammed in advance. For example, the gate 114 can include the motor, the pump, or the actuator and thereby be opened such that the vehicle 104 can move past the gate.

Figure 2:
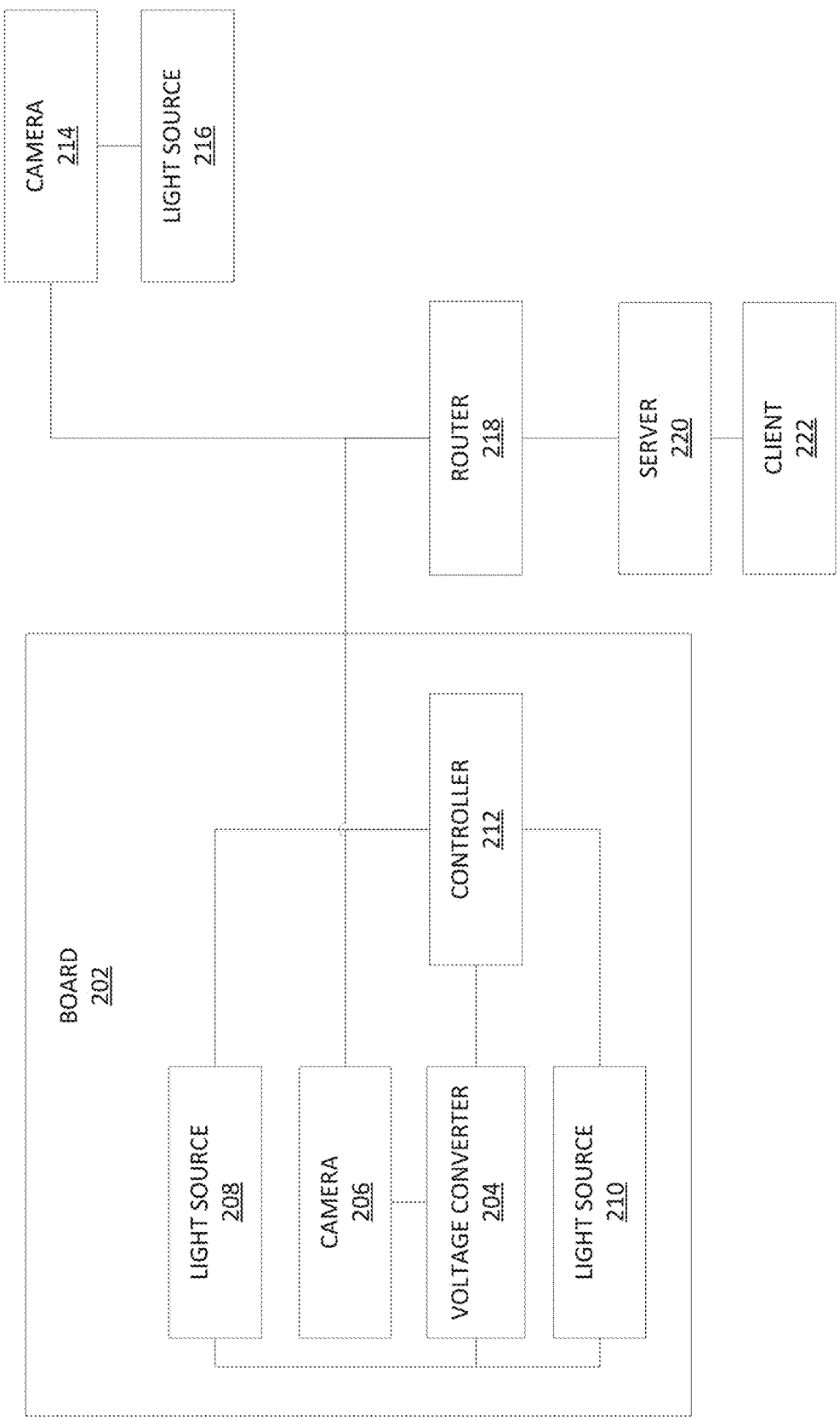
FIG. 2 shows a logical diagram of an embodiment of an under vehicle surveillance system according to this disclosure.

FIG. 2 shows a logical diagram of an embodiment of an under vehicle surveillance system according to this disclosure. In particular, a system 200 includes a board 202, a camera 214, a light source 216, a router 218, a server 220, and a client 222. The board 202 includes a voltage converter 204, a camera 206, a plurality of light sources 208, 210, and a controller 212. The voltage converter 204 is in communication with an electrical power source, whether hosted via the board 202 or off the board 202. For example, the electrical power source can include a mains electricity source, such as a power line. For example, the electrical power source can include a battery, which can be rechargeable. The voltage converter 204 is in communication with the controller 212, the camera 206, and the light sources 208, 210, whether such communication is wired, wireless, or waveguide based. The controller 212 is in communication the light sources 208, 210, whether such communication is wired, wireless, or waveguide based. The controller 212 can be in communication with the camera 206, whether such communication is wired, wireless, or waveguide based. The camera 206 is in communication with the router 218, whether such communication is wired, wireless, or waveguide based. The controller 212 can be in communication with the router 218, whether such communication is wired, wireless, or waveguide based. The server 220 is in communication with the router 218 and the client 222, whether such communication is wired, wireless, or waveguide based. The router 218 is in communication with the camera 214, whether such communication is wired, wireless, or waveguide based. The camera 214 is in communication with the light source 216, whether such communication is wired, wireless, or waveguide based. Note that any such manners of communication can be identical to or different from each other.

The board 202 hosts the voltage converter 204, such as via fastening, mating, interlocking, adhering, or others. The voltage converter 204 is an electric power converter. As such, the voltage converter 204 is configured to (1) receive a voltage from the electric power source, and (2) change, such as via decreasing, the voltage such that the voltage, as changed, can be supplied to the controller 212, the camera 206, and the light sources 208, 210 to power the controller 212, camera 202, and the light sources 208, 210. The voltage converter 204 may be combined with other components to create a power supply. For example, the voltage converter 204 can be configured to convert an alternating current (AC) voltage via a transformer.

The board 202 hosts the camera 206, such as via fastening, mating, interlocking, adhering, or others. The camera 206 can be similar to the camera 108, but is configured to image the undercarriage of the vehicle 104, as disclosed above. For example, the camera 206 can include a matrix Internet Protocol (IP) camera with a wide angle lens, such as a fisheye lens. For example, the board 202 can have the camera 206 being a sole camera that the board 202 hosts. For example, the camera 206 can be a line scan camera. The camera 206 can be configured to capture an image in a high resolution, such as at 1200 by 1800 pixels at 72 dots per inch (DPI) or lower or higher. Note that the wide angle lens can enable the camera 206 to have a field of view sufficient to image the undercarriage of the vehicle 104 across the width of the vehicle 104, which can include a wheel or a wheel well of the vehicle 104. Further, note that when the camera 206 videos the undercarriage of the vehicle 104, each frame of that video sequence can show only a part of the undercarriage (in length). As such, the camera 206 can form a set of images of the undercarriage of the vehicle 104 as the vehicle 104 is passing over the camera 206, where the set of images can be stitched (e.g., end-to-end), whether via the camera 206 or via the server 220, to generate a single image (e.g., a composite image) depicting the undercarriage of the vehicle 104, which may be in under about 3 seconds when the vehicle 104 is a passenger car. When the server 220 stitches the set of images, then the camera 206 is configured to send the set of images to the server 220 via the router 218. Otherwise, the camera 206 can send the single image to the server 220 via the router 218 where the camera 206 stitches the set of images onboard.

The board 202 hosts the light sources 208, 210, such as via fastening, mating, interlocking, adhering, or others, whether identical to or different from each other. For example, the light sources 208, 210 can be a group of light sources that extends about the camera 206. The light sources 208, 210 operate as a plurality of flash illumination output devices or other artificial illumination output devices, such as a plurality of infrared illumination output devices, such that the camera 206 can image the undercarriage of the vehicle 104 as the undercarriage of the vehicle 104 is illuminated via the light sources 208, 210. Note that the light sources 208, 210 are configured to output a plurality of lights, whether the lights are identical to or different from each other in illumination characteristics, such as frequency, wavelength, visibility, color, brightness, or others, or mode of illumination, such as flashing, continuous, or others, or other properties. The light sources 208, 210 can include a light emitting diode (LED). The light sources 208, 210 can work in a pulsed mode (synchronized in frequency with the camera 206 through the controller 212) or in a constant mode, such as lighting without visibly pulsing or others. As such, the light sources 208, 210 are positioned on the board 202 and activated such that the lights output via the light sources 208, 210 provide a uniform illumination of the undercarriage of the vehicle 104. Note that when the vehicle 104 is not over the board 202 or not in operational proximity of the camera 206 or the camera 214, then the light sources 208, 210 operate in a standby mode drawing low power from the voltage converter 204.

The camera 214 is similar to the camera 108. For example, the camera 214 can include an IP camera, which can be installed in conjunction (coaxial) with a projector of an infrared or visible light to enable a capture of the identifier in poor illumination conditions, such as at nighttime. Note that the camera 214 can be oriented such that its field of view, such as the field of view 110, is able to image a front or back portion of the vehicle 104, which can include the identifier, when the vehicle 104 is moving toward or onto or over the board 202. The camera 214 can output to the server 220 via the router 218. The light source 216 similar to the flash illumination output device or another artificial illumination output device, such as an infrared illumination output device, as disclosed above. The light source 216 operates in conjunction with the camera 214 to aid the camera 214 in imaging.

The controller 212 is configured to control the light sources 208, 210, as powered via the voltage converter 204. The router 218 is a network communication device that routes communications to or from the camera 206, the camera 214, the server 220, whether in a wired, wireless, or waveguide manner. Note that the controller 212 or the client 222 can communicate with the router 218.

The server 220 can be configured to receive or archive an imagery (e.g., a photo, a video) as received from the camera 214 or from the camera configured to provide the surveillance overview of the system 100 or the locale in which the system 100 is installed, if this camera is present. Likewise, the server 220 can be configured to receive, compress, or archive an imagery (e.g., a photo, a video) from the camera 206. Moreover, the server 220 can be configured to recognize the identifier of the vehicle 104 from the imagery received from the camera 214. Also, the server 220 can be configured to stitch the set of images from the imagery received from the camera 206 into the single image. Additionally, the server 220 can be configured to compare the single image to a reference or template image, as disclosed above. Furthermore, the server 220 can be configured to serve the GUI 122 to the client 222. The server 220 can host the database, as explained above.

For example, the server 220 can read, write, edit, delete, or retrieve an image, whether a template or current image, from or into the database, such as when the image is logically associated with the vehicle identifier, as captured via the camera 214 and sent to the server 220 via the router 218. The client 222 is similar to the workstation 120. Moreover, note that the client 222 is configured to enable a synchronized viewing of live or archived video from the camera 206, the camera 214, or any other cameras with which the server 220 is in communication with, such as a surveillance camera or others. Also, the client 222 can be configured to view the imagery of the undercarriage of the vehicle 104 or any other image processing based on such imagery, such as image markings based on comparing the imagery against a reference or template imagery, as previously created. Further, the client 222 can be configured to manage or control any protecting devices, such as gates, barriers, or others, traffic lights, display boards (with appropriate integration), or others. Additionally, the client 222 can be configured interact with higher level systems (with appropriate integration).

Figure 3A:
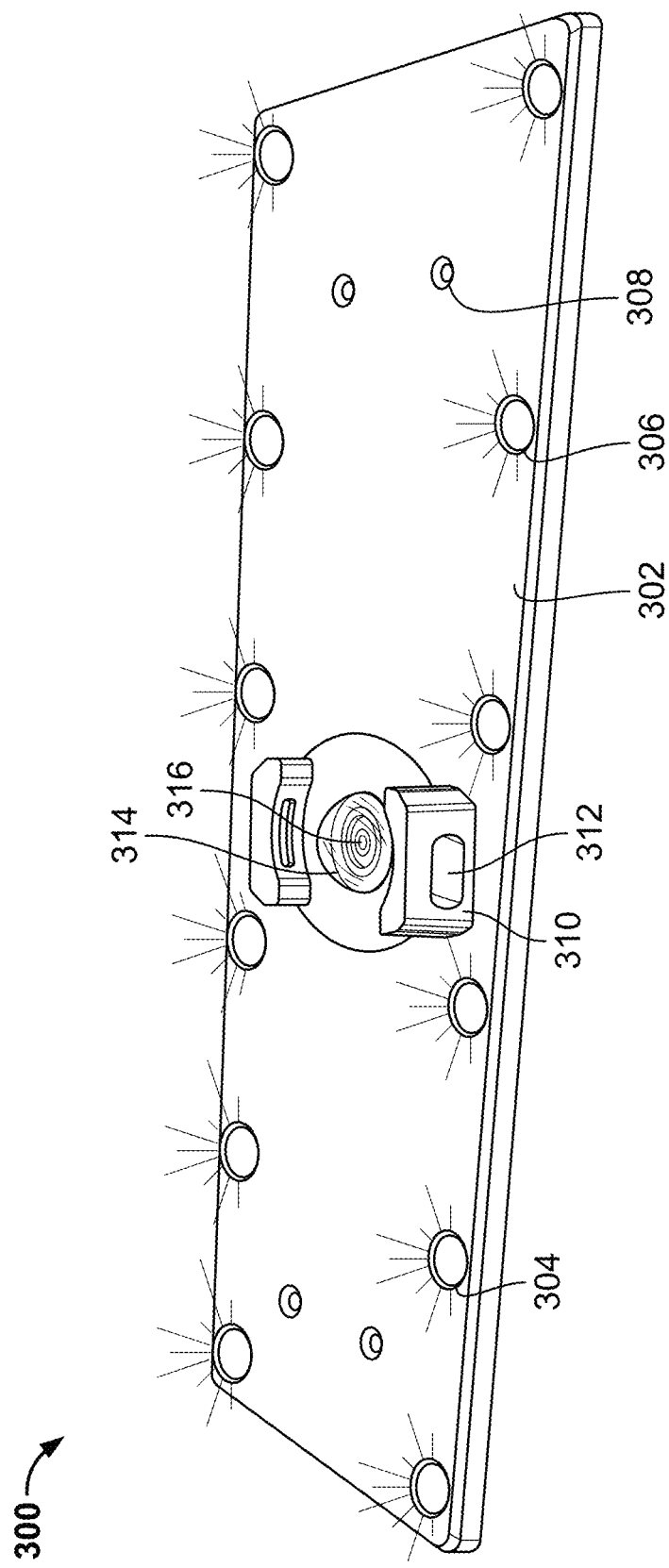
FIGS. 3A-3C show an embodiment of a board according to this disclosure.
Figure 3B:
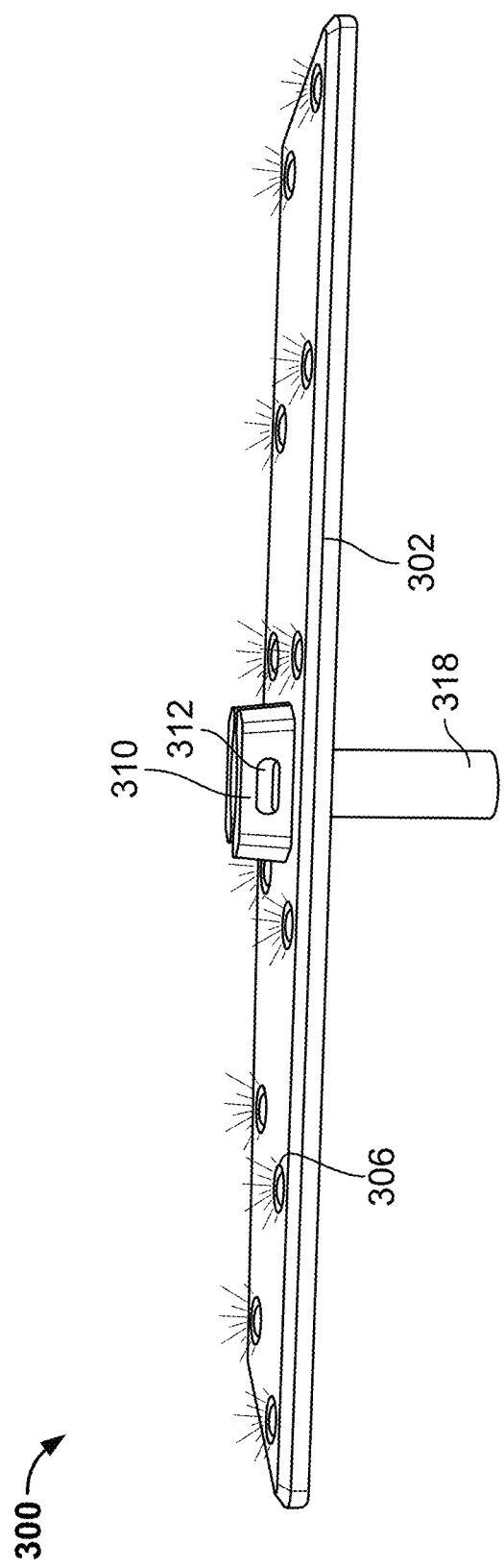
Figure 3C:
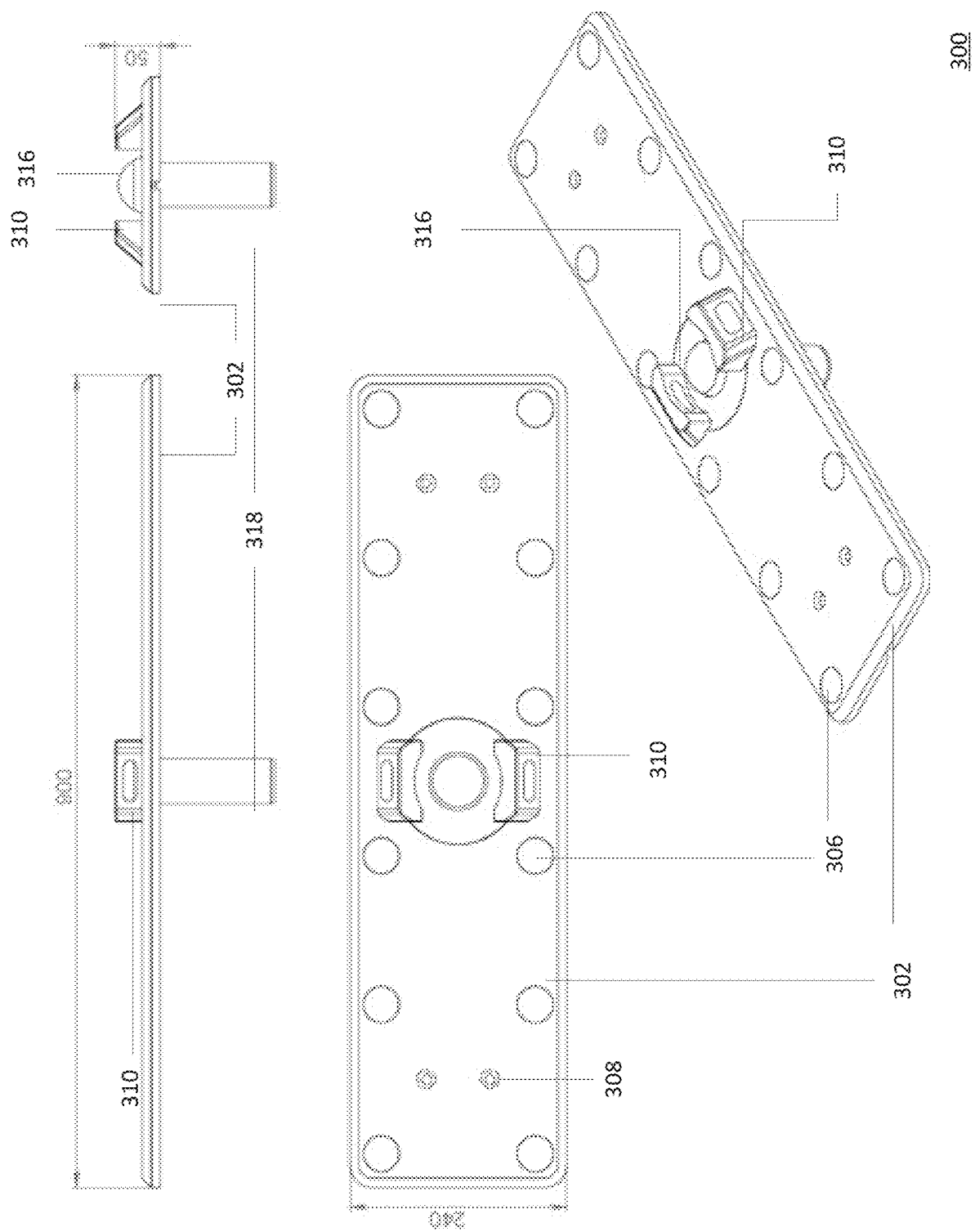

FIGS. 3A-3C show an embodiment of a board according to this disclosure. In particular, a board 300 is similar to the board 106 or 202. The board 300 includes a body 302, a plurality of wells 304, a plurality of light sources 306, a plurality of sets of bores 308, a plurality of walls 310, a plurality of openings 312, a well 314, a camera 316, and a stem 318.

The body 302 is solid, rigid, and rectangularly shaped. However, such structure can vary where the body 302 can be perforated or meshed or latticed, flexible, or shaped as a square, a circle, an oval, a triangle, a trapezoid, a pentagon, a heptagon, an octagon, a disc, a ring, a U-portion, a J-portion, a W-portion, an M-portion, a D-portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others, whether open or closed shape, whether having a uniform or varying length, width, or height along a horizontal, vertical, or diagonal plane. The body 302 can include a depression or a projection. The body 302 include a metal (e.g., aluminum, titanium) or an alloy (e.g., stainless steel, ceramic), but can include plastic, rubber, wood, or others. The body 302 can be weatherproof. Accordingly, the body 302 is configured such that the vehicle 104 can travel on or over or rest on or over the body 302.

The body 302 defines the wells 304 therein. The wells 304 are circular, but can be shaped differently, such as a square, a circle, an oval, a triangle, a trapezoid, a pentagon, a heptagon, an octagon, or others. The wells 304 can be internally tapered or uniform or smooth or threaded. The wells 304 are distributed along a periphery of the body 302 in a closed shape manner, but open shape manner is possible. Although the wells 304 are positioned longitudinally in opposing pairs, variations in such positioning are possible, such as the wells 304 being positioning longitudinally not in pairs or offset or other ways. Note that some of the wells 304 can include bores through the body 302.

The wells 304 host the light sources 306, such as via fastening, mating, interlocking, adhering, or others, whether identical to or different from each other. The light source 306 are similar to the light sources 208, 210. The light sources 306 are configured to output a plurality of lights onto the undercarriage of the vehicle 104 such that the camera 316 can capture a set of images of the undercarriage of the vehicle 104 based on the lights, such as via a plurality of reflections of the lights off the undercarriage of the vehicle 104, as the vehicle 104 approaches the body 302 or moves over the body 302 or passes the body 302 or rests on the body 302, as further disclosed below. For example, the light sources 306 operate as a plurality of flash illumination output devices or other artificial illumination output devices, such as a plurality of infrared illumination output devices, such that the camera 316 can image the undercarriage of the vehicle 104 as the undercarriage of the vehicle 104 is illuminated via the light sources 306. Note that the light sources 306 are configured to output a plurality of lights, whether the lights are identical to or different from each other in illumination characteristics, such as frequency, wavelength, visibility, color, brightness, or others, or mode of illumination, such as flashing, continuous, or others, or other properties. The light sources 306 can include a set of LED bulbs, incandescent bulbs, fluorescent bulbs, halogen bulbs, or others. The light sources 306 can work in a pulsed mode (synchronized in frequency with the camera 316 through the controller 212), or in a constant mode, such as lighting without visibly pulsing or others. Note that the light sources 306 can be flush with the body 302 or not flush with the body 302, such as via being set higher or lower than an upper surface of the body 302. As such, the light sources 306 are positioned on the body 302 and activated such that the lights output via the light sources 306 provide a uniform illumination of the undercarriage of the vehicle 104. Note that the body 302 can define a trench between the wells 304, such as for running a wire of the light sources 306 or the camera 316, although the wire can be internal to the body 302. Further, note that the body 302 can include a trench extending in a closed shape, such as an O-shape, a D-shape, a rectangular shape, a square shape, a circular shape, an oval or ovoid shape, a pentagonal shape, an octagonal shape, a triangular shape, or others. Note that the trench can include a solid, perforated, latticed, or meshed bottom side. Moreover, the light sources 306 can include a line of light sources 306 hosted on the body 302, such as within the trench, whether the light sources 306 operate serially or in parallel.

The body 302 defines the sets of bores 308 such that the sets of bores 308 are distal to the periphery of the body 302. The sets of bores 308 include bores that are circular, but can be shaped differently, such as a square, a circle, an oval, a triangle, a trapezoid, a pentagon, a heptagon, an octagon, or others. The sets of bores 308 can be internally tapered or uniform. For example, sets of bores 308 can include bores that are countersunk. Although the sets of bores 308 are positioned longitudinally in opposing pairs, variations in such positioning are possible, such as the sets of bores 308 being positioning longitudinally not in pairs or offset or other ways. Note that the body 302 can be bolted onto the surface 102 via a set of bolts or stakes extending through the sets of bores 308.

The body 302 hosts the walls 310, where the walls 310 include the openings 312. The body 302 includes an upper side from which the walls 310 extend, while opposing each other, although variations on this extension are possible, such as when the walls 310 are not opposing each other or offset with each other. The walls 310 can extend perpendicularly or non-perpendicularly from the upper side. The walls 310 are unitary or monolithic to the body 302, although the walls 310 can be assembled to the body 302, such as via fastening, mating, interlocking, adhering, or others. The walls 310 are solid, rigid, and U-shaped. However, such structure can vary where the walls 310 can be perforated or meshed or latticed, flexible, or shaped as a square, a circle, an oval, a triangle, a trapezoid, a pentagon, a heptagon, an octagon, a disc, a ring, a J-portion, a W portion, an M portion, a D portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others, whether open or closed shape, whether having a uniform or varying length, width, or height along a horizontal, vertical, or diagonal plane. The walls 310 can include a depression or a projection. The walls 310 include metal, but can include plastic, rubber, wood, or others. The walls 310 can be weatherproof. Accordingly, the walls 310 are structured to protect the camera 316 from impact or pressure of a wheel or roller of the vehicle 104 as the vehicle 104 moves over the board 300.

Note that although the walls 310 extend longitudinally along a length of the upper side of the body 302, the walls 310 can extend longitudinally along a width of the upper side of the body 302, while still enabling the camera 316 to image, such as via being transparent or sized based on the camera 316 or others. Further, note that although the walls 310 are not in contact with each other, the walls 310 can be in contact with each other, whether defining an open or closed shape, such as a U-portion, a V-portion, a C-portion, an O-portion, a D-portion, a square, a circle, an oval, a triangle, a trapezoid, a pentagon, a heptagon, an octagon, a disc, a ring, a J-portion, a W portion, an M portion, an E-portion, a T-portion, an S-portion, an F-portion, an H-portion, an L-portion, an arcuate portion, a sinusoidal portion, a pulse-shaped portion, a zigzag-shape portion, an hourglass shape portion, or others. The openings 312 are positioned such that the camera 316 is able to image therethrough. The openings 312 can be of any shape, such as an O-portion, a D-portion, a square, a circle, an oval, a triangle, a trapezoid, a pentagon, a heptagon, an octagon, or others. Note that the body 302 can lack at least one of the walls 310. Further, note that the walls 310 can be central to the body 302 or not central to the body 302.

The body 302 defines the well 314 therein. The well 314 is circular, but can be shaped differently, such as a square, a circle, an oval, a triangle, a trapezoid, a pentagon, a heptagon, an octagon, or others. The well 314 can be internally tapered or uniform or smooth or threaded. The well 314 is positioned between the walls 310 and distal from the periphery of the of the body 302. Note that the well 314 can be central to the body 302 or not central to the body 302. Further, note that the well 314 can include a bore through the body 302.

The well 314 hosts the camera 316 therein, such as via fastening, mating, interlocking, adhering, or others, whether identical to or different from each other. Note that the camera 316 is covered by a dome that is rigid and transparent, which can include glass, plastic, or others. However, note that the dome can be opaque or translucent. The camera 316 is similar to the camera 206. The camera 316 has a field of vision. The camera 316 includes an optical instrument for capturing and recording images from the field of vision, and the images may be stored locally, transmitted to another location, or others. The images may be individual still photographs or sequences of images constituting videos. The images can be analog or digital, whether color or grayscale. For example, the camera 316 can be a PTZ camera, which may be a virtual PTZ camera, an infrared camera, or others. The camera 316 can comprise any type of lens, such as convex, concave, wide-angle, fisheye, or others. The camera 316 can comprise any focal length, such as wide angle or standard. The camera 316 can be stationary or movable. The camera 316 can be powered via a mains electricity source, such as via a power cable or a data cable. The camera 316 can be powered via at least one of an onboard rechargeable battery, such as a lithium-ion battery, which may be charged via an onboard renewable energy source, such as a photovoltaic cell, a wind turbine, or a hydropower turbine. The camera 316 can be configured for geo-tagging, such as via modifying an image file with a set of geolocation or coordinates data. The camera 316 can include or be coupled to a microphone. The camera 316 can be configured for a name-stamping, date-stamping, or time-stamping the image, such as what date or time the image was captured or naming the image with a naming convention, as pre-programmed in advance. The camera 316 can be weatherproof.

The stem 318 extends longitudinally from the body 302 in a perpendicular manner such that a T-shape is defined thereby. However, note that such structure can vary, such as via the stem 318 extending longitudinally from the body 302 in a non-perpendicular manner or a different shape is defined thereby, such as an L-shape, a J-shape, or others. The stem 318 is unitary or monolithic to the body 302, although the stem 318 can be assembled with the body 302, such as via fastening, mating, interlocking, adhering, or others. The stem 318 extends longitudinally in a rectilinear manner, although the stem 318 can extend in a non-rectilinear manner, such as sinusoidal, arcuate, or others. The stem 318 includes metal, but can include plastic, wood, rubber, or others. The stem 318 is hollow internally, such as a tube, but can be solid internally, such as when the camera 316 is hosted on the body 302 and a wiring for the camera 316 runs external or along the stem 318 or on the body 302. The stem 318 includes a sidewall that is solid, but can be perforated, meshed, latticed, or others. The stem 318 extends from the body 302 such that the stem 318 is co-aligned with the camera 316, but variations are possible, such as when the stem is not co-aligned with the camera 316, such as being offset with the camera 316. The stem 318 can have a closed end portion distal to the body 302 or an open end portion distal to the body 302. For example, when the stem 318 is internally hollow and has the open end portion distal to the body 302, then the stem 318 can contain the wire for the light sources 306 or the camera 316, such as to the controller 212 or a power source or others. The stem 318 has a circular cross-section, but such structure can vary, such as via the stem 318 having a square, triangle, rectangular, oval, pentagonal cross-sections or others. Note that the stem 318 can include depressions or projections. Further, the stem 318 can include a plurality of spikes outwardly extending therefrom in a radial manner, such as in order to aid in securing the board 300 into soil.

Note that the body 302 or the stem 318 can host a sensor configured to sense at least one of a presence or an absence of the vehicle 104 in operational proximity thereof. For example, the sensor can be an optical sensor other than the camera 316, a ultrasonic sensor, an ultrasound sensor, a laser sensor, a radar, a lidar, a heat sensor, an actuator, a mechanical linkage, a load cell, a pressure sensor, a ferromagnetic sensor, or others, whether powered by its own power source or other power source, such as a power source powering the light sources 306 or the camera 316. For example, the sensor can be coupled to the body 302 or the stem 318 via fastening, mating, interlocking, adhering, or others. In some embodiments, the sensor can be an all-weather sensor. Note that the sensor can be hosted via internal or external to the body 302 or the stem 318. Further, note that although FIG. 3C depicts various sizes corresponding to a length of the body 302 and a height of the walls 310, such dimensions are illustrative and can vary, whether greater or lesser.

Figure 4:
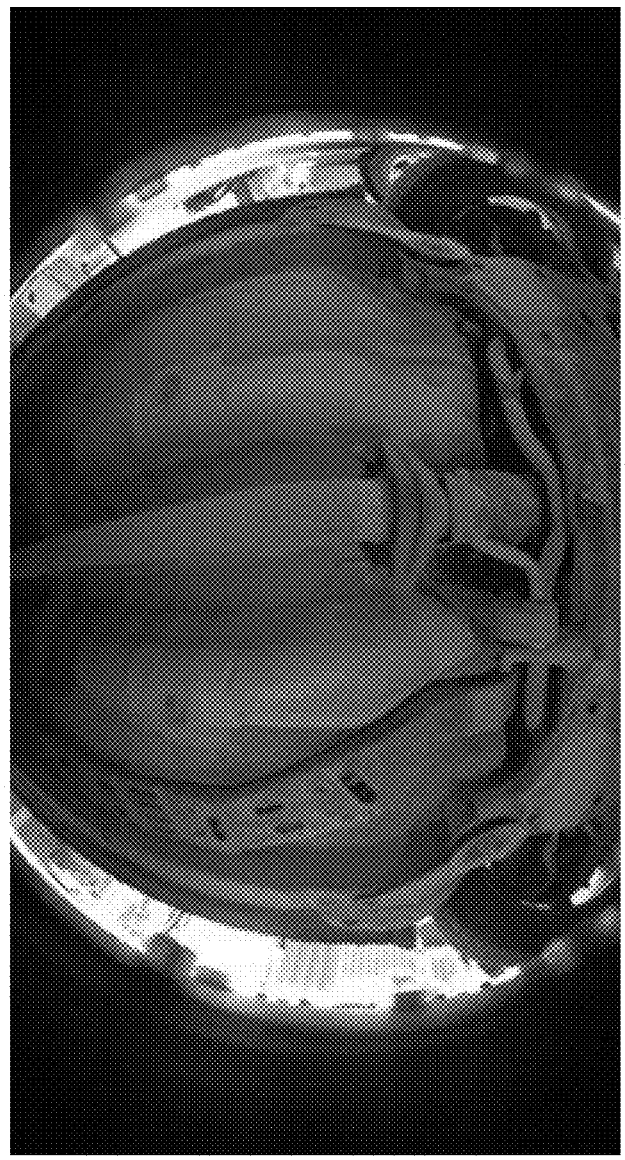
FIG. 4 shows an embodiment of an image that is distorted and depicts an undercarriage of a vehicle according to this disclosure.

FIG. 4 shows an embodiment of an image that is distorted and depicts an undercarriage of a vehicle according to this disclosure. In order to detect a presence of the vehicle 104 in proximity of or over the board 106, a set of processor-implemented actions are performed, which can be via the server 116. For example, such actions can involve an algorithm of video analytics performed by the server 116 on a video stream received from the board 106. When the board 106 hosts a camera with a wide angle lens, such as a fisheye camera, then the server 116 receives the video stream from the camera where the video stream is distorted, such as via a barrel distortion in a registered image or frame, as shown in a screenshot 400 of FIG. 4. Such distortion can make accurate image stitching complicated. Therefore, the set of processor-implemented actions can employ an algorithm to reduce or remove such distortion from the video stream, such as via reducing or removing a geometrical bending of a surface of an object, such as the undercarriage of the vehicle 104.

Figure 5:
FIG. 5 shows an embodiment of an image that has a barrel distortion and depicts a back portion of an undercarriage of a vehicle according to this disclosure.
Figure 6:
FIG. 6 shows an embodiment of an image that has barrel distortion dewarped and depicts a back portion of an undercarriage of a vehicle according to this disclosure.
Figure 7:
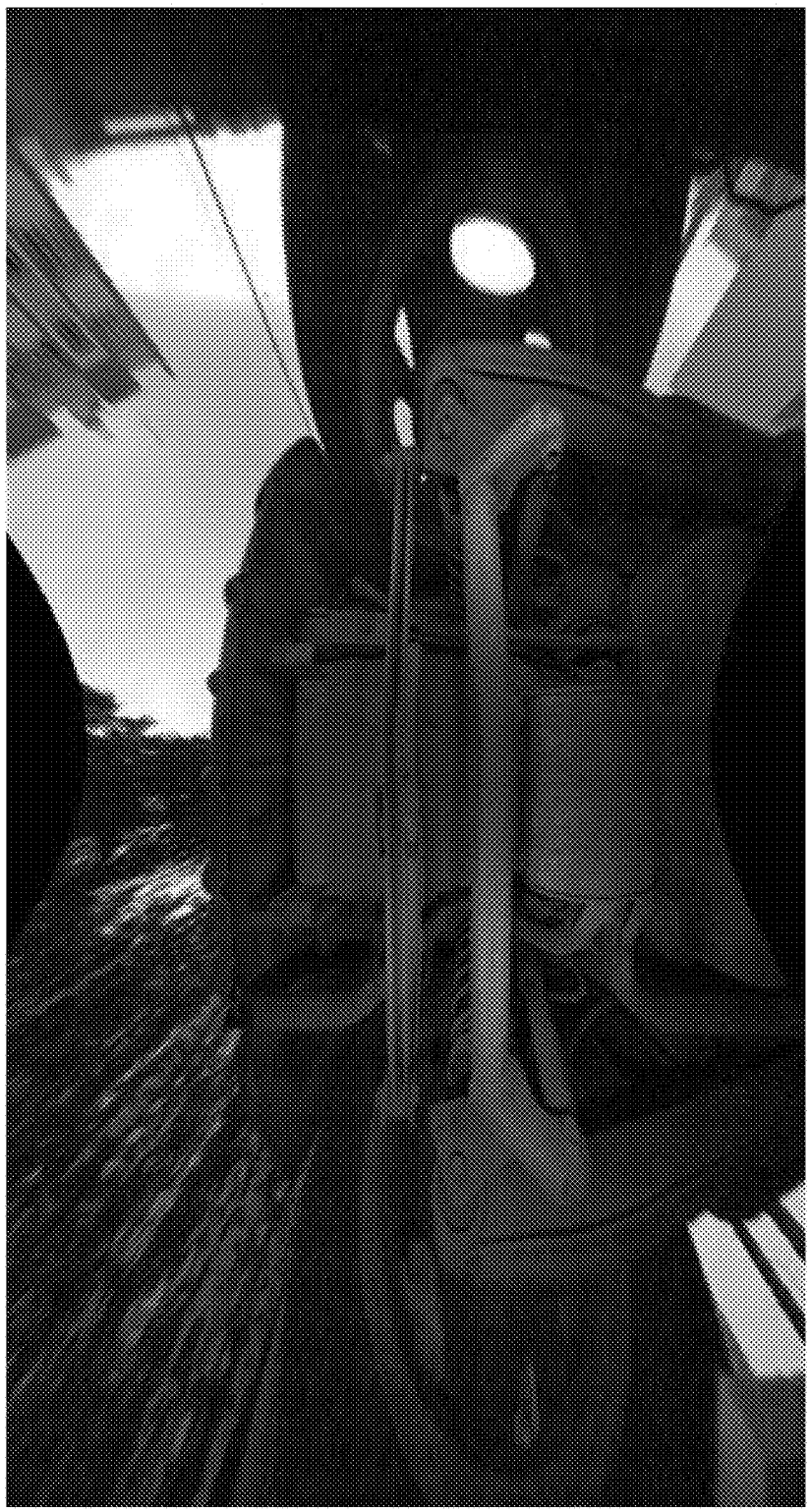
FIG. 7 shows an embodiment of an image that has some barrel distortion dewarped and depicts a back portion of an undercarriage of a vehicle according to this disclosure.

FIG. 5 shows an embodiment of an image that has a barrel distortion and depicts a back portion of an undercarriage of a vehicle according to this disclosure. FIG. 6 shows an embodiment of an image that has barrel distortion dewarped and depicts a back portion of an undercarriage of a vehicle according to this disclosure. FIG. 7 shows an embodiment of an image that has some barrel distortion dewarped and depicts a back portion of an undercarriage of a vehicle according to this disclosure. In particular, as explained above, when the board 102 hosts the camera with the wide angle lens, the imagery can be distorted, such as via a barrel distortion. For example, when a distance between the camera of the board 102 to the undercarriage of the vehicle 104 is between about 0.1 meter to about 0.2 meters, such as when the vehicle 104 has a low ground clearance, and when the vehicle 104 has a width of about 3 meters or less, then a camera-based inspection of the undercarriage of the vehicle 104 should allow for a viewing angle of about not less than 160 degrees. Further, if a wheel of the vehicle 104 should be available for the camera-based inspection, then such viewing angle should be about not be less than 165 degrees. Therefore, the board 102 hosting the camera with the wide angle lens provides an advantage of enabling such viewing angles. However, as noted above and shown as a screenshot 500 in FIG. 5, the imagery obtained in such manner is distorted. This distortion hinders accurate merging, stitching, or splicing of the imagery in order to obtain a single image of the undercarriage, as a whole, of the vehicle 104. Consequently, the server 116 runs or accesses a data source running a process to reduce, remove, eliminate, or minimize this distortion, which allows the server 116 to form or receive a rectilinear image, similar to a screenshot 600 of FIG. 6. The process to reduce, remove, eliminate, or minimize this distortion is disclosed in U.S. Pat. No. 9,547,883, which is fully incorporated by reference herein for at least these purposes and any other purposes disclosed in this disclosure. For example, the process to reduce, remove, eliminate, or minimize this distortion can enable the server 116 to form or access the imagery, as distorted, whether such distortion is partially or fully reduced, removed, eliminated, or minimized, i.e., a degree, an extent, or how much of distortion is reduced, removed, eliminated, or minimized is managed, controlled, or selected, which can via a user or based on heuristics or thresholds, as set in advance based on a set of criteria. For example, such imagery is shown in a screenshot 700 of FIG. 7, where some distortion is still remaining. Note that some remaining or residual distortion in the screenshot 700 is less stretched at edges compared to the screenshot 600, where the distortion is substantially or completely reduced, removed, eliminated, or minimized. As such, even in this circumstance, where a small residual distortion is present, the imagery can still be stitched into a single image, as further disclosed below.

Figure 8:
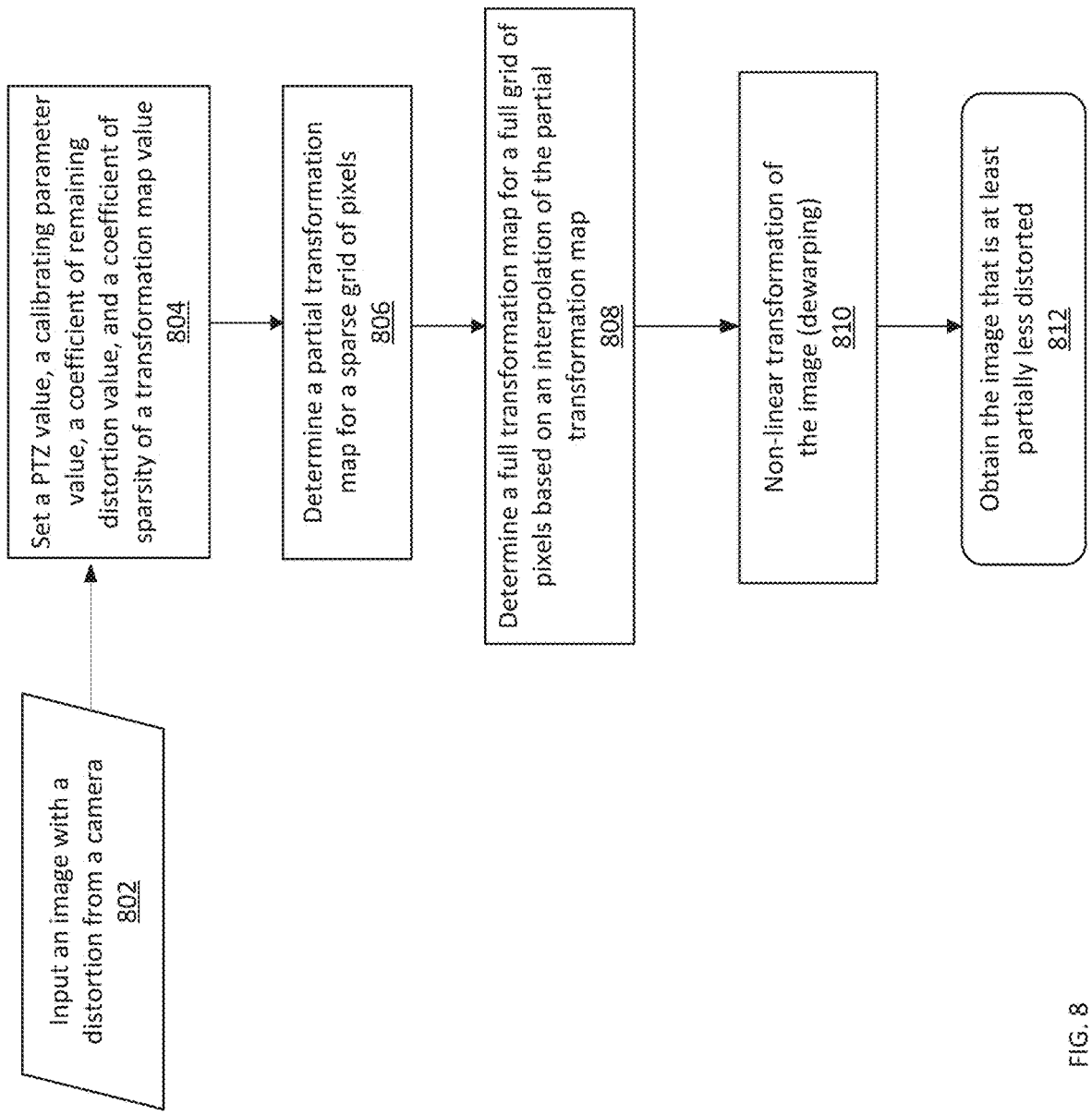
FIG. 8 shows an embodiment of a flowchart for dewarping an image according to this disclosure.

FIG. 8 shows an embodiment of a flowchart for dewarping an image according to this disclosure. In particular, a method 800 includes a plurality of blocks 802-812. The method 800 can employ the process to reduce, remove, eliminate, or minimize this distortion is disclosed in U.S. Pat. No. 9,547,883, which is fully incorporated by reference herein for at least these purposes and any other purposes disclosed in this disclosure. Although the process 800 is described in context of the server 116, other computing entities can perform this process.

In block 802, the server 116 receives an image with a distortion from a camera, such as from the board 106, the board 202, or the board 302. For example, the camera can be camera 316, as equipped with a wide angle lens, such as a fisheye lens. For example, the distortion of the image is as shown in the screenshot 400 or the screenshot 500.

In block 804, the server 116 sets a PTZ value, a calibrating parameter value, a coefficient of remaining distortion value, and a coefficient of sparsity of a transformation map value, as disclosed in U.S. Pat. No. 9,547,883, which is fully incorporated by reference herein for at least these purposes and any other purposes disclosed in this disclosure. For example the server 116 can perform this based on interaction with the workstation 120 based on a user input.

In block 806, the server 116 determines a partial transformation map for a sparse grid of pixels in the image, as disclosed in U.S. Pat. No. 9,547,883, which is fully incorporated by reference herein for at least these purposes and any other purposes disclosed in this disclosure.

In block 808, the server 116 determines a full transformation map for a full grid of pixels based on an interpolation of the partial transformation map, as disclosed in US U.S. Pat. No. 9,547,883, which is fully incorporated by reference herein for at least these purposes and any other purposes disclosed in this disclosure.

In block 810, the server 116 performs a non-linear transformation of the image, such as via dewarping the image, as disclosed in U.S. Pat. No. 9,547,883, which is fully incorporated by reference herein for at least these purposes and any other purposes disclosed in this disclosure.

In block 812, the server 116 obtains the image that is at least partially less distorted than in the block 802, as disclosed in U.S. Pat. No. 9,547,883, which is fully incorporated by reference herein for at least these purposes and any other purposes disclosed in this disclosure.

Figure 9:
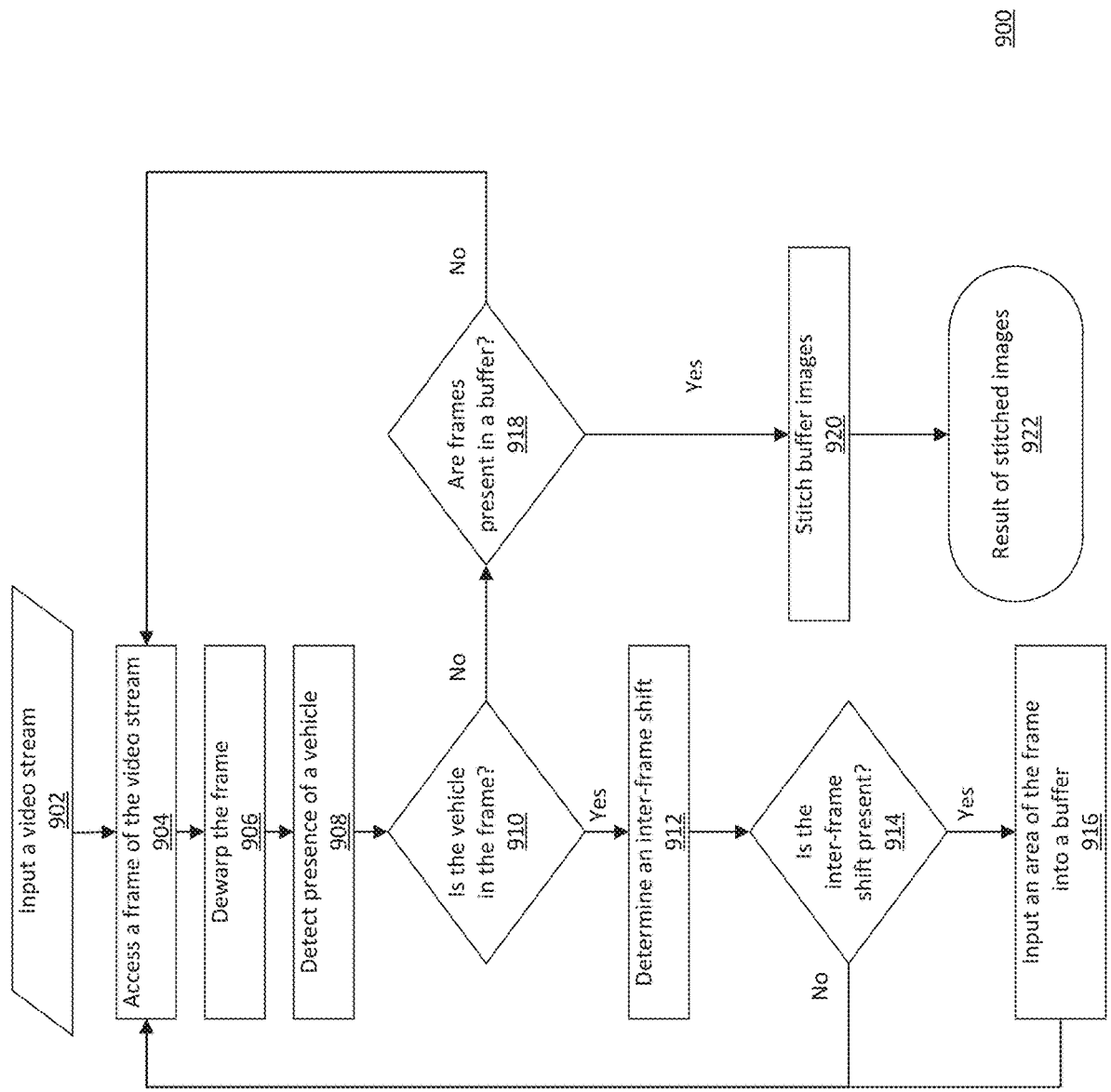
FIG. 9 shows an embodiment of a flowchart for stitching an image according to this disclosure.
Figure 10:
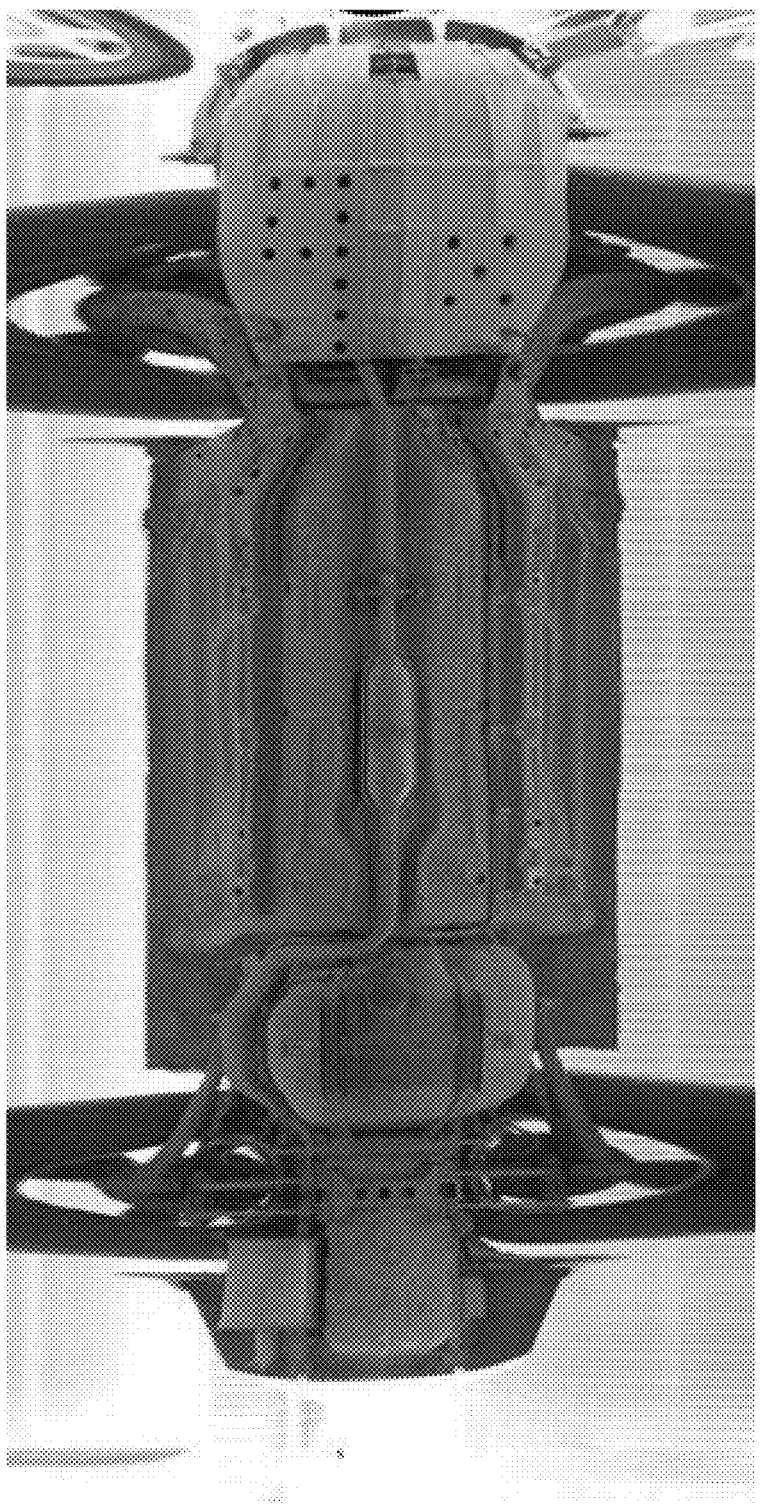
FIG. 10 shows an embodiment of an image of an undercarriage of a vehicle, where the image has been stitched according to this disclosure.

FIG. 9 shows an embodiment of a flowchart for stitching an image according to this disclosure. FIG. 10 shows an embodiment of an image of an undercarriage of a vehicle, where the image has been stitched according to this disclosure. In particular, a method 900 includes a plurality of blocks 902-922. The method 900 enables a detection of the vehicle 104 in a frame of the video stream obtained from the camera of the board 106, a formation of a full image of the undercarriage of the vehicle 104 during or after a movement of the vehicle 104 over the board 106, and a completion of the formation of the full image as or after the vehicle 104 leaves the field of view of the camera of the board 106. In order to determine when to start and when to end imaging of the undercarriage of the vehicle 104, the server 116 can employ a software-based motion detector.

In block 902, the server accesses a video stream from the camera of the board 106.

In block 904, the server 116 accesses a frame from the video stream.

In block 906, the server 116 dewarps the frame, as disclosed herein.

In block 908, the server 116 detects a presence of the vehicle 104 in the frame, as dewarped. Such detection can include preprocessing of the frame to identify or emphasize an edge in the frame using a Sobel method or filter such that an image with emphasizing edges is formed. Then, the controller 114 performs a pixel-by-pixel comparison of the edges of the frame and a previous frame to identify an inter-frame shift based on a peak signal-to-noise ratio (PSNR) metric. One criteria based on which the presence of the vehicle 104 is detected in the video stream is a non-zero temporal shift between the frame and the previous frame.

In block 910, the server 116 determines if the vehicle is present. If yes, then block 912 is performed. If no, then block 918 is performed.

In block 912, the server 116 determines the inter-frame shift of the edges of the frame and the previous frame. For example, this can be done by determining such a shift on an X-axis at which the edges of the frame and the previous frame best or maximally correspond or match based on the PSNR metric. Once the inter-frame shift has been determined, the frame is image cropped, such as via an extraction of a central portion of the frame that has a width corresponding to an absolute value of the inter-frame shift.

In block 914, the server 116 determines if the inter-frame shift is present. If yes, then block 916 is performed. If no, then block 904 is performed.

In block 916, the server 116 inputs an area of the frame, as image cropped, into a buffer of frames for subsequent stitching.

In block 918, the server 116 determines if the buffer of frames is not empty. If yes, then block 920 is performed. If no, then block 904 is performed.

In block 920, the server 116 stitches the frame with other frames in the buffer of frames, such as via image stitching. For example, such stitching can be performed via a pixel-by-pixel blending of each pair of neighboring frames, such as via regions that overlay or overlap, from the buffer of frames using a cost function. For example, the server 116 can perform the pixel-by-pixel blending, such as feather blending or others, of frame intersecting regions of the buffer of frames. As such, only those frames are used for which the server 116 is able to provide a seamless stitching with a smooth transition from one frame to another frame.

In block 922, the server 116 obtains an image that is stitched from the buffer of frames. For example, this image is shown in a screenshot 1000 of FIG. 10.

Figure 11:
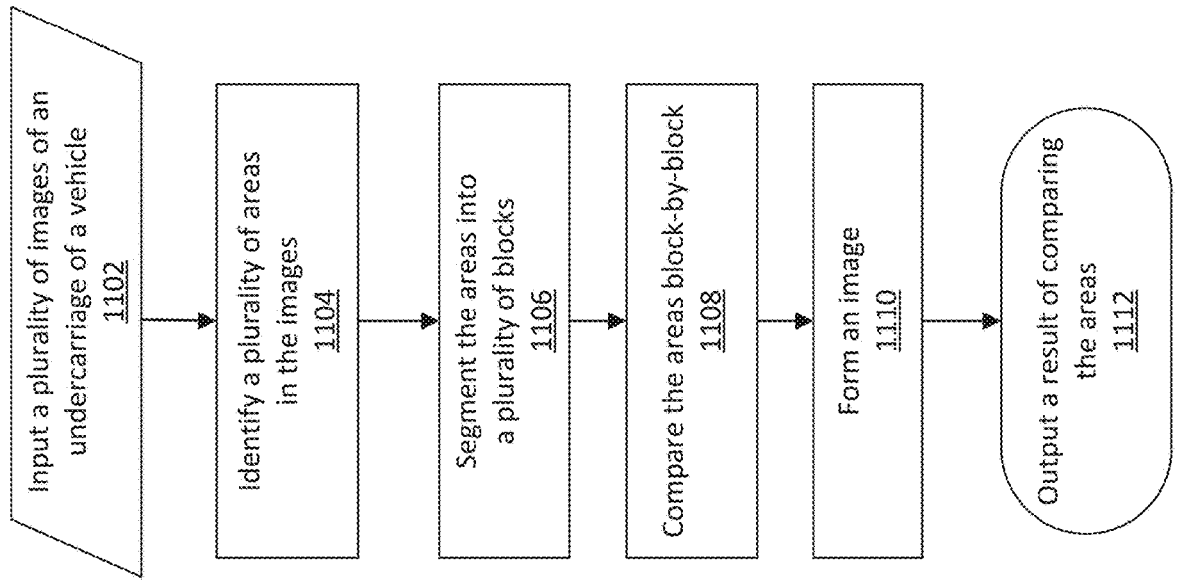
FIG. 11 shows an embodiment of a flowchart for comparing a plurality of images according to this disclosure.
Figure 12:
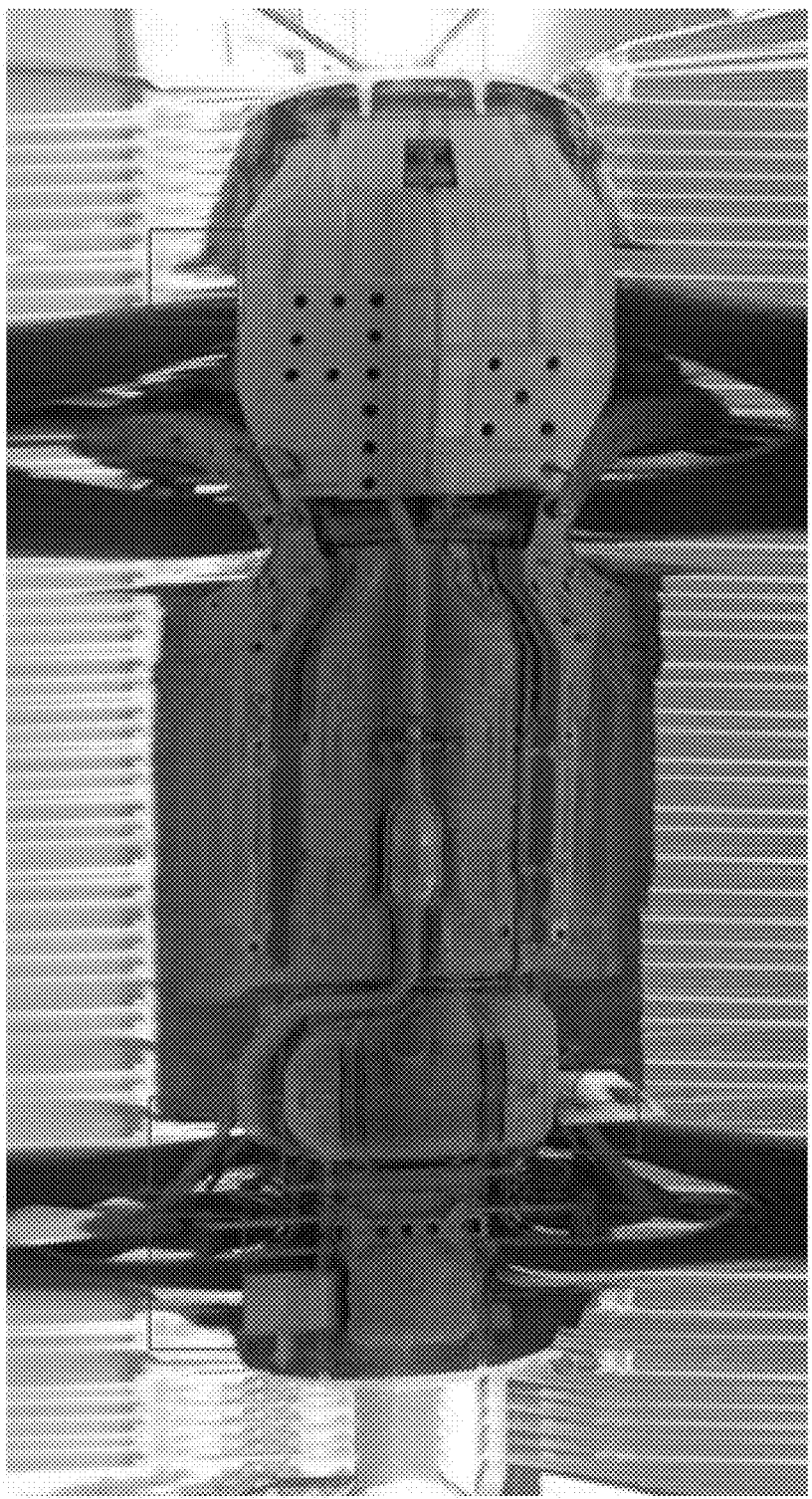
FIG. 12 shows an embodiment of a current image of an undercarriage of a vehicle noticeably depicting a plurality of deviations of the undercarriage from a template image of the undercarriage according to this disclosure.

FIG. 11 shows an embodiment of a flowchart for comparing a plurality of images according to this disclosure. FIG. 12 shows an embodiment of a current image of an undercarriage of a vehicle noticeably depicting a plurality of deviations of the undercarriage from a template image of the undercarriage according to this disclosure. In particular, a method 1100 includes a plurality of blocks 1102-1112. The method 1110 enables a comparison of a current image of the undercarriage of the vehicle 104, as the vehicle 104 is in operational proximity of the board 106, against a reference or template image of the undercarriage of the vehicle 104, as retrieved from the database based on the identifier of the vehicle 104. The method 1110 also enables a marking or augmenting of the current image based on a difference identified with respect to the reference or template image.

In block 1102, the server 116 accesses a plurality of images, which includes the current image and the template or the reference or template image.

In block 1104, the server 116 determines a plurality of regions of interest (ROI) in the images, such as a plurality of undercarriage portions. The ROIs are determined based on a result of an analysis of a background color distribution along a plurality of edges depicted on the images and the undercarriages in a plurality of central portions of the images. Note that the edges of the undercarriage can be identified using a Sobel method or filter.

In block 1106, the server 116 segments the ROIs into a plurality of blocks, such as a closed shape block, such as a square or rectangular block or others. For example, at least one of the blocks may have an area of about 5% of that ROI, although this can vary, whether higher or lower. Note that the blocks are identified with a 50% mutual overlap, although this can vary, whether higher or lower.

In block 1108, the server 116 runs a block-by-block comparison of the ROIs of the images. This comparison can be performed by comparing the current image against the template or reference image based on a principle of proximity, such as an initial selection is done based on a metric of L2 and a secondary selection is done based on a metric of L1. Therefore, those blocks that do not reach a satisfactory matching threshold based on the secondary selection are treated or flagged or logged as suspicious.

In block 1110, the server 116 forms an image where the image is marked or augmented with markings or augmentations based on those blocks that are treated as suspicious. As shown in a screenshot 1200 of FIG. 12, those markings or augmentations are presented as shapes (e.g., bounding boxes) over those areas. Note that the markings are shown in red and solid lines extending in closed shapes, but can be shown differently, such in other colors, such as blue, white, orange, purple, or others, or as non-solid, such as broken lines, or as other shapes, such as circles, ovals, triangles, pentagons, octagons, hexagons, or others, or open shapes, such as a U-shape or others.

In block 1112, the server 116 outputs the image as marked or augmented, such as into a database or onto a display. For example, the image as marked or augmented can be presented in the GUI 122 of FIG. 1 and FIG. 12.

The system 100 can enable an automated visual inspection of the undercarriage of the vehicle 104 and a receipt of documentary proof in a form of a corresponding image of the undercarriage with reference to a date and time of travel of the vehicle 104, along with the identifier thereof. Further, there is less need for an inspector to be positioned near the vehicle 104. Moreover, the system 100 enables the automated visual inspection in a two-way mode, i.e. upon entry or exit of the vehicle 104. Also, a use of a non-line-scan camera is beneficial because (1) non-uniform speed of the vehicle 104 does not lead to image stretching along a direction of motion of the vehicle 104, (2) temporary stoppage of the vehicle 104 in the field of view of the camera of the board 106 does not negatively affect the imagery therefrom, (3) some, many, most, or all comings and goings of the vehicle 104 are recorded and archived for subsequent detailed analysis of the undercarriage of the vehicle 104. Some versions of the system 100 minimize a use of a physical sensor to sense the vehicle 104, such as an induction loop, an infrared or ultrasonic sensor, or others. Moreover, the light sources on the board 106, 202, or 300 can operate in a standby mode and thereby provide energy savings, while reducing or eliminating discomforts to drivers or human inspectors, such as visually. Similarly, the board 106, 202, or 300 (1) can be compact in size (flat housing design allows for a passage of the vehicle 104 with low ground clearance, (2) does not require labor-intensive installation (only affects a small road section), (3) can be easy to maintain (periodic cleaning or washing of the dome of the camera and protective cover or lens of the light sources, and (4) employs the walls 310 to protect the dome from impact with a wheel of the vehicle 104.

There may be a board, a first camera, a light source, a second camera, a processor, and a memory. The first camera includes a wide-angle lens, such as a fisheye lens. The first camera and the light source are installed onto the board such that the first camera captures a first set of imagery of an undercarriage of a vehicle, as the undercarriage of the vehicle is illuminated via the light source, when the vehicle moves over the board. The second camera captures a second set of imagery of an identifier of the vehicle, such as a license plate. If the first set of imagery is warped, then the processor dewarps the first set of imagery. The processor stitches the first set of imagery such that a template image (e.g., a composite image) is formed for storage via the memory. The processor extracts the identifier from the second set of imagery and stores the identifier via the memory such that the template image is logically associated with the identifier. Subsequently, when that vehicle again approaches the board, the first camera captures a third set of imagery of the undercarriage, as the undercarriage of the vehicle is illuminated via the light source, when the vehicle moves over the board. The second camera captures the fourth set of imagery of the identifier of the vehicle. If the third set of imagery is warped, then the processor dewarps the third set of imagery. The processor stitches the third set of imagery such that a current image (e.g., a composite image) is formed. The processor employs the identifier, as extracted from the fourth set of imagery, to access the template image, as previously logically associated with the identifier. Then, the processor compares the current image against the template image, such as on a per-block basis, and determines whether a difference exists between the current image and the template image. If the difference exists, then the processor identifies the difference and takes an action, such as generate a request that the difference be labeled or marked. If the difference does not exist, then the processor takes an action, such as generate a request that a gate be opened for the vehicle to pass the gate. Note that although these technologies is described in context of under vehicle surveillance, this technology can be applied to other contexts. For example, this technology can be used with any type of cargo, such as actual machinery/equipment, raw materials, parcel packages, physical letters, food containers, medical devices, intermodal containers, or other goods or forms of structural inspection for logistical systems, distribution systems, supply chain systems, quality control systems, assembly lines, tamper detection systems, or others. Moreover, note that although the under vehicle surveillance is described via optical image capture, these technologies can be applied to non-optical image capture as well, such as via an ultrasound machine, an X-ray machine, an magnetic resonance imaging (MRI) machine, a radar, a lidar, a laser, a heat sensor, or any other form of image capture or formation through any input means or modality.

Figure 13:
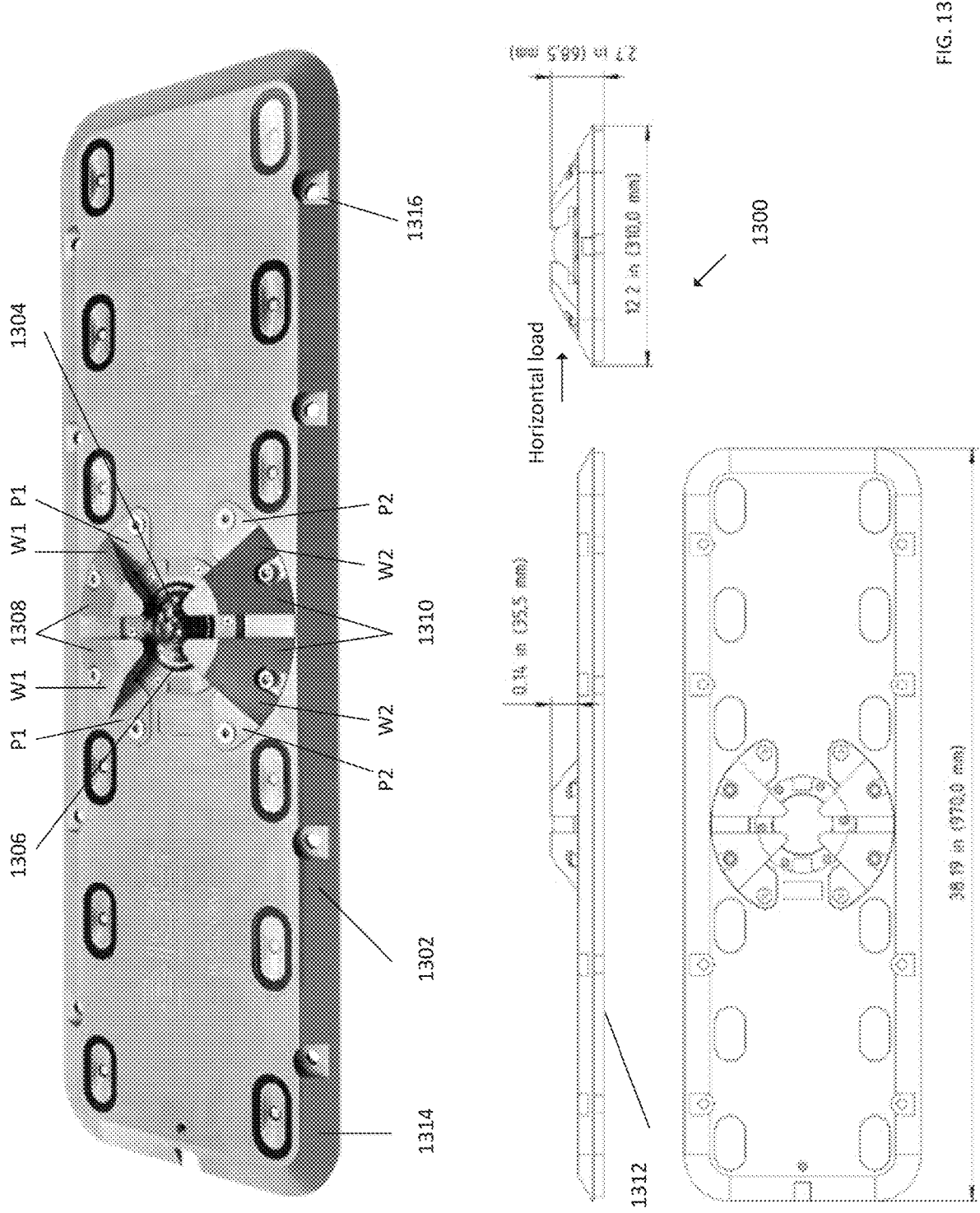
FIG. 13 shows an embodiment of a board hosting a first pair of wall units and a second pair of wall units according to this disclosure.
Figure 25:
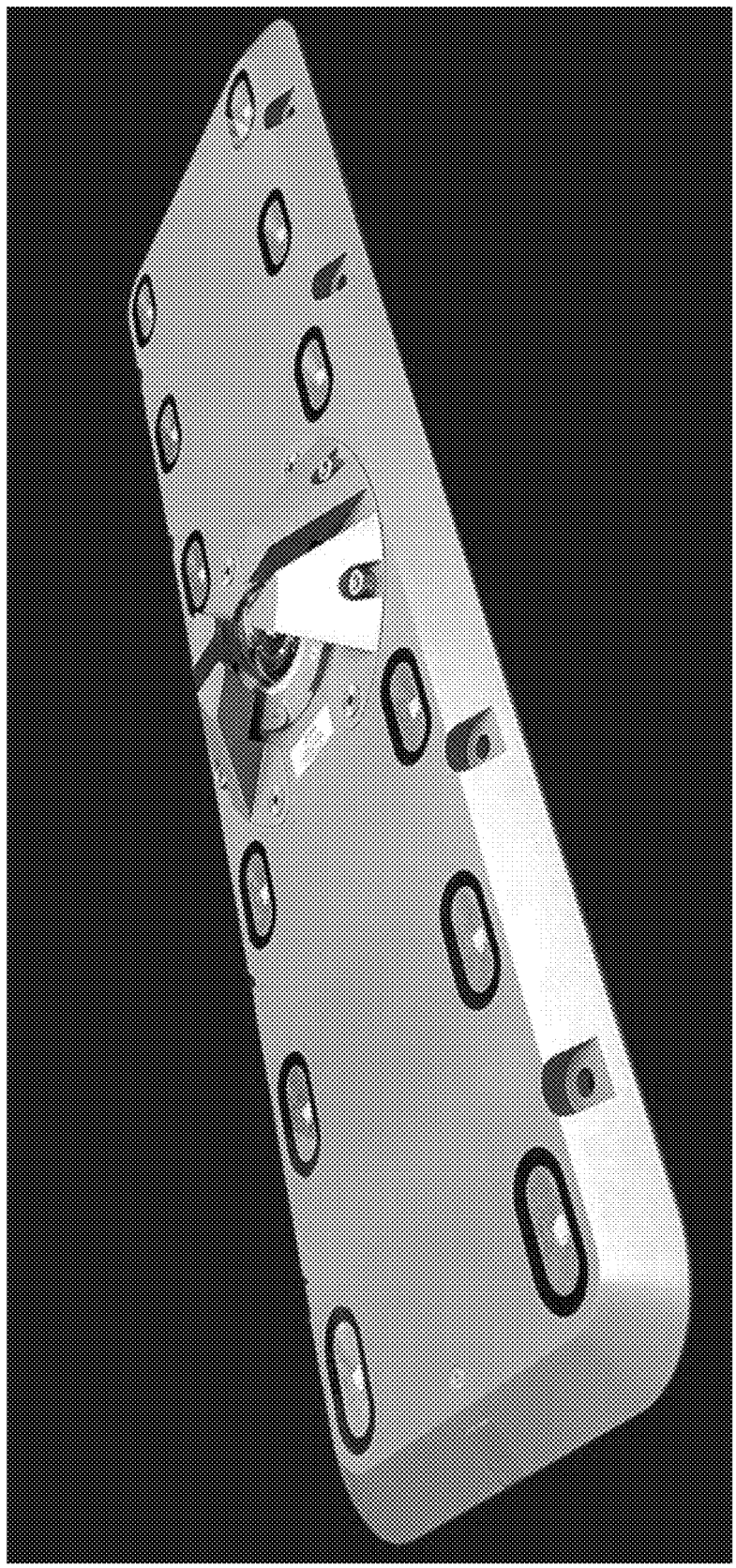
FIG. 25 shows an embodiment of a board according to this disclosure.

FIG. 13 shows an embodiment of a board hosting a first pair of wall units and a second pair of wall units according to this disclosure. FIG. 25 shows an embodiment of a board according to this disclosure. In particular, there is a device 1300 including a board 1302, a camera 1304, and a dome 1306. The board 1302 hosts the camera 1304 and the dome 1306, such that the dome 1306 encloses the camera 1304, to protect the camera 1306 from damage (e.g., debris, weather, vehicles, animals, children), and the camera 1306 is capable of imaging (e.g., optical, infrared) through the dome 1304, as described above. The board 1302, the camera 1304, or the dome 1306 may be respectively similar to other boards, cameras, or domes, as described above. However, the device 1300 differs from other devices described above by the board 1302 hosting (i) a first pair of wall units 1308, (ii) a second pair of wall units 1310, (iii) an underside 1312 that is flat, (iv) an edge portion 1314, (v) a set of alcoves 1316, (vi) the dome 1304 constituting a borosilicate glass, and (vii) the dome 1304 being detachable from the board 1302, as further described below, although any of these features may be omitted or suitably vary or be deviated therefrom.

Each wall unit of the first pair of wall units 1308 includes a plate P1 and a wall W1, where the wall W1 non-perpendicularly (obtusely or acutely) extends from the plate P1, whether the wall W1 is monolithic or assembled (e.g., fastened, mated) with the plate P1. Although the wall W1 overlaps the plate P1, this configuration is not required and the wall W1 may avoid overlapping the plate P1, which may occur via the wall W1 radially outwardly extending from the plate P1. Note that any of such features may be omitted or suitably vary or be deviated therefrom. For example, some wall units of the first pair of wall units 1308 may omit the plate P1, such that the wall W1 non-perpendicularly (obtusely or acutely) extends from the board 1302 (top side) or another structure disposed on the board 1302, or have one plate P1 have two walls W1 non-perpendicularly (obtusely or acutely) extending therefrom, whether in a similar or dissimilar manner, as described above. The walls W1 may be a monolithic piece assembled (e.g., fastened, mated) with the board 1302.

Each plate P1 is arcuately shaped, internally solid, structurally rigid (e.g., unable to be manually bent without any tools), and constitutes a suitable material (e.g., metal, alloy, aluminum, stainless steel), although any of such features may be omitted or suitably vary or be deviated therefrom. Each plate P1 is assembled (e.g., fastened, mated) with the board 1302 (top side) to be spaced apart from each other and extend on the board 1302 (top side) in a first common arcuate orientation, although monolithic configuration with the board 1302 is possible. For example, if the board 1302 has a rectangular shape when viewed from above while exposed and facing the dome 1304, then the board 1302 may have a major side (length) and a minor side (width). As such, the plates P1 may be spaced apart from each other and extend on the board 1302 (top side) along the first common arcuate orientation.

Each wall W1 has a wedge-like and arcuate shape, internally solid, structurally rigid (e.g., unable to be manually bent without any tools), and constitutes a suitable material (e.g., metal, alloy, aluminum, stainless steel), although any of such features may be omitted or suitably vary or be deviated therefrom. Each wall W1 may have a cantilevered portion distal to a respective plate P1, whether the cantilevered portion is monolithic or assembled (e.g., fastened, mated) therewith. The cantilevered portion may longitudinally extend parallel to the respective plate P1, although non-parallel extension is possible. For example, some or each wall W1 may have a sloped portion extending from the board 1302 towards the dome 1304 and the cantilevered portion extending from the sloped portion towards the dome 1304 over the board 1302, which may overlap the dome 1304. The walls W1 are spaced apart from each other, which may form a first air gap therebetween. For example, the first air gap may span at about 5 inches or less, including whole and intermediate values therebetween by halves, thirds, quarters, tens, hundreds, or other suitable discrete elements. However, note that this distance is illustrative and can be different, whether greater or lesser. Regardless, the walls W1 may also extend along the first common arcuate orientation, similar to the plates P1 when present. For example, if the board 1302 has a rectangular shape when viewed from above while exposed and facing the dome 1304, then the board 1302 may have a major side (length) and a minor side (width). As such, the walls W1 may be spaced apart from each other to form the first air gap and extend along the first common arcuate orientation.

The plates P1 may extend about (e.g., around) the camera 1304 or the dome 1306. The plates P1 may avoid extending on or over the edge portion 1314, although some plates P1 may extend on or over the edge portion 1314. The walls W1 may avoid extending on or over the edge portion 1314, although some walls W1 may extend on or over the edge portion 1314. The walls W1 may extend about (e.g., around) the camera 1304 or the dome 1306. The walls W1 may extend (e.g., cantileveredly, incline, lean) toward the camera 1304 or the dome 1306. If the walls W1 include the cantilevered portions, then the cantilevered portions may extend towards the camera 1304 or the dome 1306. The cantilevered portions may overlap the camera 1304 or the dome 1306, although any of these configurations may be omitted. If the board 1304 hosts a set of light sources, as described above, then the set of light sources may contain a first subset of light sources and a second subset of light sources, such that the first pair of wall units 1308 is disposed between the first subset of light sources and the second subset of light sources.

Each wall unit of the second pair of wall units 1310 includes a plate P2 and a wall W2, where the wall W2 non-perpendicularly (obtusely or acutely) extends from the plate P2, whether the wall W2 is monolithic or assembled (e.g., fastened, mated) with the plate P2. Although the wall W2 overlaps the plate P2, this configuration is not required and the wall W2 may avoid overlapping the plate P2, which may occur via the wall W2 radially outwardly extending from the plate P2. Note that any of such features may be omitted or suitably vary or be deviated therefrom. For example, some wall units of the second pair of wall units 1310 may omit the plate P2, such that the wall W2 non-perpendicularly (obtusely or acutely) extends from the board 1302 (top side) or another structure disposed on the board 1302, or have one plate P2 have two walls W2 non-perpendicularly (obtusely or acutely) extending therefrom, whether in a similar or dissimilar manner, as described above. The walls W2 may be a monolithic piece assembled (e.g., fastened, mated) with the board 1302.

One plate P1 or P2 or another structure may host (e.g., non-perpendicularly) one wall W1, two walls W1, one wall W2, or two walls W2. For example, there may be one plate P1 or P2 hosting (e.g., non-perpendicularly) two walls W1 and two walls W2, where that plate P1 or P2 may have a closed shape (e.g., a circle, an oval, an ellipse, a rectangle, a square, a pentagon, an octagon, a D-shape, an O-shape, a 0-shape) or an open shape (e.g., a U-shape, a C-shape), whether symmetrical or asymmetrical.

Each plate P2 is arcuately shaped, internally solid, structurally rigid (e.g., unable to be manually bent without any tools), and constitutes a suitable material (e.g., metal, alloy, aluminum, stainless steel), although any of such features may be omitted or suitably vary or be deviated therefrom. Each plate P2 is assembled (e.g., fastened, mated) with the board 1302 (top side) to be spaced apart from each other and extend on the board 1302 (top side) in a second common arcuate orientation, although monolithic configuration with the board 1302 is possible. For example, if the board 1302 has a rectangular shape when viewed from above while exposed and facing the dome 1304, then the board 1302 may have a major side (length) and a minor side (width). As such, the plates P2 may be spaced apart from each other and extend on the board 1302 (top side) along the first common arcuate orientation. The first common arcuate orientation may oppose the second common arcuate orientation such that an approximate common circular or oval orientation may be formed.

Each wall W2 has a wedge-like and arcuate shape, internally solid, structurally rigid (e.g., unable to be manually bent without any tools), and constitutes a suitable material (e.g., metal, alloy, aluminum, stainless steel), although any of such features may be omitted or suitably vary or be deviated therefrom. Each wall W2 may have a cantilevered portion distal to a respective plate P2, whether the cantilevered portion is monolithic or assembled (e.g., fastened, mated) therewith. The cantilevered portion may longitudinally extend parallel to the respective plate P2, although non-parallel extension is possible. For example, some or each wall W2 may have a sloped portion extending from the board 1302 towards the dome 1304 and the cantilevered portion extending from the sloped portion towards the dome 1304 over the board 1302, which may overlap the dome 1304. The walls W2 are spaced apart from each other, which may form a second air gap therebetween. For example, the second air gap may span at about 5 inches or less, including whole and intermediate values therebetween by halves, thirds, quarters, tens, hundreds, or other suitable discrete elements. However, note that this distance is illustrative and can be different, whether greater or lesser. The first air gap opposes (e.g., co-aligned) the second air gap, although non-oppositional positioning is possible. Regardless, the walls W2 may also extend along the second common arcuate orientation, similar to the plates P2 when present. For example, if the board 1302 has a rectangular shape when viewed from above while exposed and facing the dome 1304, then the board 1302 may have a major side (length) and a minor side (width). As such, the walls W2 may be spaced apart from each other to form the second air gap and extend along the second common arcuate orientation.

The plates P2 may extend about (e.g., around) the camera 1304 or the dome 1306. The plates P2 may avoid extending on or over the edge portion 1314, although some plates P2 may extend on or over the edge portion 1314. The walls W2 may avoid extending on or over the edge portion 1314, although some walls W2 may extend on or over the edge portion 1314. The walls W2 may extend about (e.g., around) the camera 1304 or the dome 1306. The walls W2 may extend (e.g., cantileveredly, incline, lean) toward the camera 1304 or the dome 1306. If the walls W2 include the cantilevered portions, then the cantilevered portions may extend towards the camera 1304 or the dome 1306. The cantilevered portions may overlap the camera 1304 or the dome 1306, although any of these configurations may be omitted or suitably vary or deviate. If the board 1304 hosts a set of light sources, as described above, then the set of light sources may contain a first subset of light sources and a second subset of light sources, such that the second pair of wall units 1310 is disposed between the first subset of light sources and the second subset of light sources.

The first pair of wall units 1308 may and the second pair of wall units 1310 may be laterally spaced apart from each other. For example, if the board 1302 has a rectangular shape when viewed from above while exposed and facing the dome 1304, then and the board 1302 may have a major side (length) and a minor side (width). As such, one wall P1 and one wall P2 may be spaced apart each other along the minor side. Similar configuration may apply to remaining wall W1 and wall W2. The first pair of wall units 1308 may oppose the second pair of wall units 1310, such that the camera 1304 or the dome 1304 may be positioned therebetween. For example, the dome 1304 may extend between the first pair of walls W1 and the second pair of walls W2. For example, the camera 1306 may image the undercarriage through the dome 1304 as the undercarriage is illuminated by a set of light sources when the undercarriage moves over the first pair of walls W1 and the second pair of walls W2, as described above. The first pair of wall units 1308 may oppose the second pair of wall units 1310, such that the first air gap may oppose (e.g., co-aligned) the second air gap. For example, if the board 1302 has a rectangular shape when viewed from above while exposed and facing the dome 1304, then and the board 1302 may have a major side (length) and a minor side (width). As such, one wall P1 extending along one edge of the major side and one wall P2 extending along another edge of the major side may be diagonal to each other, while the camera 1304 or the dome 1306 is positioned therebetween. Similar configuration may apply to remaining wall W1 and wall W2.

The board 1302 may have the edge portion 1314 that may be inclined (e.g., sloped) to be co-aligned with at least one of the walls W1 (upper surface) or the walls W2 (upper surface), i.e., the walls W1 or the walls W2 are shaped to be commonly angled with the board 1302 (upper surface). For example, at least some sections of the walls W1 (upper surface) or the walls W2 (upper surface) may be angled at a wall angle between about 15 degrees and about 75 degrees relative to the board 1302 (top side). Likewise, at least some sections of the edge portion 1314 may be angled at an edge angle between about 15 degrees and about 75 degrees relative to the board 1302 (underside). Therefore, the wall angle and the edge angle may be identical to each other, such that (i) at least some sections of the walls W1 (upper surface) or the walls W2 (upper surface) and (ii) at least some sections of the edge portion 1314 appear as a single sloped uniform incline, as visible in a lateral profile view of the board shown in FIG. 13. The edge portion 1314 may be omitted or the edge portion 1314 may extend on a section of the board 1302. For example, if the board 1302 has a rectangular shape when viewed from above while exposed and facing the dome 1304, then and the board 1302 may have a major side (length) and a minor side (width). As such, the edge portion 1314 may be present on one or both major sides or one or both minor sides, whether in a forward direction of traffic or a reverse direction of traffic. For example, since the walls W1 or the walls W2 may be designed to protect the dome 1306, the walls W1 or the walls W2 may be shaped at a same angle with the edge portion 1314. Therefore, when exposed to horizontal loads, the walls W1, the walls W2, or the edge portion 1314 may this impact to a lateral side, tangentially, thereby further protecting the dome 1306 or the board 1302.

If the board 1302 hosts the camera 1304, the dome 1306, and at least one of the walls W1 or the walls W2, then such configuration may be useful when at least one of the walls W1 or the walls W2 may be exposed to a horizontal load (e.g., a rotary brush of a street sweeper, a snowplow of a vehicle). For example, the first air gap or the second air gap may enable a rotary brush of a street sweeper to pass through the first air gap or the second air gap, thereby better protecting the board 1302 or the dome 1304. Likewise, if the board 1302 may have the edge portion 1314 that may be inclined (e.g., sloped) to be co-aligned with at least one of the walls W1 (upper surface) or the walls W2 (upper surface), i.e., the walls W1 or the walls W2 are shaped to be commonly angled with the board 1302 (upper surface), then such configuration may enable an impact of a snowplow of a vehicle to be laterally guided, tangentially, thereby better protecting the board 1302 or the dome 1304.

The board 1302 has the underside 1312 being flat, regardless of surface texture (e.g., smooth, rough, knurled). For example, the board 1302 may have no stems extending therefrom, as described above. As such, the board 1302 may be restable on a road (e.g., asphalt, concrete, gravel, pavers, grass, dirt) facing the underside 1312 when the undercarriage moves over the first pair of walls W1 and the second pair of walls W2. This configuration does not requiring modifying (e.g., boring, drilling, digging, milling, deepening) the road to install the board 1302, which may be less time-consuming, less laborious, or more justified for temporary use. For example, a technician may install the board 1302 on the road in about 60 minutes or less and uninstall the board 1302 from the road in about 60 minutes or less. If needed, then the board 1302 may be attached to the road. There are several ways this may occur. For example, since the board 1302 has the set of alcoves 1316, each having a bore therethrough, the board 1302 may be attached to the road via a set of anchors (e.g., fasteners, bolts, screws, nails, stakes) extending (e.g., by fastening, hammering, inserting) through the set of bores, past the underside 1312, into the road such that the set of anchors is enabled to anchor the board 1302 to the road to enable the undercarriage move over the first pair of walls W1 and the second pair of walls W2. For example, the edge portion 1314 may be beveled, chamfered, filet, or sharp and have the set of alcoves 1316 with the set of bores through which the board 1302 is fastened to the road by the set of fasteners when the board 1302 is installed on the road. However, if structural modification with the road is not desired, then there may be an adhesive (e.g., a glue, a weather resistant glue, an industrial glue) adherable to the underside 1312 and the road such that the adhesive adheres the board 1302 to the road to enable the undercarriage move over the first pair of walls W1 and the second pair of walls W2. Note that the set of alcoves 1316 is distributed along the edge portion 1314, equally per side. However, note that this configuration is not required. For example, the edge portion 1314 may be omitted or the set of alcoves 1316 may not be distributed along the edge portion 1314 or the set of alcoves 1316 may distributed unequally per side, whether evenly or oddly. Further, although each alcove in the set of alcoves 1316 has a semi-stadium shape when viewed from above, this form of shaping may vary. For example, some alcoves in the set of alcoves 1316 may have a stadium shape, an oval shape, a rectangular shape, a circular shape, a U-shape, a C-shape, or another suitable shape, whether open or closed, whether symmetrical or asymmetrical.

The dome 1304 may constitute a volume of borosilicate glass, whether alone or with other ingredients, whether as a majority ingredient or a minority ingredient. As such, this configuration has been found to enable the dome 1304 to be (i) more resistant to thermal shock than a conventional glass or plastic, (ii) more resistant to scratches and abrasion than a conventional glass or plastic, and (iii) more transparent and optically transmissive than a conventional glass or plastic, especially when the device 1300 is used in rough environments or outdoors.

The dome 1304 may be detachably attachable or attachably detachable to and from the board 1302, without uninstalling the board 1302 from the road when the board 1302 may be installed on the road or taking the board 1302 apart (e.g., disassembly) when the board 1302 may be installed on the road. For example, the dome 1304 may have (i) a fastening (e.g., threading) portion, (ii) a male or female connector, or (iii) a magnetic surface, such that the dome 1304 may be detachably attachable or attachably detachable to and from the board 1302 by respective fastening, mating, or magnetizing. Therefore, the dome 1304 may be installed, uninstalled, replaced, or swapped to and from the board 1302, without uninstalling the board 1302 from the road when the board 1302 may be installed on the road, whether by anchoring, adhering, or another suitable form of securement to the road, or taking the board 1302 apart (e.g., disassembly) when the board 1302 may be installed on the road, whether by anchoring, adhering, or another suitable form of securement to the road, especially when the device 1300 is used in rough environments or outdoors.

Figure 14:
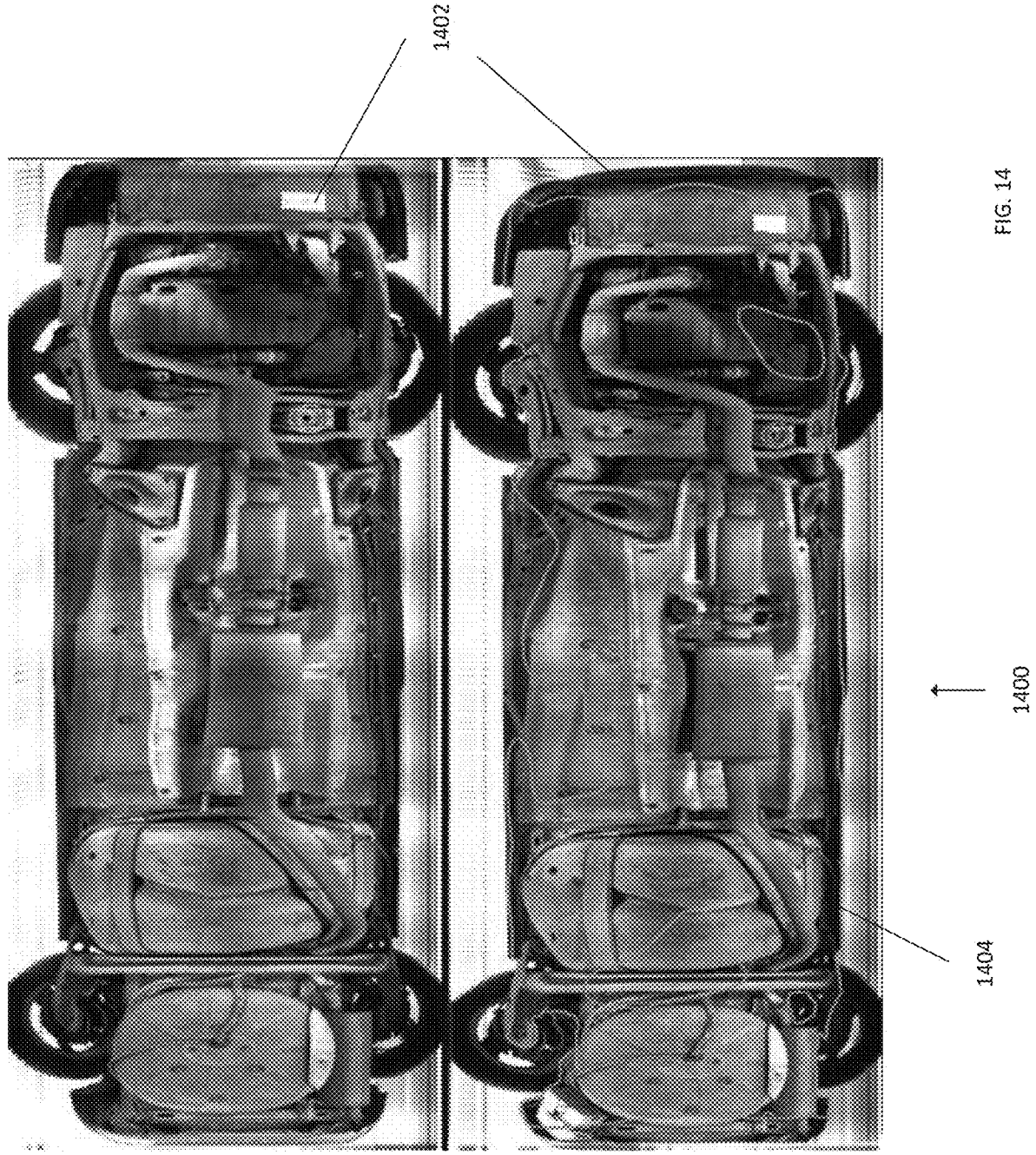
FIG. 14 shows an embodiment of a composite image depicting an undercarriage of a vehicle and a set of overlays for a set of suspicion zones as identified by a server superimposed over the composite image according to this disclosure.
Figure 15:
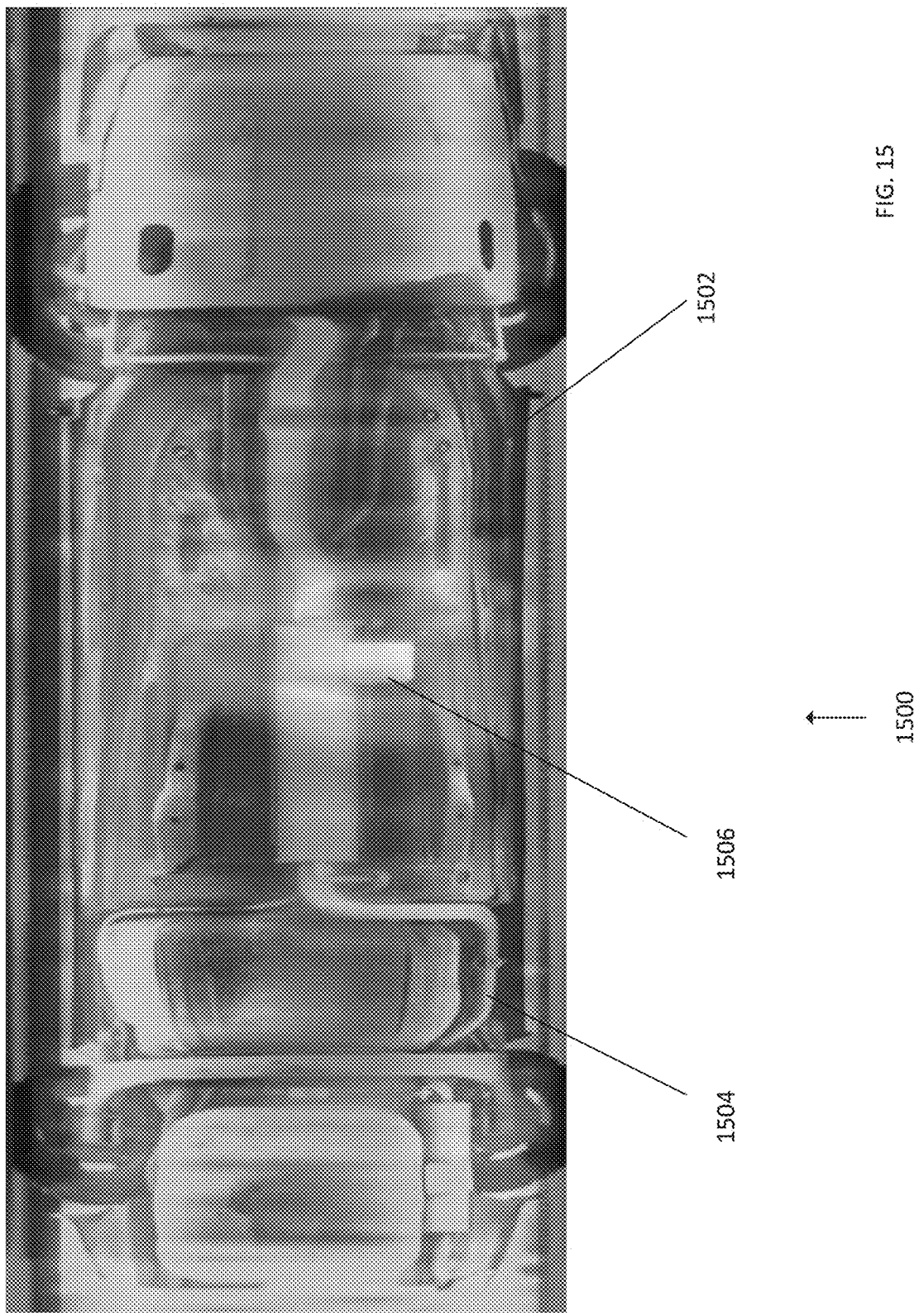
FIG. 15 shows an embodiment of a composite image depicting an undercarriage of a vehicle and a map of a magnetic field superimposed over the composite image according to this disclosure.

FIG. 14 shows an embodiment of a composite image depicting an undercarriage of a vehicle and a set of overlays for a set of suspicion zones as identified by a server superimposed over the composite image according to this disclosure. FIG. 15 shows an embodiment of a composite image depicting an undercarriage of a vehicle and a map of a magnetic field superimposed over the composite image according to this disclosure. In particular, there may be a board hosting a camera, a set of light sources, and a magnetic sensor, each in communication with a processing unit (e.g., a controller, a server, a workstation), whether serially or in parallel. For example, the board may have the magnetic sensor embedded therein (e.g., fastened, mated, adhered), such that the magnetic sensor is powered, similar to the camera, as described above. For example, the board may have a top side through or from which the magnetic sensor senses. For example, the board may have a set of magnetic sensors embedded (e.g., internally, externally) therein, including the magnetic sensor, configured as described herein. Regardless, the magnetic sensor may sense for an area of an undercarriage of a vehicle, where the area may have an increased magnetic field anomalous to a preset baseline (e.g., a template, a default map, a default value), while the camera images the undercarriage, which may be through a dome, as illuminated by the set of light sources, as described above. The magnetic sensor may send a set of readings to the processing unit and the camera may send an imagery (e.g., a set of images) to the processing unit, while the processing unit controls the set of light sources.

Since an explosive, an item of contraband, and another foreign object may be magnetically attached to the undercarriage or other metal parts of the vehicle, but be hidden or camouflaged from or not visible to the camera, the processing unit may be programmed to perform a set of actions. The processing unit may receive the imagery from the camera, where the imagery depicts the undercarriage, which may be through the dome, as illuminated by the set of light sources, which may occur when the undercarriage moves over the first pair of walls W1 or the second pair of walls W1, as described above. The processing unit may stitch the imagery such that a composite image 1400 is formed, as described above. As shown in FIG. 14, the composite image 1400 shows an undercarriage depiction 1402, where the composite image 1400 is marked or augmented with a set of markings or augmentations 1404 that are treated as suspicious, as described above. The processing unit may access a set of readings from the magnetic sensor, which may occur when the undercarriage moves over the first pair of walls W or the second pair of walls W2, as described above. The processing unit may form a magnetic field map based on the set of readings. As shown in FIG. 15, a screen 1500 of a user interface for an operator, as described above, shows a composite image 1502 and a magnetic field map 1504 superimposed or overlaid over the composite image 1502 when the magnetic field map 1504 and the composite image 1502 are simultaneously presented. The screen 1500 depicts a zone 1506 with a magnetic field higher than the preset baseline, such that the zone 1506 is visually distinct relative other zones in the magnetic field map 1504 that are at or lower than the present baseline. The zone 1506 may be visually distinct relative the other zones in the magnetic field map 1504 by color-coding. Therefore, the processing unit may enable the magnetic field map 1504 to be superimposed or overlaid over the composite image 1502 when the magnetic field map 1504 and the composite image 1502 are simultaneously presented on an electronic display of a computing terminal (e.g., a desktop computer, a laptop computer, a tablet computer, a wearable computer) associated with the board.

Figure 16:
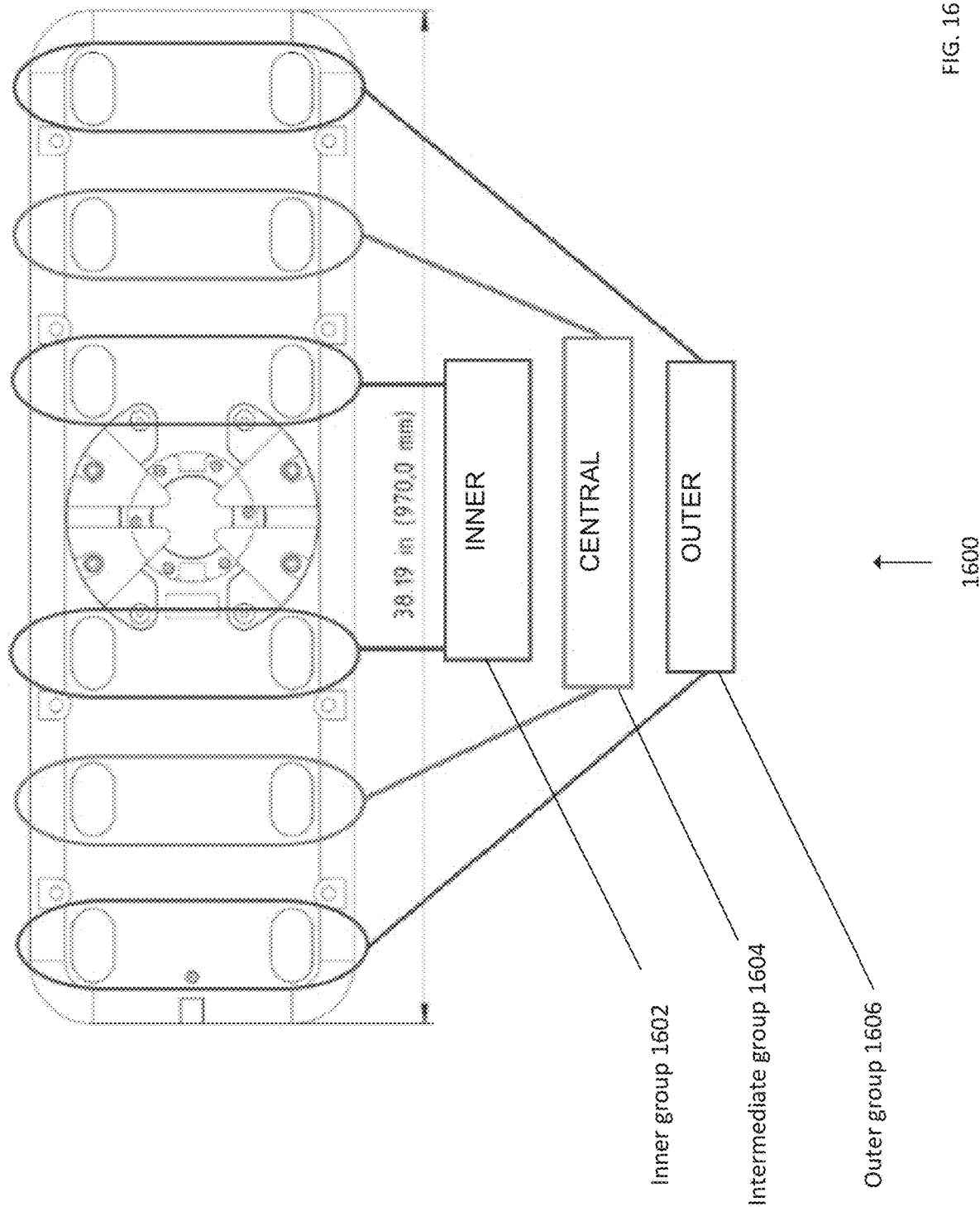
FIG. 16 shows an embodiment of a board hosting a set of groups of light sources according to this disclosure.

FIG. 16 shows an embodiment of a board hosting a set of groups of light sources according to this disclosure. In particular, there may be a board hosting a camera and a set of light sources 1600 to illuminate the undercarriage for the camera to image the undercarriage. The board may host a set of wells and a set of covers (e.g., transparent, frosted, translucent) covering the set of wells, where some or each well in the set of wells may be frustum-shaped or cone-shaped, although other shaping is possible (e.g., cuboid). The set of wells hosts the set of light sources 1600, such that the set of light sources 1600 illuminates the undercarriage through the set of covers, which may occur when the undercarriage approaches or moves over the walls W1 and the walls W2. The set of light sources 1600 may contain a first subset of light sources and a second subset of light sources. If the camera is covered by a dome hosted by the board, then the dome may extend between the first subset of light sources (e.g., left) and the second subset of light sources (e.g., right), as shown in FIG. 16. Some or each of the first subset of light sources and the second subset of light sources may include an inner group of light sources 1602 that oppose each other (e.g., along major sides) and illuminate simultaneously, an intermediate group of light sources 1604 that oppose each other (e.g., along major sides) and illuminate simultaneously, and an outer group of light sources 1606 that oppose each other (e.g., along major sides) and illuminate simultaneously. Therefore, some or each of the first subset of light sources and the second subset of light sources may have the central group of light sources 1604 positioned between the inner group of light sources 1602 and the outer group of light sources 1606. The inner group of light sources 1602, the intermediate group of light sources 1604, and the outer group of light sources 1606 may illuminate independent of each other, as controlled by a processing unit (e.g., a controller), although at least two of the inner group of light sources 1602, the intermediate group of light sources 1604, or the outer group of light sources 1606 may illuminate simultaneously with each other. Therefore, this modality of illumination improves lighting for the camera to image the undercarriage, because there are multiple independent backlight zones enabled. Note that there can be less than three backlight zones, where one of the inner group of light sources 1602, the intermediate group of light sources 1604, or the outer group of light sources 1604 is omitted, or there can be more than three backlight zones (e.g., four, five, six, seven, eight, nine, ten, tens) where an extra zone may be added to further granularly add even more precise illumination. Regardless, by having such multiple backlight zones, there is an enablement of a uniform illumination of the undercarriage, thereby minimizing or avoiding overexposure or insufficient lighting. Since the camera may be positioned along a center of axis of movement (forward or backward) for the undercarriage and different portions of the undercarriage (e.g., wheel well portions, body edge portions) may have different distances from the camera, those portions of the undercarriage closer (e.g., about two feet or less) to the camera may need less illumination and those portions of the undercarriage further (e.g., between about five feet and about two feet) from the camera may need more illumination. As such, by having the multiple backlight zones, the uniform illumination of the undercarriage is enabled, thereby minimizing or avoiding overexposure or insufficient lighting. Therefore, variable illumination (under-illumination or over-illumination) of the undercarriage is minimized and correspondingly there may be les interference with imaging by the camera or image processing on imagery received from the camera.

Figure 17:
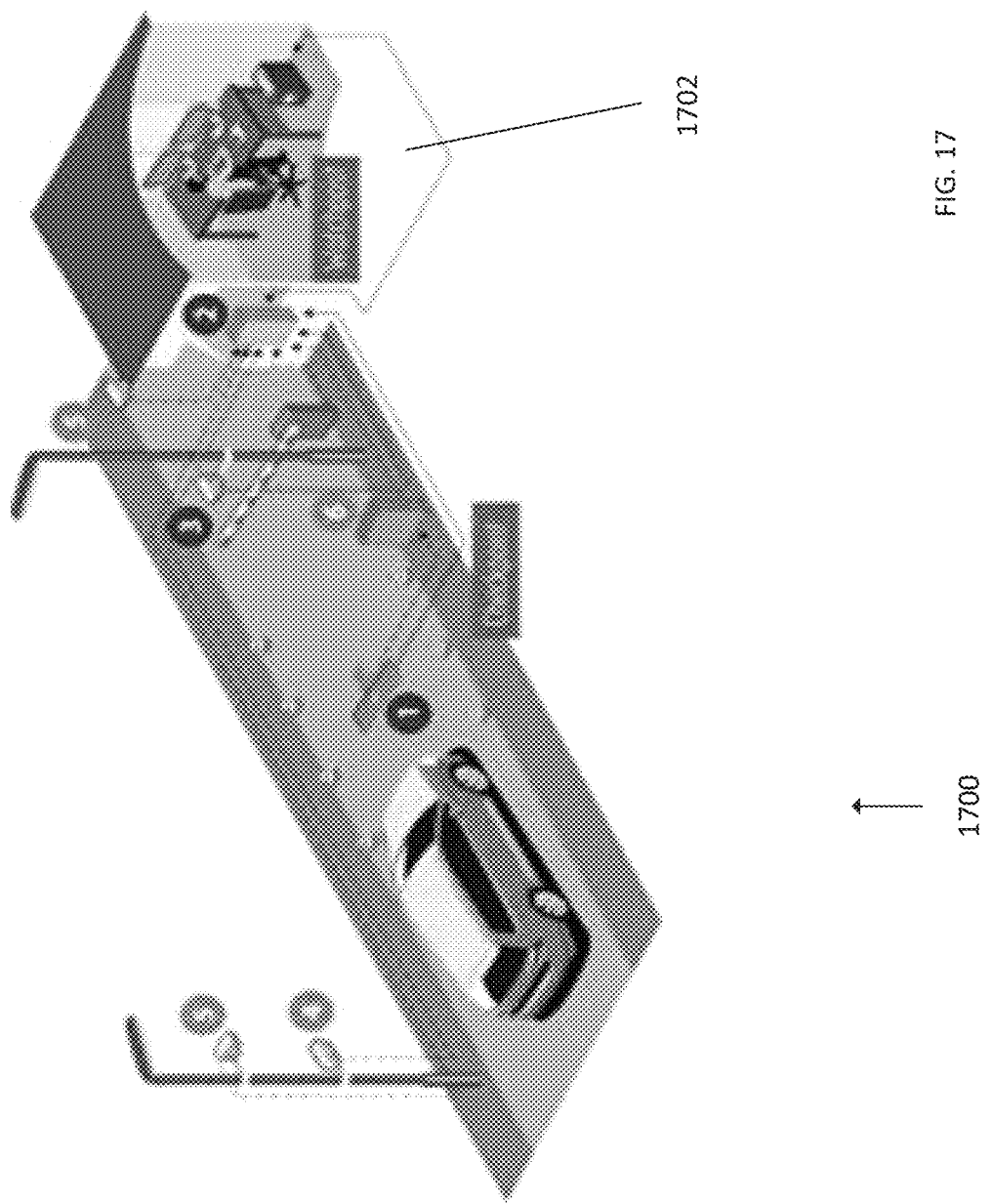
FIG. 17 shows an embodiment of a system with a local operator according to this disclosure.
Figure 18:
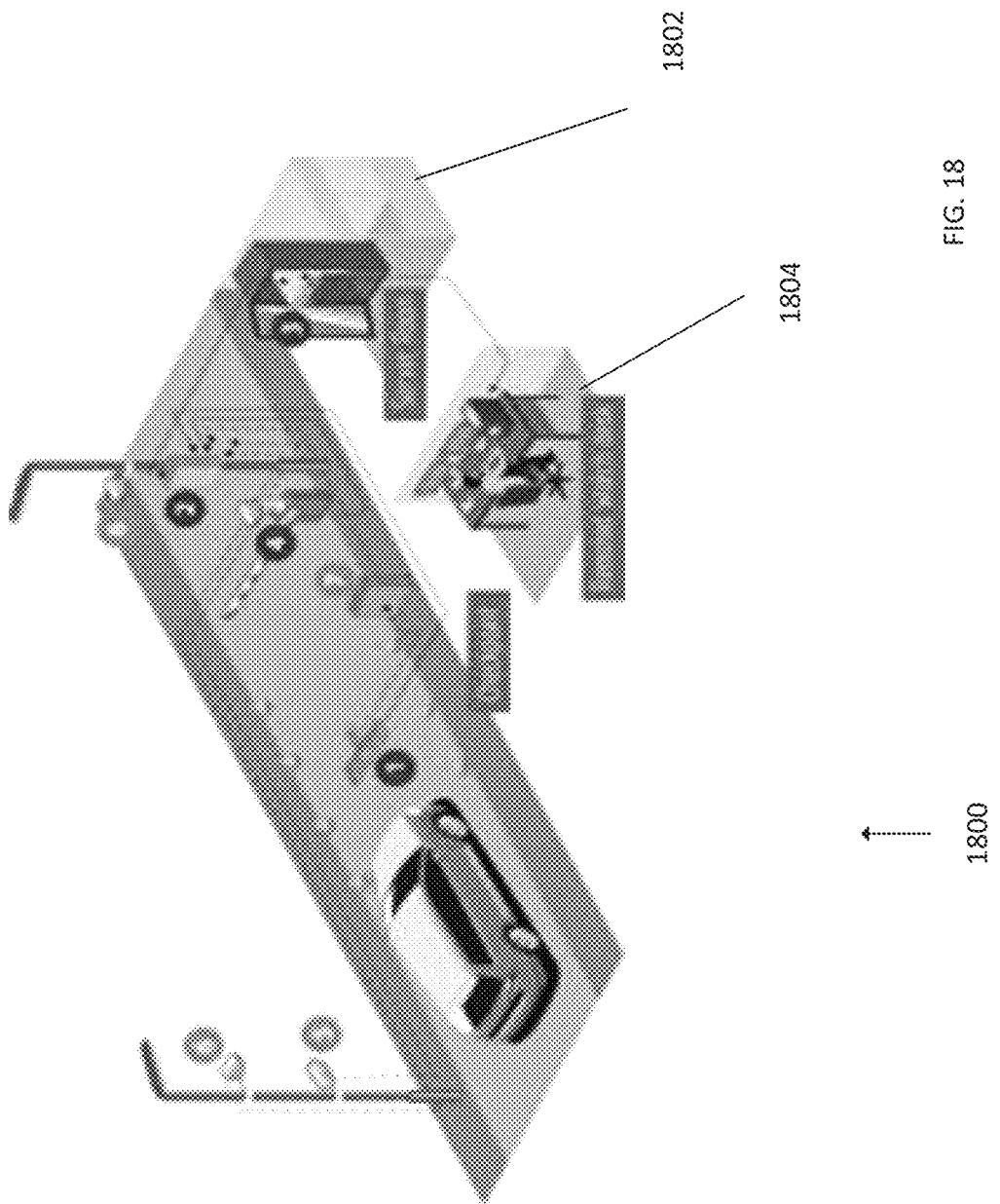
FIG. 18 shows an embodiment of a system with a remote operator according to this disclosure.

FIG. 17 shows an embodiment of a system with a local operator according to this disclosure. FIG. 18 shows an embodiment of a system with a remote operator according to this disclosure. In particular, there is a system 1700 and a system 1800, each of which may be a hardware-software complex designed for remote under-vehicle surveillance, to identify objects that are not part of a vehicle's structure. This complex may enable detection of prohibited items, and assessment of a condition of the undercarriage while maximizing personnel safety during an inspection procedure and minimizes an influence of a human factor on its results. This complex may generates high-quality images of various types of vehicles' bottoms: from passenger cars to trucks, simultaneously with automatic license plate recognition, and logs information in a database (e.g., local, remote, relational, NoSQL, in-memory, object, graph). This complex may have an application range that includes a detection of objects that are not part of the undercarriage ("stashes"): contraband, explosives, weapons, and other prohibited items, as well as checking the undercarriage for damage. This complex may be compact and installed where vehicle inspection and control may be desired. This complex may operate separately or be part of a comprehensive security system. This configuration allows for creation of distributed monitoring, control, and access control solutions. This complex may enable various features. For example, some of these features may include a formation of a composite image of the undercarriage in high resolution with reference to a recognized (e.g., optically) license plate associated with the undercarriage. Further, some of these features may include a formation of a reference vehicle's bottom images library for a comparative assessment of a current state of the undercarriage. Additionally, some of these features may include logging of data on each vehicle passage with a possibility to view data on vehicle passages and corresponding video clips from various cameras of a control line/checkpoint-separately or synchronized in time; search by license plate, a control line/checkpoint (e.g., if there is a distributed system consisting of several complexes), time period or date, make and model of the car (e.g., when an artificial neural network (ANN) classifier is activated); generate reports with filtering by desired parameters; or integration into a security system based on a preexisting video management platform (e.g., SecurOS). This complex may be used in industrial enterprises, critical infrastructure and restricted access facilities, customs control and border management, state institutions, vehicle checkpoints at airports or seaports, cultural and sports venues, public or private parking areas, and other suitable areas. This complex may operate on basic principles involving (i) a board (e.g., a platform) with a first camera (for imaging the undercarriage), (ii) a second camera (for recognizing a license plate number), and a controller, each as disclosed herein. Therefore, this complex may detect (e.g., optically) a vehicle having an undercarriage and hosting a license plate with a registration identifier approaching the board, turns on its backlight (e.g., a set of light sources), and switches to a scanning mode, as described above. Then, the second camera may capture the license plate with the registration identifier before the undercarriage is imaged by the first camera and enable the controller to recognize the registration identifier, which may be before the undercarriage is imaged by the first camera. Then, when the vehicle is moving over the board, the first camera images the undercarriage (e.g., a linear digital scan) and a scan (e.g., a linear digital scan) is performed and individual video frames of the undercarriage are transmitted to the controller, which forms a composite image of the undercarriage. Then, the composite image and the registration identifier, as recognized, are saved in the database. There may be sampling from an archive of a reference (baseline or template) image (if available), and forming a video archive from cameras of the complex simultaneously. Then, there may be a result generated based on processing the composite image or other imagery captured by the cameras of the complex. The result may be presented in a user interface on a display of a computing terminal (e.g., a desktop computer) operated by an operator. The user interface may allow the operator to view fragments of live and archived video from the cameras of the complex, look through processing results of previous passes associated with the registration number, as recognized, or check the composite image with the "reference" image.

The system 1700 forms a checkpoint (e.g., compact, weatherproof)) and is enabled for a local inspection to be monitored by a post 1702. The system 1700 includes a board 1 with a first camera (for undercarriage imaging), a controller 2, a second camera 3 (for license plate imaging or surveillance), a third camera 4 (for license plate imaging or surveillance), a fourth camera 5 (for license plate imaging or surveillance), and a cleaning unit 6 (for dome). The system 1800 forms a checkpoint (e.g., compact, weatherproof) and is enabled for remote inspection (e.g., geographic distributed) to be monitor a post 1804 via a computing unit 1802. The system 1800 differs from the system 1700 in various ways. For example, the system 1800 a board 1 with a first camera (for undercarriage imaging), a switching cabinet 2, a controller 3, a second camera 4 (for license plate imaging or surveillance), a third camera 5 (for license plate imaging or surveillance), a fourth camera 6 (for license plate imaging or surveillance), and a cleaning unit 7 (for dome). The computing unit 1802 may contain the controller 3. As such, the post 1804 may be remote to the computing unit 1802, the board 1, the switching cabinet 2, the second camera 4, the third camera 5, the fourth camera 6, and the cleaning unit 7. For example, the post 1804 may monitor a set of systems 1800. For example, the controller 3 may be in a rack-mounted version for mounting in a cabinet (e.g., between about 10 inches and about 30 inches in height). When provided to a user, the system 1700 or the system 1800 may include a set of inter-block cables but additional cabling or networking gear (e.g., optical crosses, switchboard) may be needed, depending on use case. In some use cases, there may be a communication channel between the board 1 and the controller 3 that may be isolated from extraneous network traffic. Regardless of whether the system 1700 or the system 1800 being used, there is an application program (e.g., SecurOS video management platform) that enables or performs video surveillance and video recording, as well as provides management of the system 1700 or the system 1800, generation of reports, and export of travel data. The application program may have an application programming interface (API) which enables at least some compatibility or integration with third-party devices and systems. The application program may form the composite image and a map of magnetic anomalies and present same in a user interface to an operator, as described above. The application program may be programmed (e.g., by having a video analytics module) to detect an approaching vehicle and recognition of its license plate.

Figure 19:
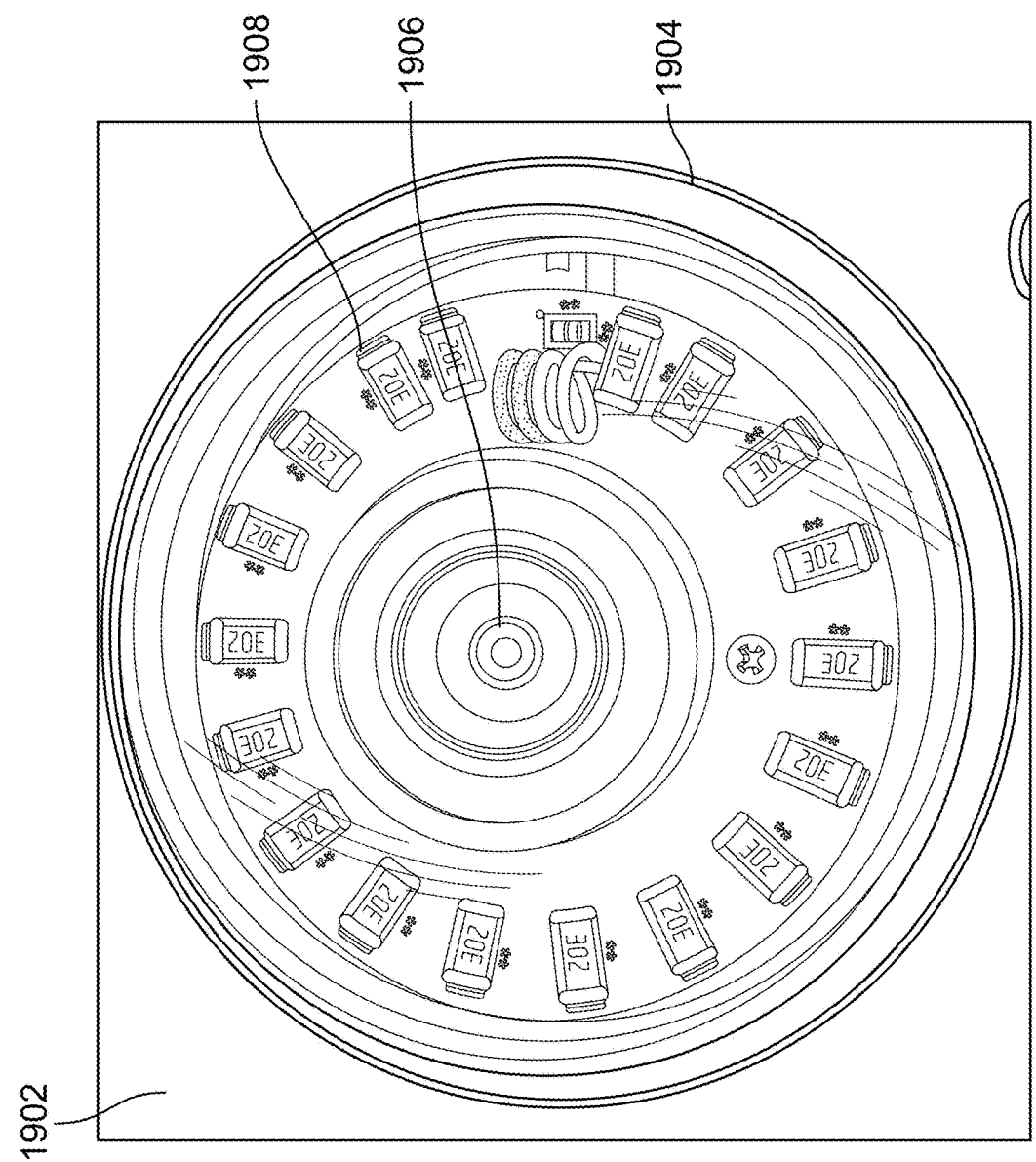
FIG. 19 shows an embodiment of a heater enclosed by a dome hosted by a board according to this disclosure.

FIG. 19 shows an embodiment of a heater enclosed by a dome hosted by a board according to this disclosure. In particular, there is a device 1900 having a board 1902, a dome 1904, a camera 1906, and a heater 1908. The board 1902, the dome 1904, and the camera 1906 may be configured as described above. For example, the camera 1906 may be optical. For example, the dome 1904 may constitute a volume of borosilicate glass, whether alone or with other ingredients, whether as a majority ingredient or a minority ingredient. Regardless, the board 1902 hosts the dome 1904, the camera 1906, and the heater 1908. The dome 1904 encloses the camera 1906 and the heater 1908. The heater 1908 may be positioned in operative proximity to the dome 1904 (e.g., within about 1 inch or less), whether avoiding contact therewith or contacting therewith. The heater 1908 extends about the camera 1906, while the dome 1904 encloses the camera 1906 and the heater 1908. For example, the heater 1908 may be closed-shaped or open-shaped, whether symmetrical or asymmetrical, to extend around the camera 1906. For example, the heater 1908 may be U-shaped, C-shaped, O-shaped, D-shaped, or other suitable shapes to extend around the camera 1904. For example, the heater 1908 may include a single heating element (e.g., a coil, a film, a coating) or a set of heating elements (e.g., a group of coils or films or coating in series or in parallel configuration) extending, positioned, or distributed about the camera 1906, underneath the dome 1904. Note that the heater 1908 may extend past the dome 1904 when enclosed by the dome 1904 while being sufficiently protected from breakage (e.g., vehicular impact, animals) or avoid being enclosed by the dome 1904 while being sufficiently protected from breakage (e.g., vehicular impact, animals). For example, the heater 1908 may be positioned in operative proximity to the dome 1904 (e.g., within about 1 inch or less), whether avoiding contact therewith or contacting therewith, external to the dome 1904. The heater 1908 may be configured for outdoor deployment (e.g., suitable for snow, rain, sunlight, animals).

The dome 1904 may be heated by the heater 1908 when the heater 1908 is active, by generating heat. The heater 1908 may generate heat by a joule heating technique, a Peltier effect technique, or another suitable technique. The heater 1908 may be active when powered similar to the camera 1906 to provide some heat to the dome 1904, to minimize ice formation or snow accumulation on the dome 1904. For example, such heat may enable the dome 1904 to reach or remain above water freezing temperatures. For example, the dome 1904 may be heated via a conduction process whereby the heater 1908 contacts the dome 1904 or via a convection process whereby the heater 1908 heats a volume of gas (e.g., air, noble gas) enclosed by the dome 1904 above the camera 1906, each while minimizing interference with imaging performed by the camera 1906, as described above. For example, the board 1902 may host a blower (e.g., a fan) to move (e.g., circulate) the volume of gas underneath the dome 1904 when the volume of gas is heated by the heater 1908, which may enable uniform heating of the dome 1904. The heater 1908 may generate some heat at a uniform level, although the heater 1908 may be configured to generate some heat at a variable level as well. For example, there may a controller, as described above, which may vary (e.g., adjust) levels of heat generation output by the heater 1908, when the heater 1908 is configured accordingly.

The heater 1908 may be manually controlled in various ways. For example, the board 1902 may host a user interface (e.g., a button, a switch, a dial, a lever) to activate or deactivate the heater 1908. For example, the heater 1908 may activate or deactivated by a controller operated via an operator through a user interface presented on a computing terminal, as described above.

The heater 1908 may be automatically controlled in various ways. For example, the heater 1908 may be activated or deactivated by a controller following a schedule (e.g., a timer), which may be set or updated by an operator, whether manually (e.g., at the board 1902) or through a user interface presented on a computing terminal, as described above. For example, the heater 1908 may be activated or deactivated by a controller based on an input (e.g., a reading) from a sensor (e.g., digital, analog) in communication (e.g., wired, wireless, waveguide) with the controller. For example, the sensor may sense a physical phenomenon (e.g., temperature, wind, moisture, atmospheric pressure, light, darkness) based on which the controller activates or deactivates the heater 1908, as described above. For example, the board 1902 may host the sensor (e.g., embedded, fastened, mated, adhered, magnetized) or the sensor may be positioned off the board 1902, but local or in operative proximity to the board 1902 (e.g., under about 20, 19, 18, 17, 16, 15, 14, 13, 12, 11, 10, 9, 8, 7, 6, 5, 4, 3, 2, 1 feet or less), although the sensor may also be remote to the board 1902 (e.g., a weather station, an internet-based weather data feed). For example, the board 1902 may host (e.g., internally, externally) the sensor external to the dome 1904. For example, the board 1902 (e.g., its sidewall) may host the sensor to minimize vehicular damage or inaccurate readings thereof (e.g., to minimize exposure to sunlight). For example, the sensor may be buried in a road on which the board 1902 is installed, attached to the road (e.g., adhered, fastened), raised off the road, or attached (e.g., fastened, mated) to a structure adjacent to the road (e.g., a utility pole, a fence, a gate, a booth). The sensor may be powered similar to the camera 1906 or the heater 1908. For example, the sensor may be powered by a mains powerline or a battery, which may be rechargeable. For example, the sensor may be a thermometer and the physical phenomenon may be a temperature (e.g., outdoor, indoor), although other suitable types of sensors or physical phenomena are possible (e.g., wind, rain). For example, the sensor may measure when the temperature reaches a predetermined threshold (e.g., below about 35 degrees Fahrenheit) or within a predetermined range (e.g., between about 37 degrees Fahrenheit and about-50 degrees Fahrenheit) and communicate (e.g., periodically, continuously) such measurements to a controller, which may be programmed to activate or deactivate the heater 1908 based on such measurements. For example, if the heater 1908 is configured to vary in heat generation, then there may be a controller which adjusts the heater 1908 to vary in such heat generation based on the sensor measuring temperatures (or other measurements of natural phenomena) within corresponding temperature ranges (or other measurements of natural phenomena) or temperatures (or other measurements of natural phenomena) rising above or falling below certain temperature thresholds (or other measurements of natural phenomena). For example, rising temperatures (or other measurements of natural phenomena), as measured by the sensor, may have the controller lower levels of heat generated by the heater 1908, whereas falling temperatures (or other measurements of natural phenomena), as measured by the sensor, may have the controller raise levels of heat generated by the heater 1908. Therefore, by having the dome 1904 heated by the heater 1908, there may be less accumulation of rainwater, snow, or ice on the dome 1904, which minimizes interferences with imaging or image processing.

Figure 20:
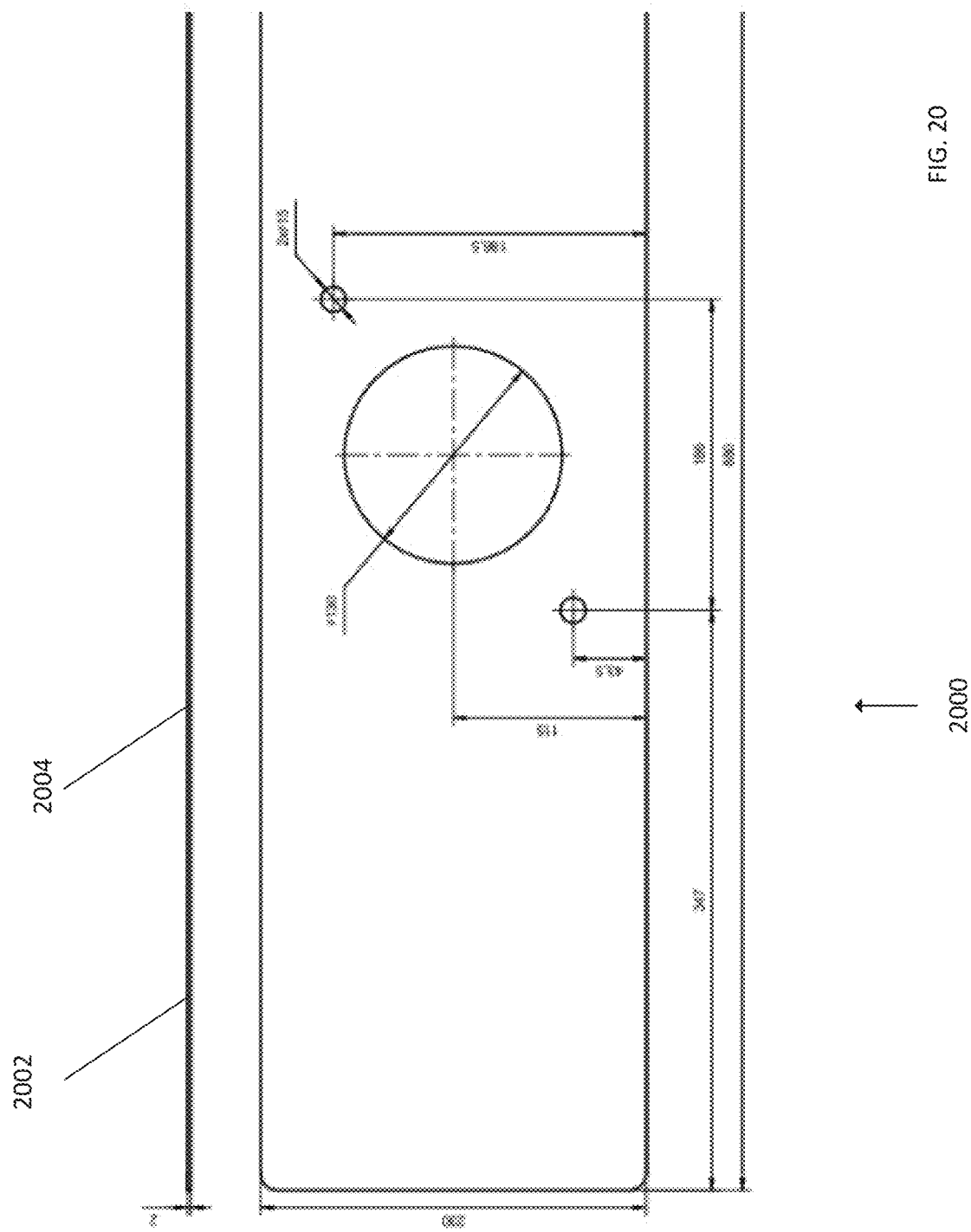
FIG. 20 shows an embodiment of a heating mat for placement underneath a board according to this disclosure.

FIG. 20 shows an embodiment of a heating mat for placement underneath a board according to this disclosure. In particular, there is a heating mat 2000 having a body 2002 and a heater 2004.

The body 2002 may be configured for outdoor deployment (e.g., suitable for snow, rain, sunlight, animals). For example, the body 2002 may constitute weatherized rubber or another suitable material. The body 2002 has a rectangular shape when viewed from above, although other shaping, whether symmetrical or asymmetrical, whether open-shaped or closed-shaped, are possible. For example, the body 2002 may be square, triangular, oval, circular, trapezoidal, pentagonal, octagonal, or other suitable shaping. Although the body 2002 has rounded corners, this configuration may be omitted (e.g., no corners, circular) or vary (e.g., acute corners).

The heater 2004 includes a single heating element (e.g., a coil, a film, a coating) or a set of heating elements (e.g., a group of coils or films or coatings in series or in parallel configuration), which may be powered similar to a camera or a heater, as described above, to generate heat. The heater 2004 may be configured for outdoor deployment (e.g., suitable for snow, rain, sunlight, animals).

The body 2002 hosts (e.g., internally, externally) the heater 2004. For example, the heater 2004 may be embedded in the body 2002. For example, the heater 2004 may be fastened, mated, adhered, magnetized, or otherwise suitably secured to the body 2002, while minimizing interference with imaging, as described above.

The body 2002 or the heater 2004 may be positioned on a road surface, underneath a board, as described above, such that the body 2002 or the heater 2004 extends (e.g., interposed) between the road and the board. The body 2002 or the heater 2004 may extend past the board (e.g., larger geometry), or stop at the board or less (e.g., same or smaller geometry) when viewed from above, each while being sufficiently protected from breakage (e.g., vehicular impact, animals). The body 2002 or the heater 2004 may contact the board. As such, when the board constitutes a thermally conductive material (e.g., aluminum) and the heater 2004 is generating heat, as described above, the body 2002 or the heater 2004 may conduct such heat to the board, which may maintain the board above freezing temperatures, to minimize snow accumulation or ice formation on the board. For example, when the board is installed on the road, the board may have an outer side (e.g., an upper surface, a sidewall) that is exposed to snow or rain, where the outer side may be heated to minimize snow accumulation or ice formation on the board.

The body 2002 or the heater 2004 may be configured to adapt with or minimize interference with operation of the board, as described above. For example, the body 2002 or the heater 2004 may be configured to accommodate various cables, harnesses, wires, straps, waveguides, or any other parts extending from the board.

The board may be heated by the heater 2004 when the heater 2004 is active, by generating heat. The heater 2004 may generate heat by a joule heating technique, a Peltier effect technique, or another suitable technique. The heater 2004 may be active when powered similar to a camera or a heater, as described above, to provide some heat to the board, to minimize ice formation or snow accumulation on the board. For example, such heat may enable the board to reach or remain above water freezing temperatures. For example, the board may be heated via a conduction process whereby the body 2002 or the heater 2004 contacts the board, while minimizing interference with imaging performed by a camera, as described above. The heater 2004 may generate some heat at a uniform level, although the heater 2004 may be configured to generate some heat at a variable level as well. For example, there may a controller, as described above, which may vary (e.g., adjust) levels of heat generation output by the heater 2004, when the heater 2004 is configured accordingly.

The heater 2004 may be manually controlled in various ways. For example, the heating mat 2000 may host a user interface (e.g., a button, a switch, a dial, a lever) to activate or deactivate the heater 2004. For example, the heater 2004 may activate or deactivated by a controller operated via an operator through a user interface presented on a computing terminal, as described above.

The heater 2004 may be automatically controlled in various ways. For example, the heater 2004 may be activated or deactivated by a controller following a schedule (e.g., a timer), which may be set or updated by an operator, whether manually (e.g., at the heating mat 2000) or through a user interface presented on a computing terminal, as described above. For example, the heater 2004 may be activated or deactivated by a controller based on an input (e.g., a reading) from a sensor (e.g., digital, analog) in communication (e.g., wired, wireless, waveguide) with the controller. For example, the sensor may sense a physical phenomenon (e.g., temperature, wind, moisture, atmospheric pressure, light, darkness) based on which the controller activates or deactivates the heater 2004, as described above. For example, the body 2002 may host (e.g., internally, externally) the sensor (e.g., embedded, fastened, mated, adhered, magnetized) or the sensor may be positioned off the body 2002, but local or in operative proximity to the body 2002 (e.g., under about 20, 19, 18, 17, 16, 15, 14, 13, 12, 11, 10, 9, 8, 7, 6, 5, 4, 3, 2, 1 feet or less), although the sensor may also be remote to the body 2002 (e.g., a weather station, an internet-based weather data feed). For example, the body 2002 may externally host the sensor. For example, the body 2002 (e.g., its sidewall) may host the sensor to minimize vehicular damage or inaccurate readings thereof (e.g., to minimize exposure to sunlight). For example, the sensor may be buried in a road on which the heating mat 2000 is installed, attached to the road (e.g., adhered, fastened), raised off the road, or attached (e.g., fastened, mated) to a structure adjacent to the road (e.g., a utility pole, a fence, a gate, a booth). The sensor may be powered similar to a camera 1906 or a heater, as described above. For example, the sensor may be powered by a mains powerline or a battery, which may be rechargeable. For example, the sensor may be a thermometer and the physical phenomenon may be a temperature (e.g., outdoor, indoor), although other suitable types of sensors or physical phenomena are possible (e.g., wind, rain). For example, the sensor may measure when the temperature reaches a predetermined threshold (e.g., below about 35 degrees Fahrenheit) or within a predetermined range (e.g., between about 37 degrees Fahrenheit and about-50 degrees Fahrenheit) and communicate (e.g., periodically, continuously) such measurements to a controller, which may be programmed to activate or deactivate the heater 2004 based on such measurements. For example, if the heater 2004 is configured to vary in heat generation, then there may be a controller which adjusts the heater 2004 to vary in such heat generation based on the sensor measuring temperatures (or other measurements of natural phenomena) within corresponding temperature ranges (or other measurements of natural phenomena) or temperatures (or other measurements of natural phenomena) rising above or falling below certain temperature thresholds (or other measurements of natural phenomena). For example, rising temperatures (or other measurements of natural phenomena), as measured by the sensor, may have the controller lower levels of heat generated by the heater 2004, whereas falling temperatures (or other measurements of natural phenomena), as measured by the sensor, may have the controller raise levels of heat generated by the heater 2004. Therefore, by having the board heated by the heating mat 2000, there may be less interference with operation of an internal component (e.g., a camera) of the board, imaging or image processing, or traction of a vehicle hosting an undercarriage moving on the board.

Figure 21:
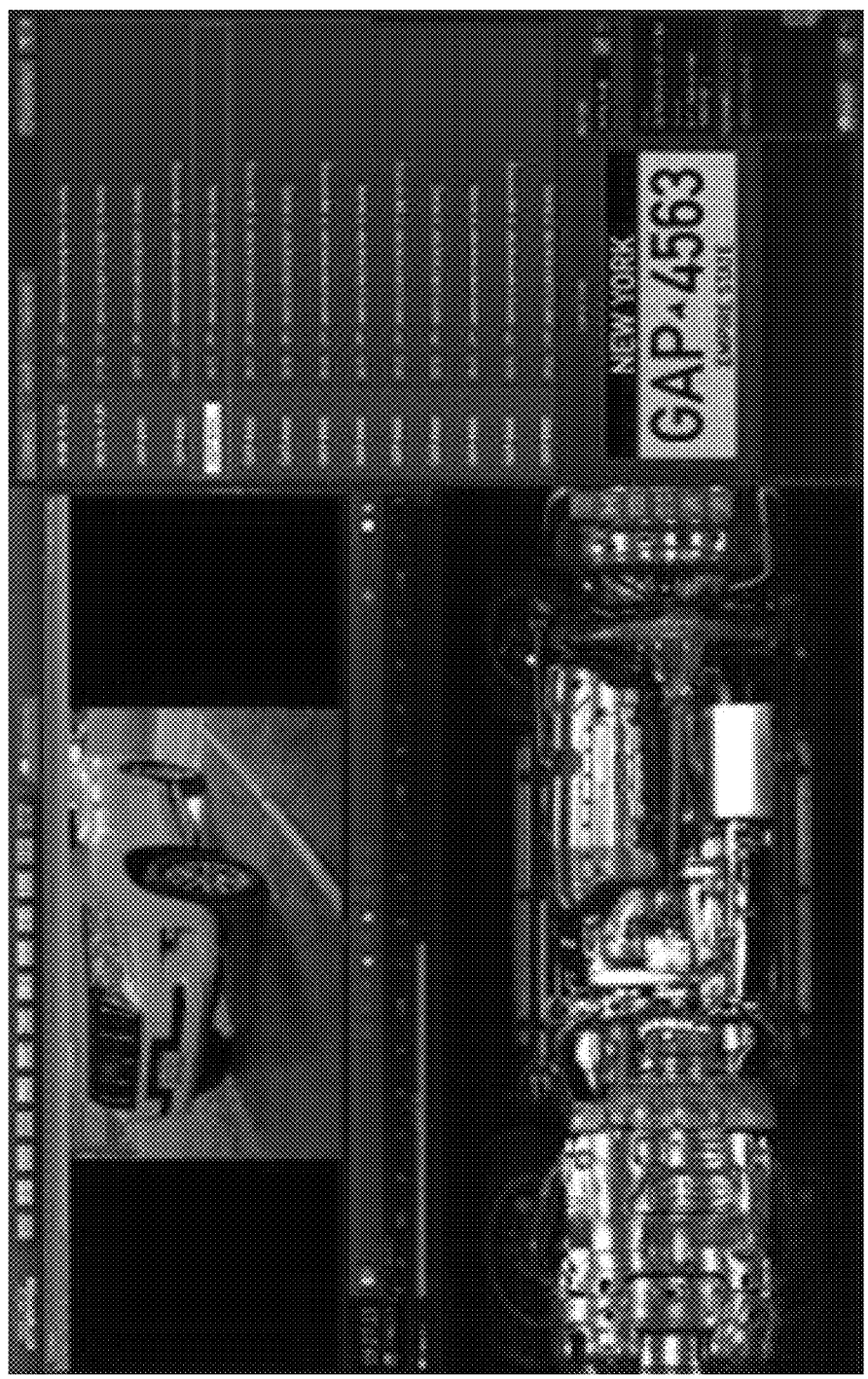
FIG. 21 shows an embodiment of a menu for an operator according to this disclosure.

FIG. 21 shows an embodiment of a menu for an operator according to this disclosure. In particular, there is a screenshot 2100 depicting a menu of a graphical user interface displayed on a computing terminal of an operator, as described above. The menu contains a first pane (upper left) presenting a front portion of a vehicle hosting a license plate with a registration identifier, as sourced from a camera on an structure (e.g., a post, a booth, a gate), as described above. The menu contains a second pane (lower left) presenting a composite image of an undercarriage of the vehicle formed based on an imagery from a camera on a board over which the vehicle passes, as describe above. The menu contains a third pane (upper right) presenting a log of passes past this checkpoint. The menu contains a fourth pane (lower right) presenting an image frontally depicting the registration identifier recognized (e.g., via an optical character recognition (OCR) process) based on a territorial template, along with other relevant information.

Figure 22:
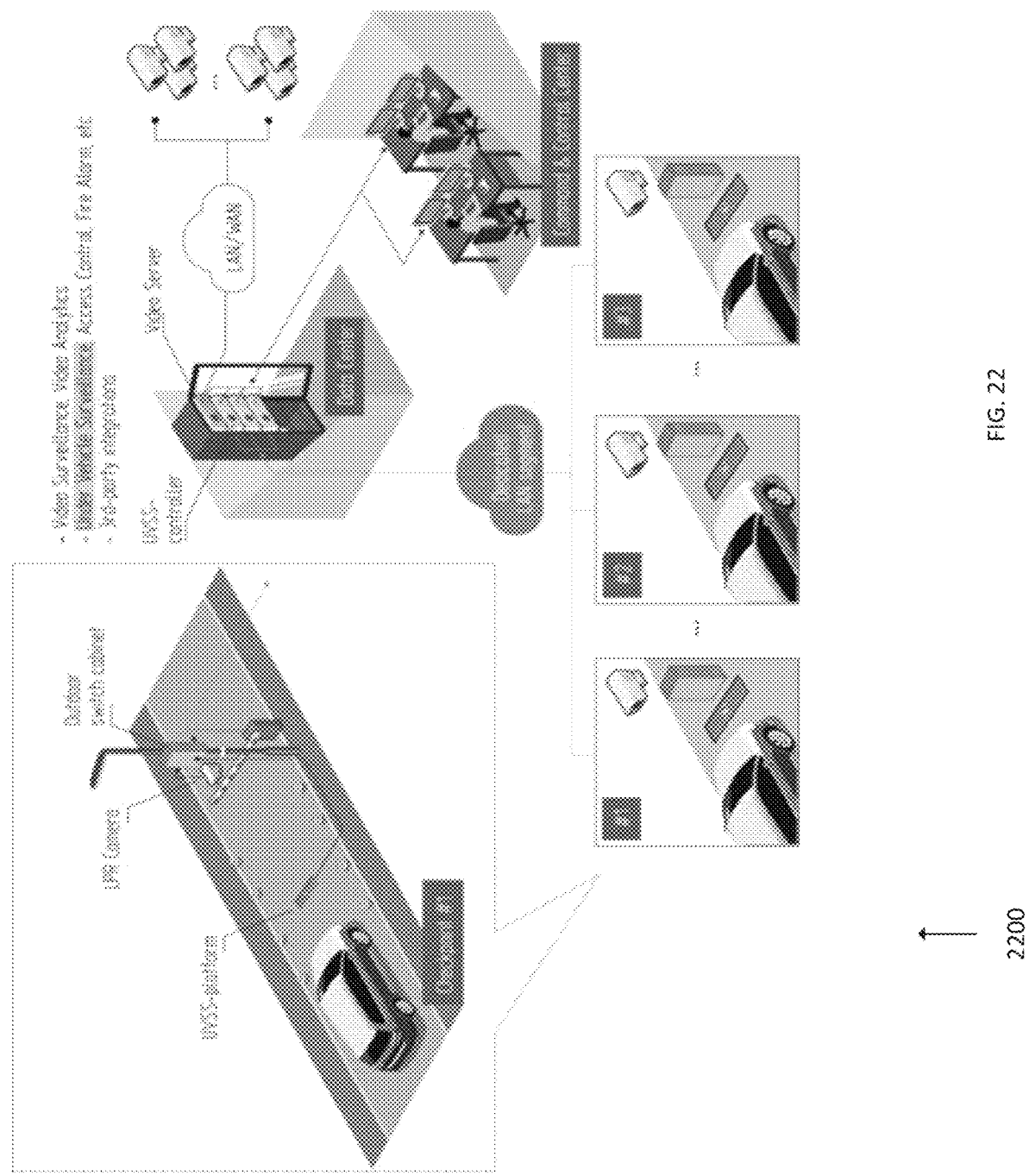
FIG. 22 shows an embodiment of a network topology for a system according to this disclosure.

FIG. 22 shows an embodiment of a network topology for a system according to this disclosure. In particular, there is a system 2200 running a video management platform having a distributed solution architecture, which may enable various technological advantages. For example, the system 2200 may enable management and access to scan data from a server or a computing workstation of the security system. Likewise, if there are multiple imaging platforms (e.g., boards), as described above, then there may be scanned data which may be controlled by a single operator from a single computing workstation. Further, the system 2200 may have various functionality software modules, which may be enabled as needed or on-demand. For example, some of these software modules may enable face recognition (e.g., SecurOS FaceX), access control and fire alarm (e.g., SecurOS ACS), 2D maps, situational video analytics (e.g., SecurOS Computer Vision), other suitable modules.

As described above, the system 2200 may enable various technological advantages. For example, there may be high-quality undercarriage scanning, such as by enabling (i) a machine vision camera with high resolution and frame rate, (ii) an advanced 12-bit (or less or more) high dynamic range (HDR) processing system and an automatic backlight adjustment system with 12 (or less or more) LED (or other type of illumination) light sources ensure uniform images contrast in various light conditions, (iii) a vehicle to move at an even or uneven speed and stop over an imaging platform without substantially reducing image quality, (iv) a vehicle to move over a platform at a speed of about 30 kilometers per hour (although less or more is possible) with a ground clearance of 1000 millimeters (although less or more is possible), or (v) distortion compensation (or distortion elimination) and a formation of a resulting composite image. For example, there may various ways of working with data, such as by enabling (i) an imagery (e.g., photos, videos) depicting an undercarriage of a vehicle to be stored in a database (e.g., relational, NoSQL, object, graph, in-memory) together with a corresponding recognized license plate identifier, which allows a user to search and generate reports as needed, (ii) a composite image of an undercarriage of a vehicle to be saved as a reference (baseline or template) image, thereby allowing an operator or an imaging algorithm to compare a composite image obtained during a repeated passage with the reference image, to identify suspicious areas on the undercarriage, and determine whether to grant access to the vehicle, deny access to the vehicle, or initiate a call to a supervisor, (iii) a generation of travel reports, (iv) an export to an external data system, (v) a networking of imaging platforms with a centralized management and data management computing system, or (vi) a formation of maps of magnetic anomalies by magnetic field sensors of an undercarriage of a vehicle for viewing to an operator at a computing workstation from a single user interface. For example, there may be various easy ways to install and maintain the system 2200, such as by (i) minimizing time-consuming road construction work if an imaging platform fastens or adheres to a road surface, which may occur without drilling the road surface, (ii) having an imaging platform having a height of under about 3 inches (e.g., under about 2.9 inches, about 2.8 inches, about 2.7 inches) which may enable for passage of vehicles with low or ultra-low clearances above the imaging platform, (iii) an imaging platform having a streamlined shape (e.g., compact and easy to maintain) which may enable to protect a chassis of a vehicle from damage in case of accidental collision, (iv) a video management platform using a computer vision algorithm to detect a vehicle without installing a physical sensors to detect the vehicle, (v) an imaging platform being configured to have a high-strength design to be able to withstand a vehicle mass of about 30 tons (or less or more) in case of accidental collision or a vehicle mass of about 3 tons on a dome of an imaging platform, (vi) an imaging platform having its electronics protected (e.g., IP68) from dust, moisture, and various physical influences (e.g., animals), (vii) an imaging platform being designs for continuous all-season operation 24/7, (viii) an imaging platform being able to host a cleaning module (e.g., a nozzle assembly), (ix) an imaging platform having a high reliability due to an absence of moving parts, (x) an imaging platform being configured for an easy and quick replacement of an electronic unit at its installation site, or (xi) an imaging platforming lacking a need for a regular maintenance. For example, there may be ways to integrate an imaging platform into a video management system (e.g., SecurOS platform), such as by (i) having the video management system host a license plate recognition system programmed to recognize license plates from many territories (e.g., about 100 or more) or a vehicle brand, model, or color, (ii) scanning data from various imaging platforms to be controlled by a single operator from a single computing terminal by combining several imaging platforms complexes into a centralized system, (iii) being programmed for integration with adaptive traffic control systems (ACS), traffic lights, barriers, information scoreboard, as well as with top-level software, or (iv) being programmed for integration with programming interfaces and automation tools for implementation of individual or customized design solutions.

As described above (e.g., FIGS. 16-18), there may be a system having an imaging platform (e.g., a board hosting a dome, a camera, a first pair of walls, and a second pair of walls) and a camera that can image a front portion of a vehicle having a license plate hosting a registration identifier when the vehicle is approaching the imaging platform. As such, there may be a processing unit (e.g., a server, a controller, a computing terminal) that may be running an ANN to detect a make and a model of the vehicle based on such imagery captured by the camera. Therefore, the imaging platform may have a set of light sources, as described above, that may illuminate according to at least two preconfigured illumination modes, one for high-clearance vehicles and one for low-clearance vehicles, each as preset in advance, as shown in FIGS. 24A to 24D. Resultantly, to maximize uniform illumination of an undercarriage of the vehicle, minimize illumination overexposure, or insufficient illumination, based on the ANN detecting the make and the model of the vehicle, the processing unit may (i) access (e.g., retrieve) a corresponding vehicular clearance information from a database (e.g., local, remote), (ii) select one of the at least two preconfigured illumination modes related to the corresponding vehicular clearance information, (iii) command the set of light sources to illuminate according to one of the preconfigured illumination modes, as selected, as shown in FIGS. 24A to 24D. For example, for low-clearance vehicles, the outer group 1606 may be activated, whereas for high-clearance vehicles, the inner group 1602 may be activated, although the intermediate group 1604 may be activated, whether individually or with other groups. As such, the inner group of light sources 1602, the intermediate group of light sources 1604, and the outer group of light sources 1606 may illuminate independent of (or dependent on) each other according to at least a first illumination modality (e.g., one or multiple groups) and a second illumination modality (e.g., one or multiple groups). The first illumination modality or the second illumination modality may be activated based on an identifier associated with the undercarriage being selected responsive to the undercarriage approaching the imaging platform. For example, the identifier may be an estimated clearance between the undercarriage and at least one of the board, the camera, at least one light source of the set of light sources, the dome, or a wall of the first pair of walls or the second pair of walls. The identifier may be a type of the vehicle (e.g., an automobile, a truck, a bus) hosting the undercarriage. The identifier may be the make of the vehicle hosting the undercarriage. The identifier may be the model of the vehicle. Therefore, such configurations may minimize under-illumination or over-illumination of the undercarriage that interferes with imaging or image processing, especially when the undercarriage may vary in size or shape.

FIGS. 23A to 23G show an embodiment of a nozzle assembly for cleaning a dome of a board according to this disclosure. In particular, there is a system 2300 including a board 2302, a set of light sources 2304, a first pair of walls 2306, a second pair of walls 2308, a dome 2310, a debris 2312, a nozzle assembly 2314, a cover 2316, an arm 2318, and a cover 2320. The board 2302, the set of light sources 2304, the first pair of walls 2306, the second pair of walls 2308, or the dome 2310 may be configured as described above. The dome 2310 may enclose a camera, as described above. There may be a camera to image a front portion of a vehicle approaching the board 2302, as described above.

Figure 23A:
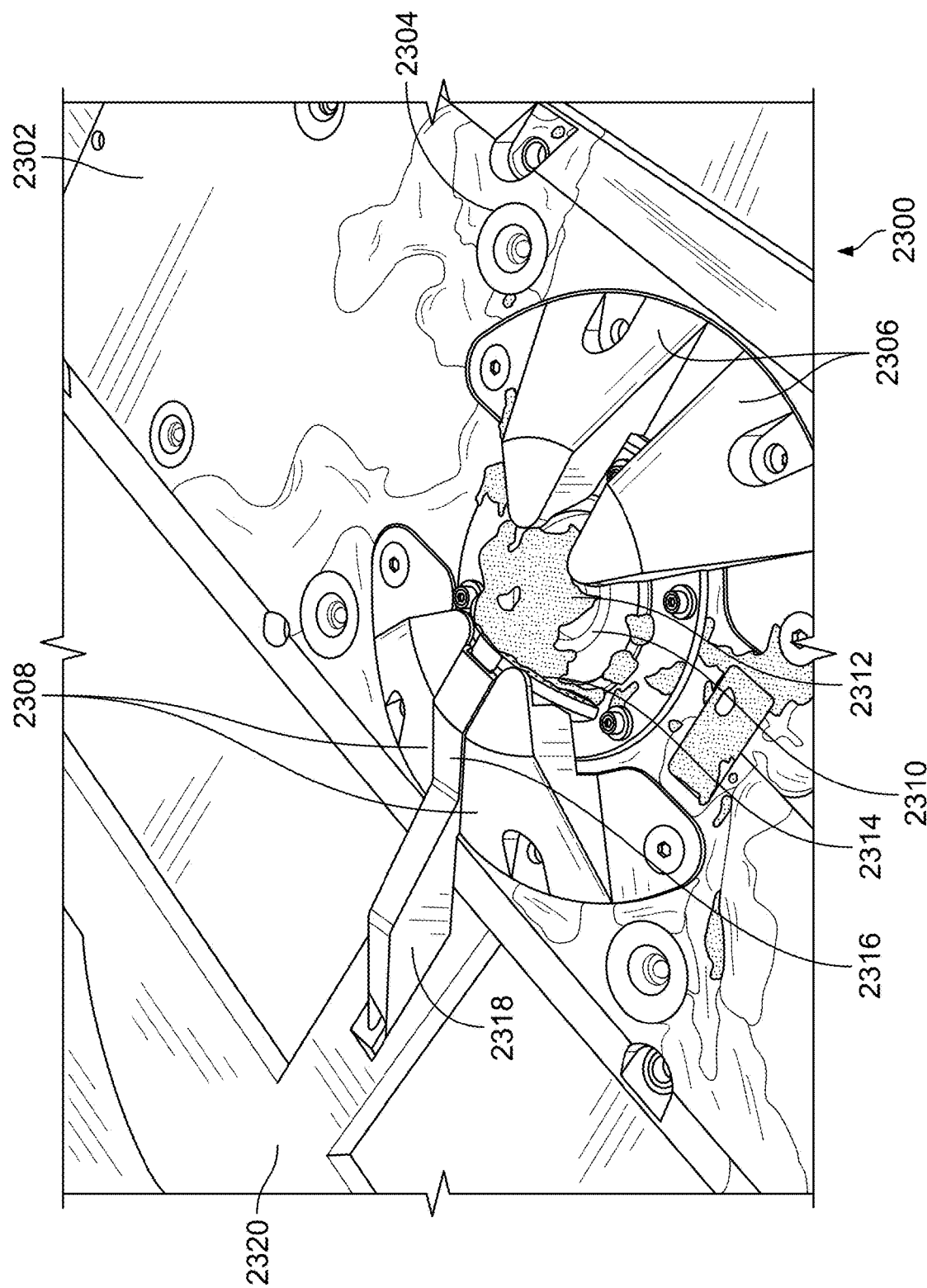
FIGS. 23A to 23G show an embodiment of a nozzle assembly for cleaning a dome of a board according to this disclosure.
Figure 23B:
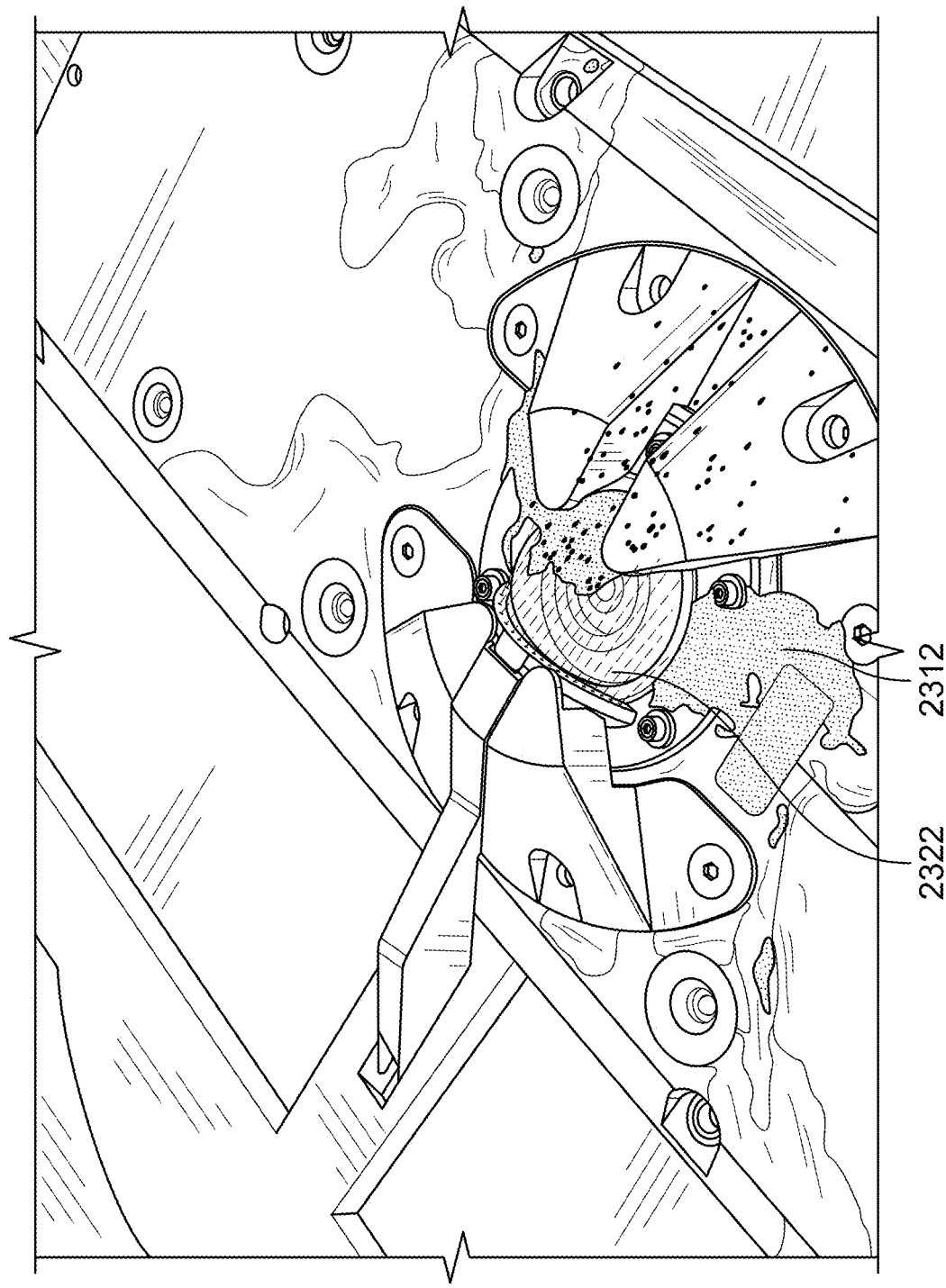
Figure 23C:
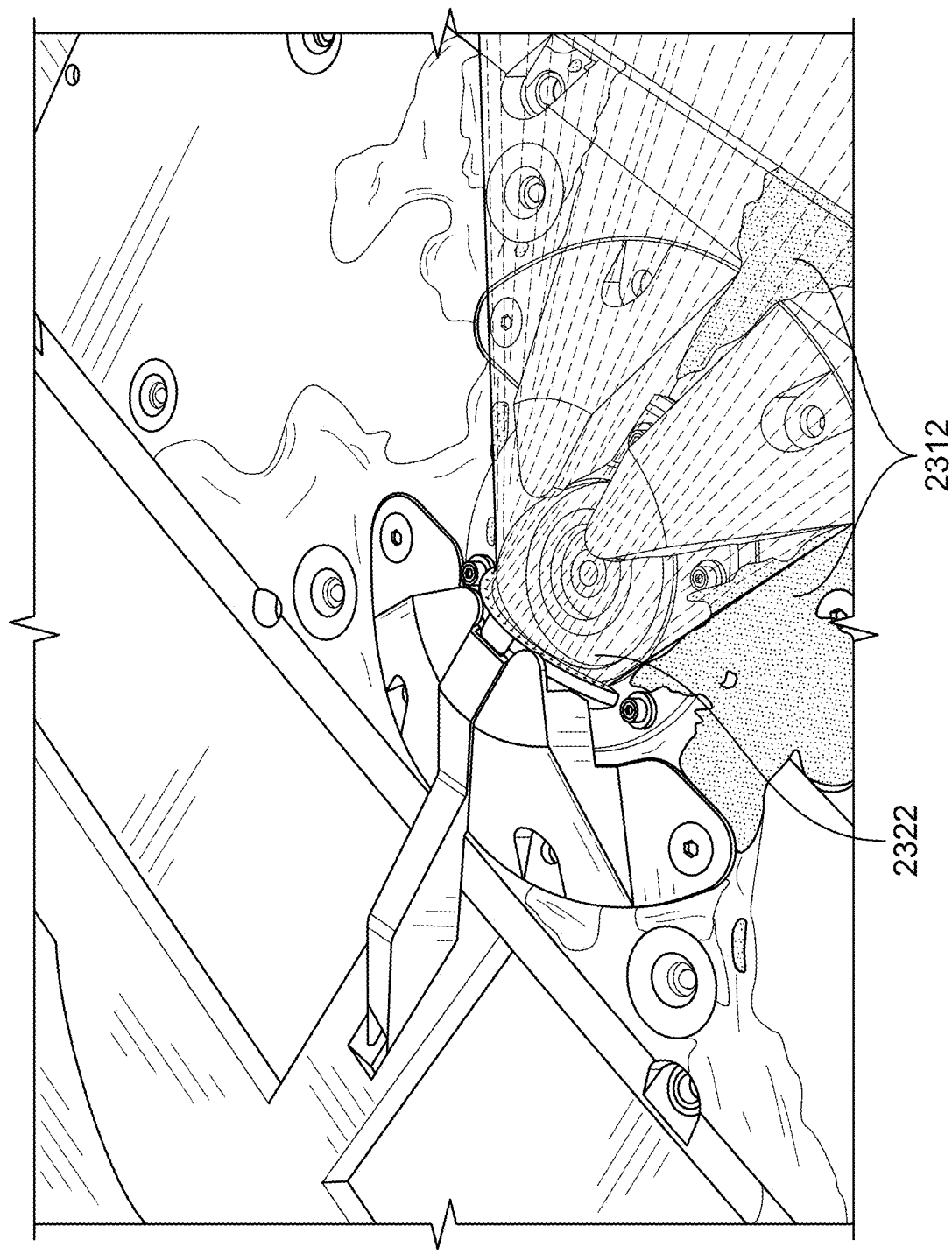
Figure 23D:
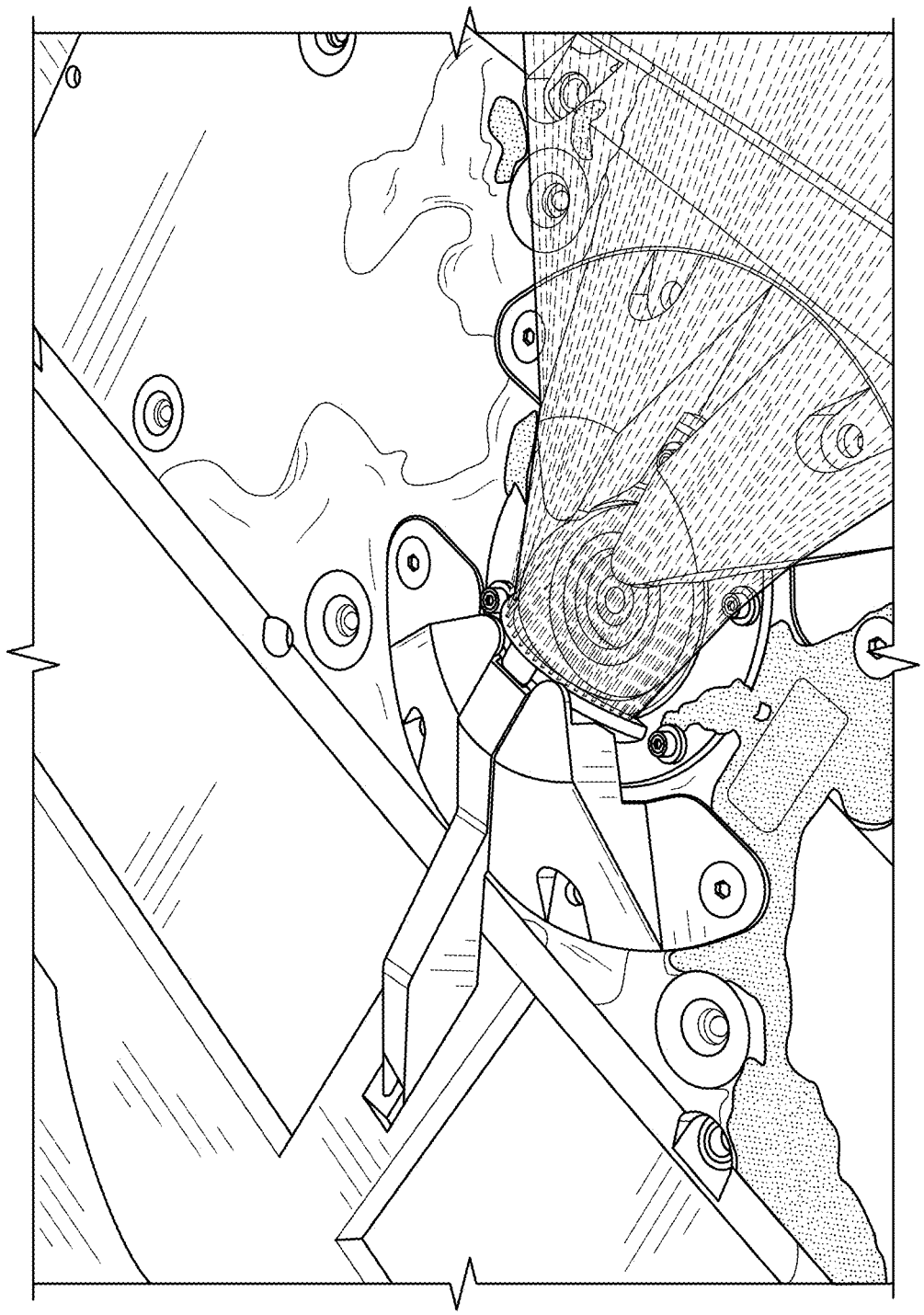
Figure 23E:
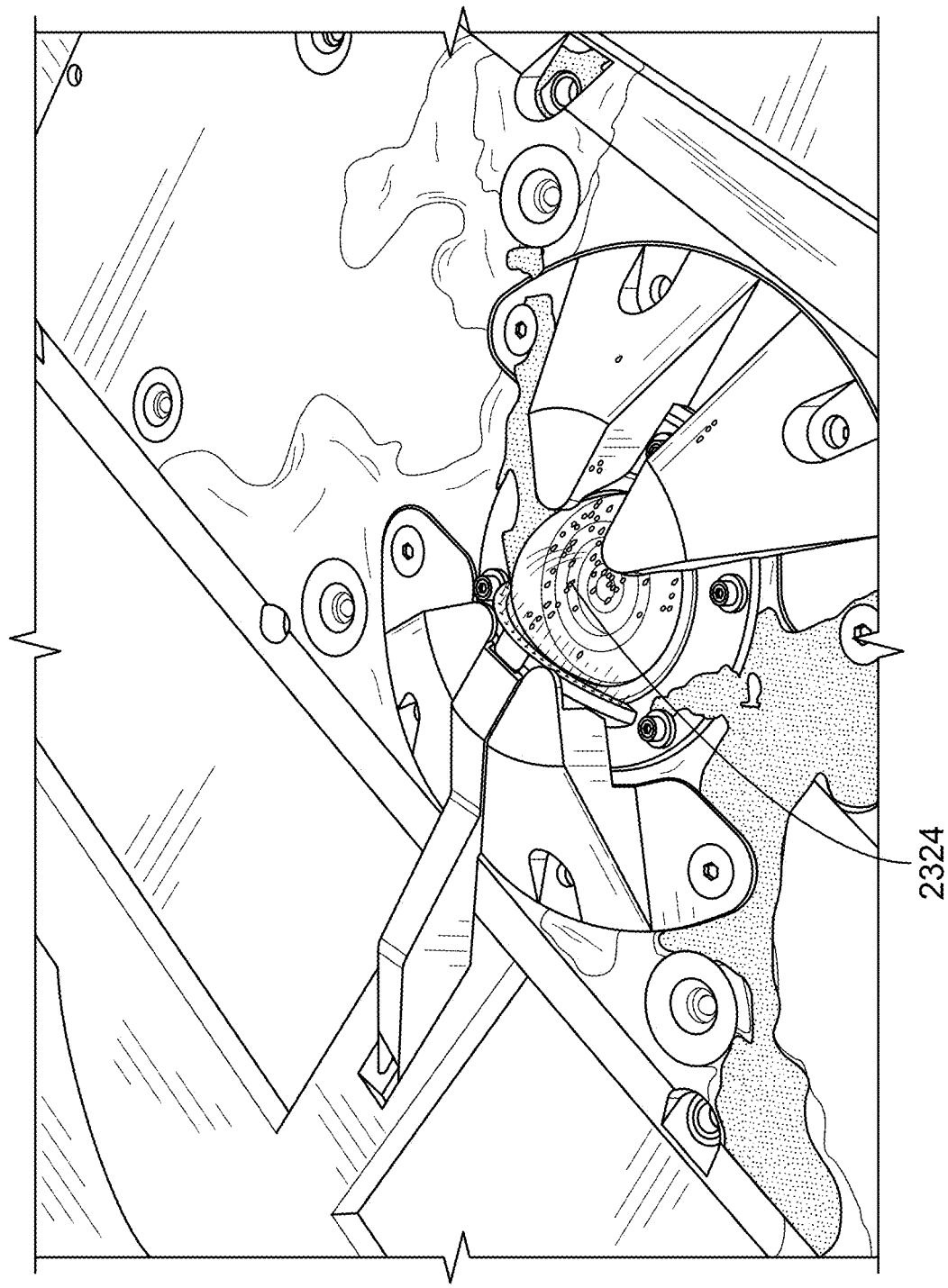
Figure 23F:
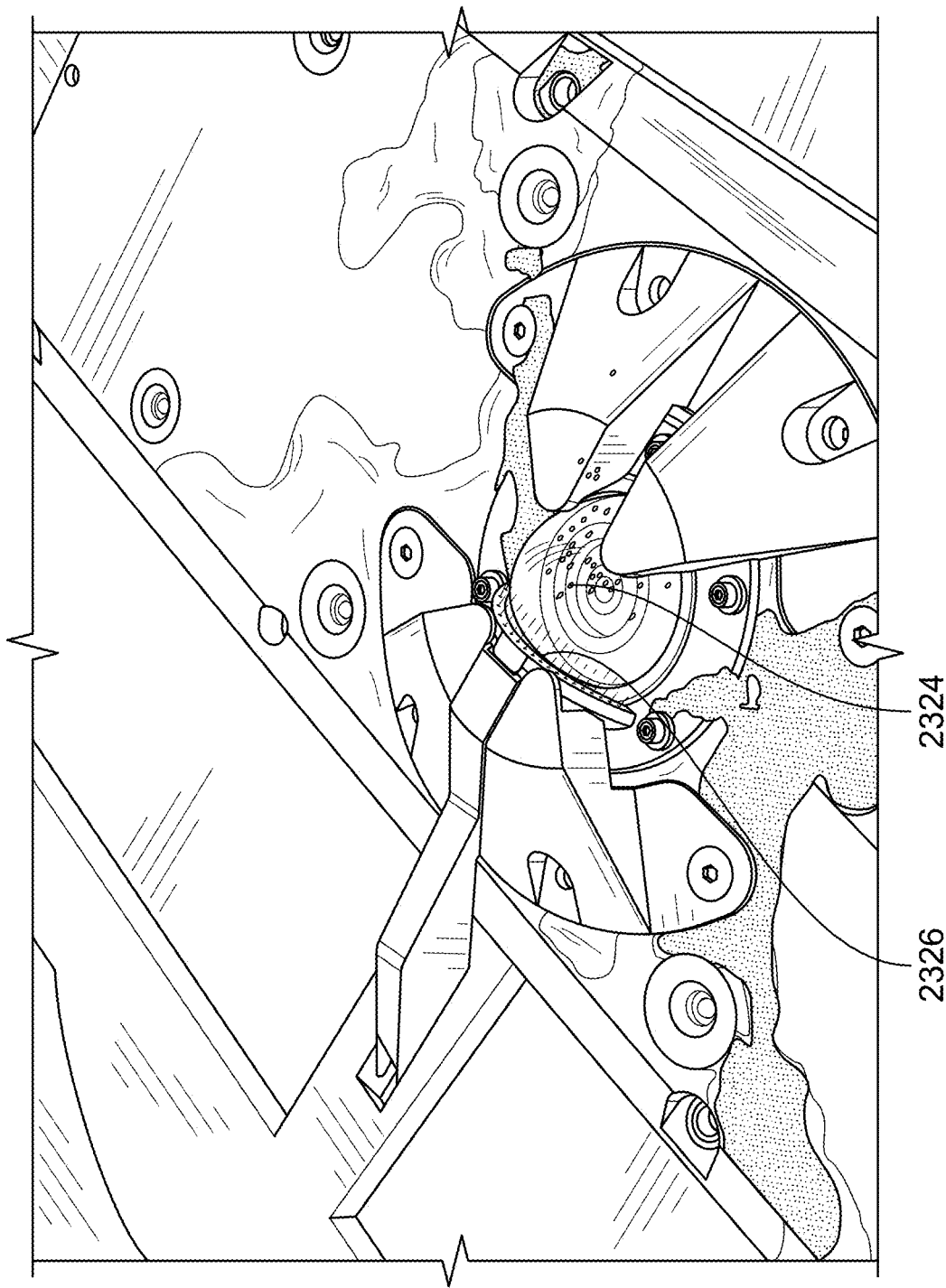
Figure 23G:
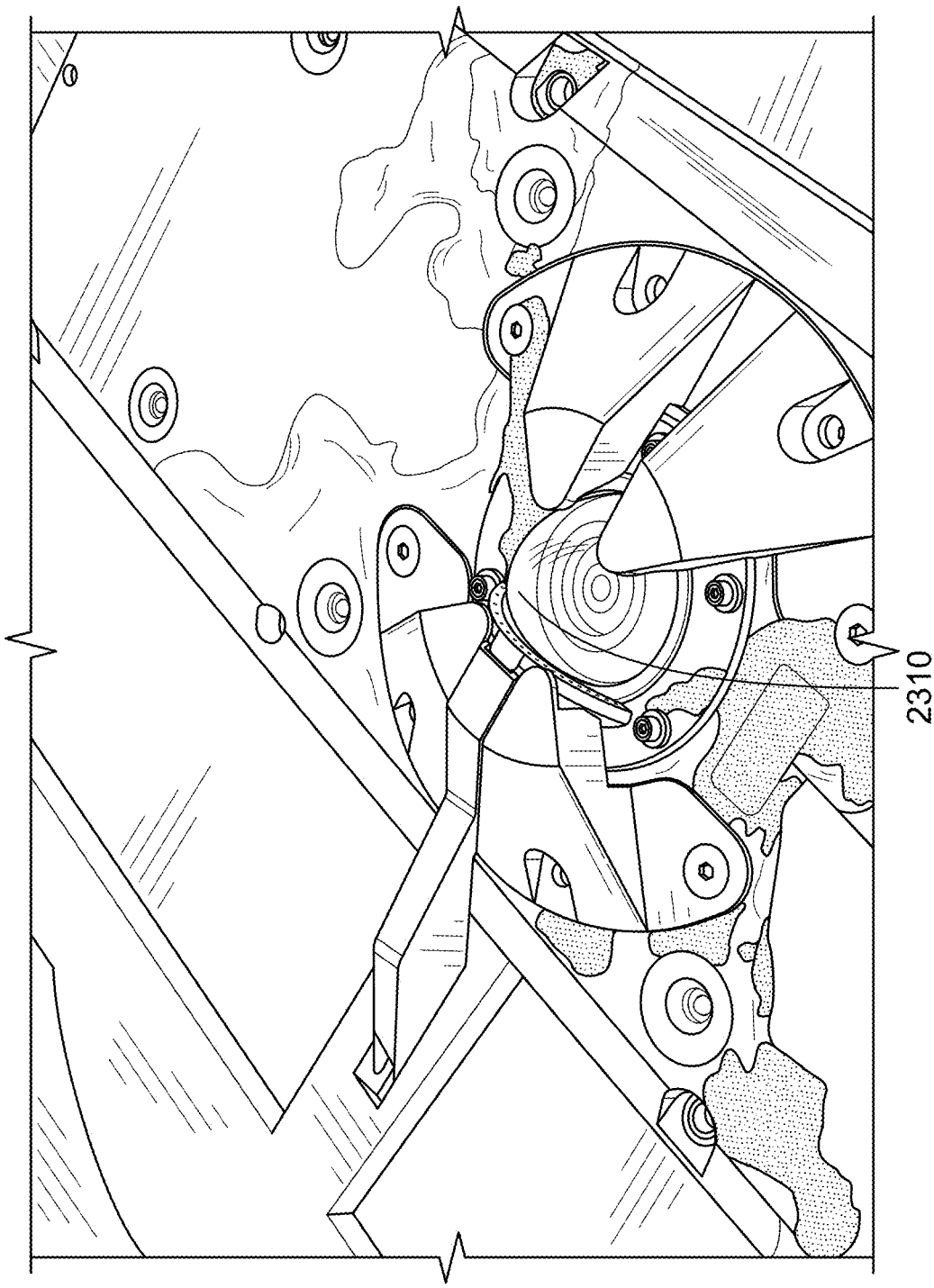

Since the dome 2310 has an external surface that may be covered with the debris 2312 (e.g., rain, snow, ice, sand, mud, dust, leaves, branches, or other natural or man-made debris), which may interfere with imaging or image processing, the external surface may be cleaned. As such, the system 2300 may include a source (e.g., a cabinet, a tank, a cistern, a container) of a liquid (e.g., a volume of water, a volume of a cleaning solution) 2322, a source (e.g., a cabinet, a tank, a cistern, a container) of a gas (e.g., a volume of ambient air, a volume of compressed air) 2326, and the nozzle assembly 2314 positionable to direct the liquid 2322 from the source of the liquid 2322 and the gas 2326 from the source of the gas 2326 onto the external surface of the dome 2310, such that the camera can image an undercarriage of a vehicle through the dome 2310, after the liquid 2322 is expelled from the external surface of the dome 2310, such that the debris 2312 is removed from the dome 2310, or dried on the external surface of the dome 2312 by the gas 2326. For example, there liquid on the dome 2322 may remain as a set of drops or droplets 2324, which may be expelled from the external surface of the dome 2310 or dried on the external surface of the dome 2310 by the gas 2326, as shown in FIG. 23E. The source of the liquid 2322 and the source of the gas 2326 may be hosted off the board 2302, as depicted in FIGS. 16-18, although the board 2302 may host the source of the liquid 2322 or the source of the gas 2326, without interfering with imaging, while protecting the source of the liquid 2322 or the source of the gas 2326 form damage (e.g., vehicular, weather, animals). The liquid 2322 may be directed onto the external surface of the dome 2310 before the gas 2326, although this order may be reversed or alternated in a sequence. There may be a single nozzle assembly 2314 on the board 2302. Note that the source of the liquid 2322 or the source of the gas 2326 may be omitted.

The system 2300 may include a first pump for pumping the liquid 2322 from the source of the liquid 2322 and a second pump for pumping the gas 2326 from the source of the gas 2326, each which may be powered similar to the camera, the set of light sources, or a heater for a dome or a board, each as described above. The first pump or the second pump may be omitted. There may be a first valve to regulate the liquid 2322 being output from the source of the liquid 2322 and a second valve to regulate the gas 2326 being output from the source of the gas 2326, which may occur when the liquid 2322 or the gas 2326 is pressurized or compressed. The first valve or the second valve may be powered similar to the camera, the set of light sources, or a heater for a dome or a board, each as described above. The first valve or the second valve may be omitted.

The cover 2316 extends from the nozzle assembly 2314 between the second pair of walls 2308. The cover 2316 terminates at the arm 2318 which extends under the cover 2320.

There may be a first tube (e.g., plastic, PVC, metal, rubber, silicon, armored) for conveying the liquid 2322 from the source of the liquid 2322 and a second tube (e.g., plastic, PVC, metal, rubber, silicon, armored) for conveying the gas 2326 from the source of the gas 2326. For example, the first tube may in fluid communication with the first pump or the first valve, to operate as described above. For example, the second tube may in fluid communication with the second pump or the second valve, to operate as described above. The first tube spans between the source of the liquid 2322 and the nozzle assembly 2314, while being covered by the cover 2320, the arm 2318, and the cover 2316. The cover 2320 may be disposed on the road or buried in the road. The cover 2320 may extend (e.g., span) between the source of the liquid 2322 and the nozzle assembly 2314, although less extension is possible. The second tube spans between the source of the gas 2326 and the nozzle assembly 2314, while being covered by the cover 2320, the arm 2318, and the cover 2316. The cover 2320 may extend (e.g., span) between the source of the gas 2326 and the nozzle assembly 2314, although less extension is possible. The first tube may extend longitudinally parallel to the second tube, braid with the second tube, avoid contact with the second tube, be the second tube, or be distinct from the second tube.

The nozzle assembly 2314 and the cover 2316 may form a T-shape or a Y-shape when viewed from above the board 2302 when the board 2302 is installed for imaging on a road. The nozzle assembly 2314 may have an arcuate shape when viewed frontally. For example, the nozzle assembly 2314 may direct (e.g., spray, blow) the liquid 2322 or the gas 2326 in an arcuate pattern, which enables the external surface of the dome 2310 to be correspondingly cleaned. The nozzle assembly 2316 may direct the liquid 2322 or the gas 2326 onto the external surface of the dome 2310 in a direction along a horizontal plane toward the undercarriage when the undercarriage approaches the board 2302 in a forward direction. The nozzle assembly 2316 may extend between the first pair of walls 2306 and the second pair of walls 2308. The nozzle assembly 2316 may extend between the dome 2310 and the first pair of walls 2306 or the second pair of walls 2308. The cover 2316 may extend over the board 2302 between the first pair of walls 2306 or the second pair of walls 2308.

The first tube may be extending between the cover 2316 and the board 2302, where the first tube conducts the liquid 2322 towards the nozzle assembly 2314. The second tube may be extending between the cover 2316 and the board 2302, wherein the second tube conducts the gas 2326 towards the nozzle assembly 2314. The nozzle assembly 2314 may direct the liquid 2322, such that the liquid 2322 flows off the external surface of the dome 2310 between the second pair of walls 2308 when the cover 2316 extends between the first pair of walls 2306 or between the first pair of walls 2306 when the cover 2316 extends between the second pair of walls 2308. The nozzle assembly 2314 may direct the liquid 2322, such that the liquid 2322 flows off the external surface of the dome 2310 between one wall of the first pair of walls 2306 and one wall of the second pair of walls 2308. The nozzle assembly 2314 may direct the liquid 2322, such that the liquid 2322 avoids flowing over at least one light source of the set of light sources 2304. The board 2302 may be configured to guide the liquid 2322 off the dome 2310 to avoid the liquid 2322 flowing over at least one light source of the set of light sources 2304.

The nozzle assembly 2314 may output the liquid 2322 or the gas 2326 on a schedule, which may be controlled by a controller, as described above, in context of a heater for a dome or a board. The nozzle assembly 2314 may output the liquid 2322 or the gas 2326 based on a user input into a computing terminal associated with the board 2302, as described above, in context of a heater for a dome or a board. The nozzle assembly 2314 may output the liquid 2322 or the gas 2326 based on a sensor sensing an ambient environmental condition, as instructed a controller communicating with the sensor, as described above. The ambient environmental condition may be snow, rain, or another condition. The nozzle assembly 2314 may output the liquid 2322 or the gas 2326 based a detection of a vehicle hosting the undercarriage moving towards the board in a forward direction during a snow condition or a rain condition before the undercarriage moves over the first pair of walls 2306 and the second pair of walls 2308, where the nozzle assembly 2314 may be activated by a controller, as described above. The nozzle assembly 2314 may output the liquid 2322 based the detection of the vehicle hosting the undercarriage moving towards the board 2302 in the forward direction during the snow condition before the undercarriage moves over the first pair of walls 2306 and the second pair of walls 2308. The nozzle assembly 2314 may output the liquid 2322 based on the detection of the vehicle hosting the undercarriage moving towards the board 2302 in the forward direction during the rain condition before the undercarriage moves over the first pair of walls 2306 and the second pair of walls 2308. The nozzle assembly 2314 may output the gas 2326 based the detection of the vehicle hosting the undercarriage moving towards the board 2302 in the forward direction during the snow condition before the undercarriage moves over the first pair of walls 2306 and the second pair of walls 2308. The nozzle assembly 2314 may output the gas 2326 based the detection of the vehicle hosting the undercarriage moving towards the board 2302 in the forward direction during the rain condition before the undercarriage moves over the first pair of walls 2306 and the second pair of walls 2308. The nozzle assembly 2314 may output the liquid 2322 or the gas 2326 based the detection of the vehicle hosting the undercarriage moving towards the board in the forward direction during the snow condition or the rain condition before the undercarriage moves over the first pair of walls 2306 and the second pair of walls 2308, as described above, when the detection is optical, which be based on a license plate hosting a registration identifier, where the license plate is hosted by the vehicle.

As described above, the system 2300 includes the source of liquid 2322 and the source of the gas 2326, where the source of the liquid 2322 enables the nozzle assembly 2314 to direct the liquid 2322 onto the external surface of the dome 2310 and the source of the gas 2326 enables the nozzle assembly 2314 to direct the gas 2326 onto the external surface of the dome 2310, which may be after the liquid 2322 is output from the nozzle assembly 2314. The source of liquid 2322 or the source of the gas 2326 may be activated by a controller based on a schedule, similar to a heater for a dome or a board, as described above. The source of liquid 2322 or the source of the gas 2326 may be activated by a controller based on a command from an operator operating a user interface of a computing terminal, similar to a heater for a dome or a board, as described above. The source of liquid 2322 or the source of the gas 2326 may be activated by a controller based on an input from a sensor (e.g., to sense a sandstorm), similar to a heater for a dome or a board, as described above. The source of liquid 2322 or the source of the gas 2326 may be activated by a controller based on the vehicle being detected (e.g., optically) to be approaching the board 2302, as imaged from the camera external to the board 2302, as described above. The source of liquid 2322 or the source of the gas 2326 may be activated by a controller based on a parameter of an imaging quality of a camera being detected to be below a preset threshold (e.g., indicating that the dome 2310 is dirty) or not satisfying the preset threshold, as detected by a processing unit, as described above, which may be performed periodically, continuously, or after a scan of a poor quality, as algorithmically detected. For example, when a composite image is detected to be of poor quality, then a controller may activate the source of liquid 2322 or the source of the gas 2326 to direct the liquid 2322, as described herein. Note that the nozzle assembly 2314 may also selectively output the liquid 2322 or the gas 2326, as needed. The nozzle assembly 2314 may direct the liquid 2322 onto the external surface of the dome 2314, to remove the debris 2312 from the external surface of the dome 2310, and then direct the gas 2326 to the external surface of the dome 2314, to remove the liquid 2322 (e.g., drops, droplets) remaining on the external surface of the dome 2314. For example, there liquid on the dome 2322 may remain as the set of drops or droplets 2324, which may be expelled from the external surface of the dome 2310 or dried on the external surface of the dome 2310 by the gas 2326, as shown in FIG. 23E. This modality may improve imaging quality, provide a contactless method of cleaning the external surface of the dome 2310 relative to a manual cleaning approach, or provide a reliable method of cleaning the external surface of the dome 2310 due lack of moving parts in an aggressive environment (e.g., outdoors, vehicles).

The liquid 2322 or the gas 2326 may be output from the nozzle assembly 2314 at an ambient temperature or a preset temperature, whether identical to each other or different from each other, which may be controlled by a controller based on accessing a reading of a sensor (e.g., a thermometer, a wind sensor, a rain sensor, a mold sensor, a sand sensor) or via an operator operating a computing terminal, as described above. For example, the source of the liquid 2322, the source of the gas 2326, the liquid 2322 in the source of the liquid 2322 or in a relevant tube or the nozzle 2314, the gas 2326 in the source of the gas 2326 or in a relevant tube or the nozzle 2314 may be heated, cooled, or kept at the ambient temperature or the preset temperature, whether actively or passively, whether by a heating element, a heat exchanger, a fan, a condenser, a heat sink, a cooler, an air conditioner, a chemical reaction, an adsorption reaction, an absorption reaction, an osmosis reaction, or any other suitable heating, cooling, or temperature maintenance method. For example, an active approach to heating, cooling, or temperature maintenance may be powered, as described above, which may be adjusted before, during, or after such output or may not be adjustable all.

The liquid 2322 or the gas 2326 may be output from the nozzle assembly 2314 at a uniform fluid rate or pressure or a varying fluid rate or pressure, whether identical to each other or different from each other, which may be controlled by a controller based on accessing a reading of a sensor (e.g., a thermometer, a wind sensor, a rain sensor) or via an operator operating a computing terminal, as described above. For example, there may be a valve (e.g., a solenoid valve, a booster valve) that may enable the liquid 2322 or the gas 2326 to be output from the nozzle assembly 2314 in the uniform fluid rate or pressure or the varying fluid rate or pressure, which may be adjusted before, during, or after such output or may not be adjustable all.

As described above, the system 2300 may operate without the source of the liquid 2322 being present or activated or the source of the gas 2326 being present or activated. For example, the source of the liquid 2322 may be activated for the nozzle assembly 2314 to direct the liquid 2322 onto the external surface of the dome 2310, without the source of the gas 2326 being present or activated by a controller. Likewise, the source of the gas 2326 may be activated for the nozzle assembly 2314 to direct the gas 2326 onto the external surface of the dome 2310, without the source of the liquid 2322 being present or activated by a controller. For example, the source of the gas 2326 may operate as an air knife to remove the debris 2312, whether wet (e.g., snow, rain) or dry (e.g., sand), as described above. For example, when the vehicle is detected to be approaching the board 2320, as imaged from the camera external to the board 2302, as described above, there may be a controller that instructs the source of the gas 2326 to supply the gas 2326 for output via the nozzle assembly 2314. This mode enables minimization of water droplets or snowflakes from the external surface of the dome 2310, before the undercarriage of the vehicle is positioned over the dome enclosed the camera hosted by the board 2302, while increasing at least some quality of a composite image of the undercarriage. Note that the nozzle assembly 2314 may be activated by a controller, whether additional or alternative to the source of the liquid 2322 or the source of the gas 2326 being activated or present.

Figure 24B:
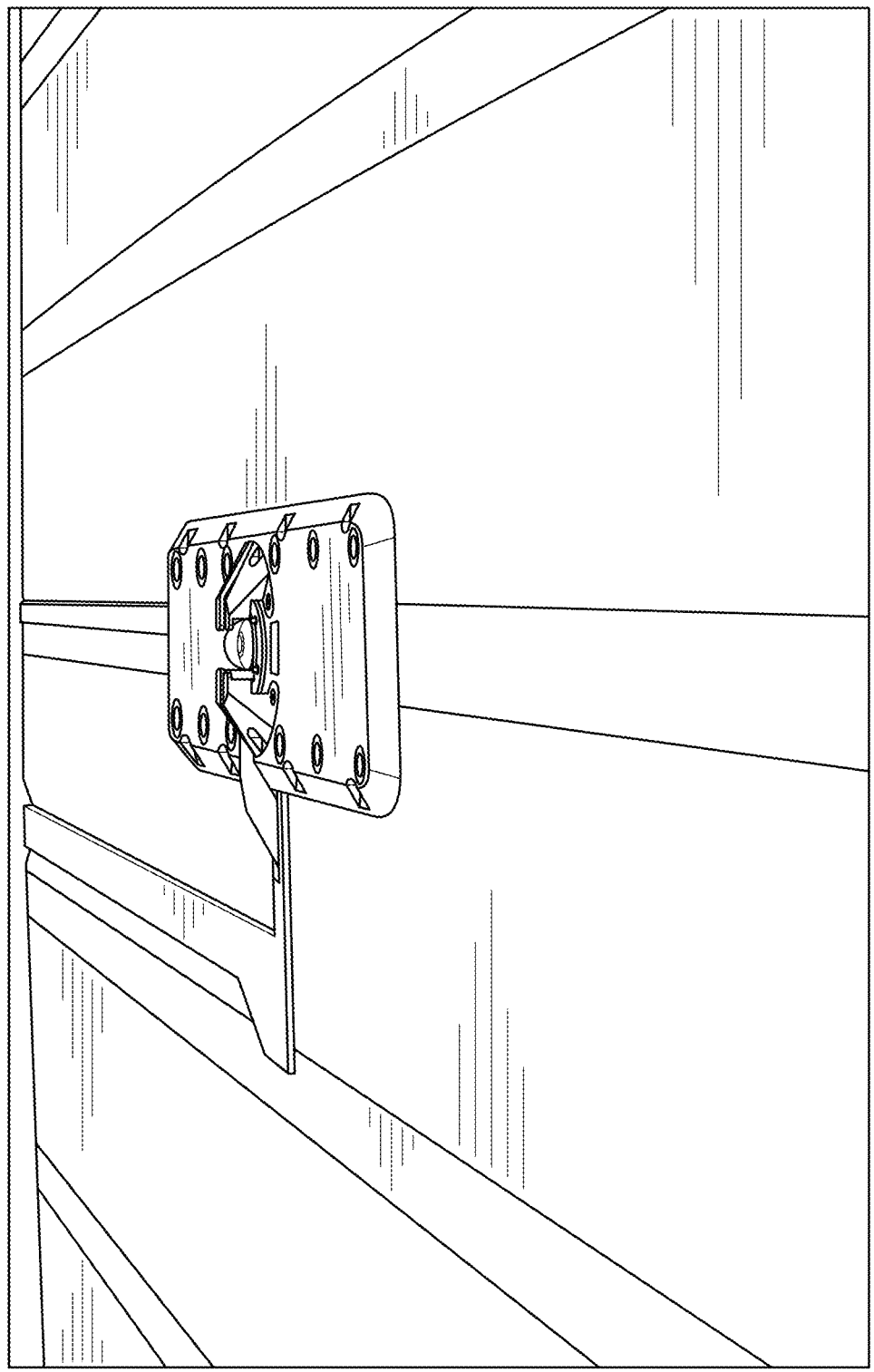
Figure 24C:
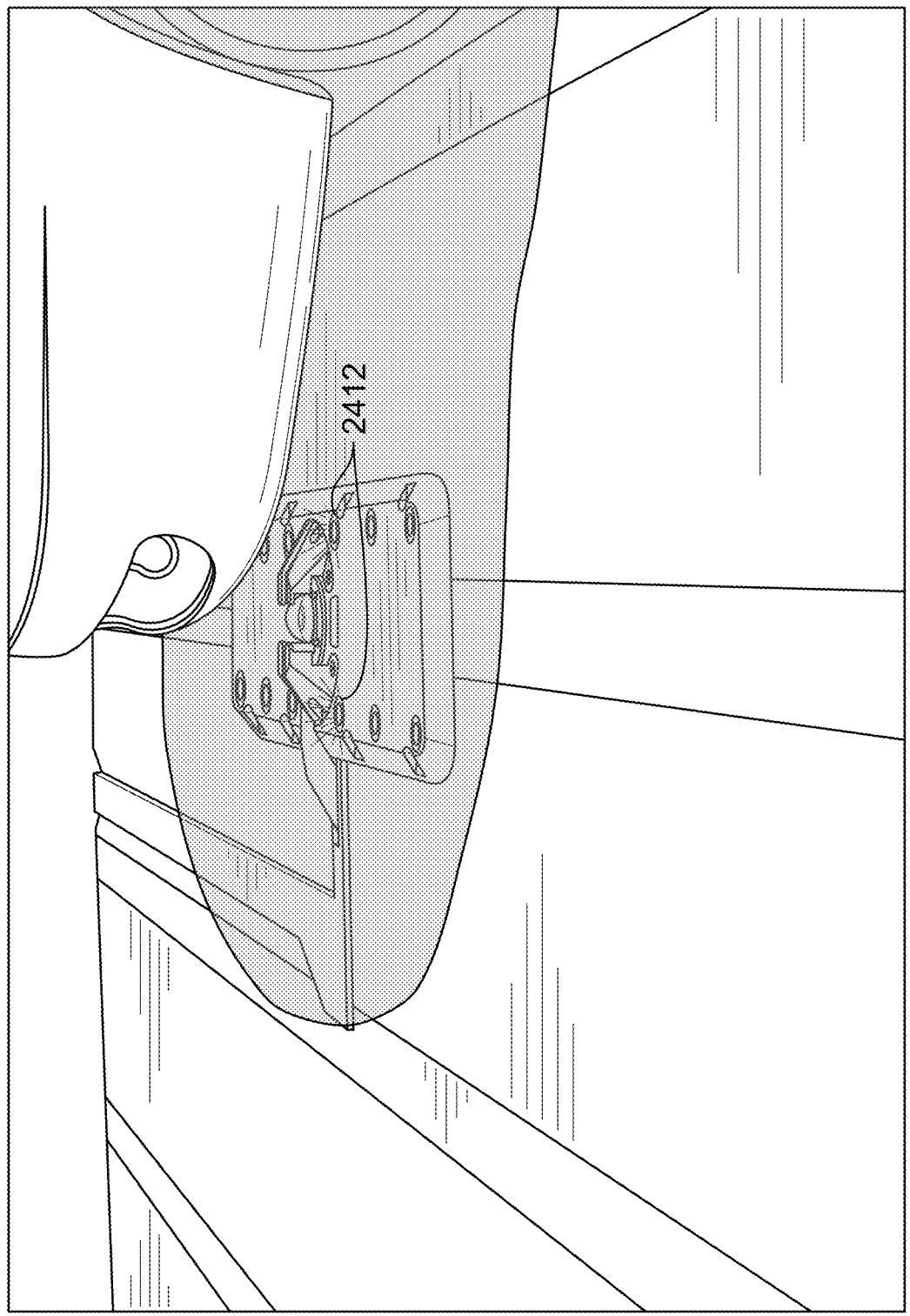
Figure 24D:
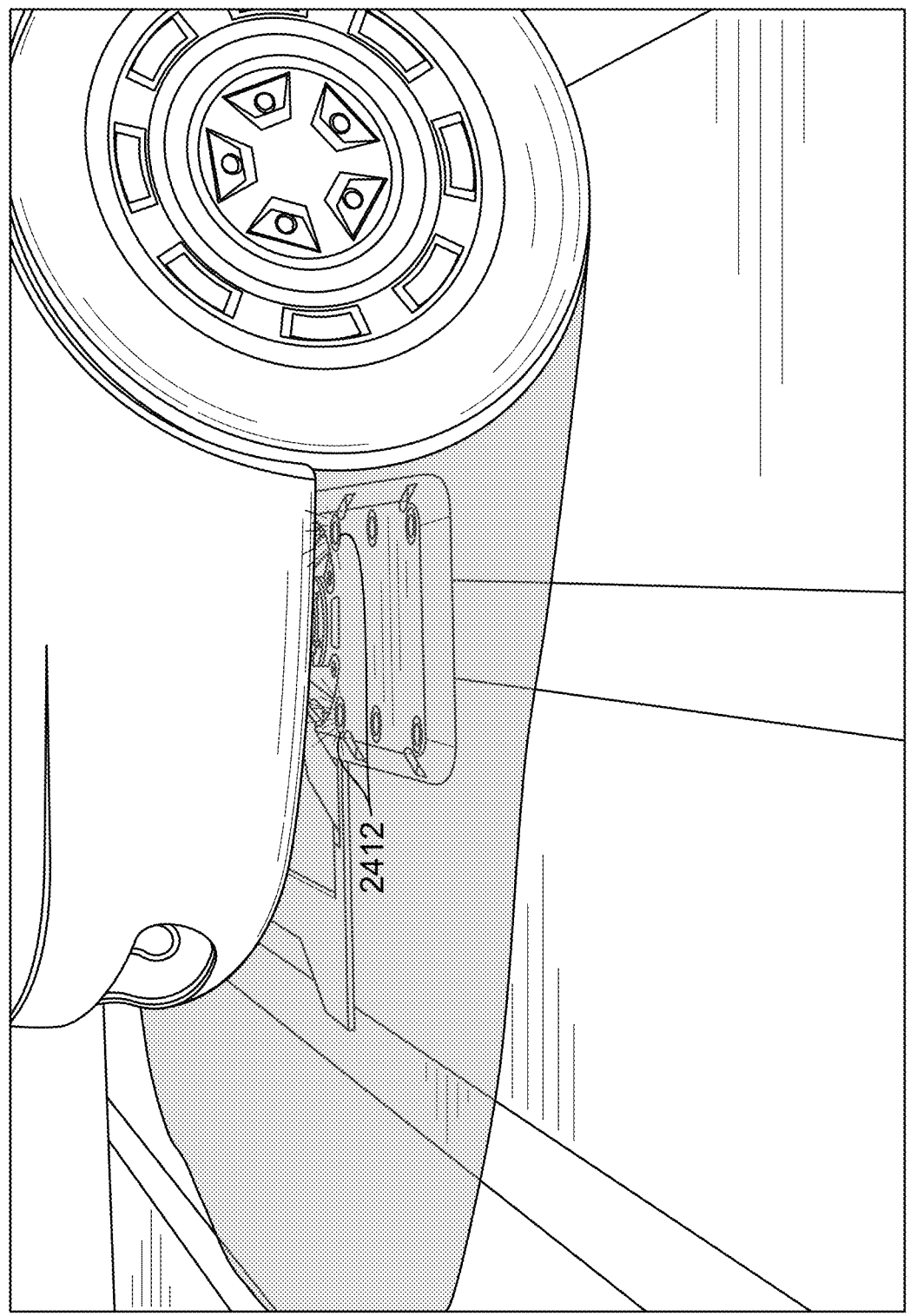
Figure 24E:
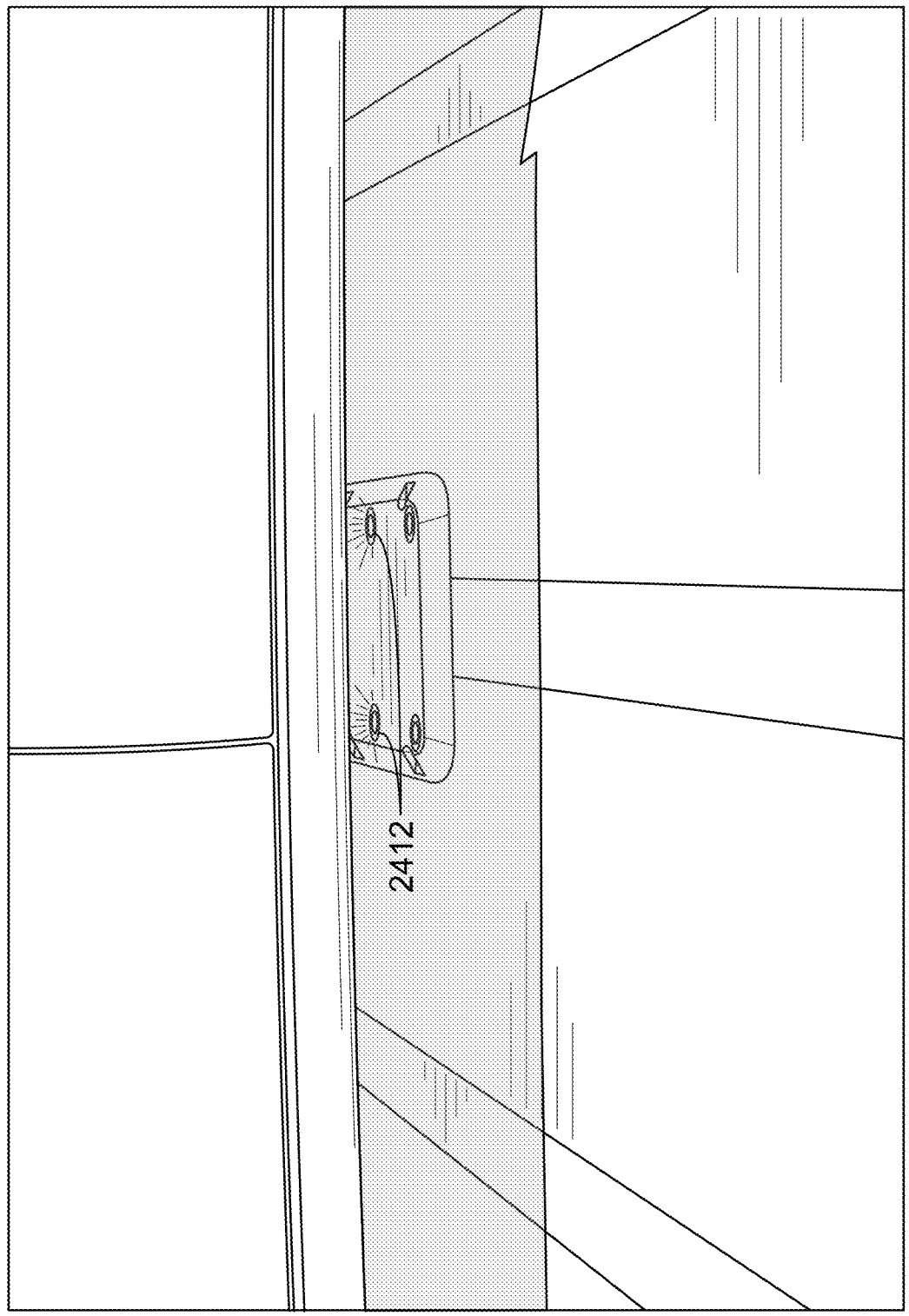
Figure 24F:
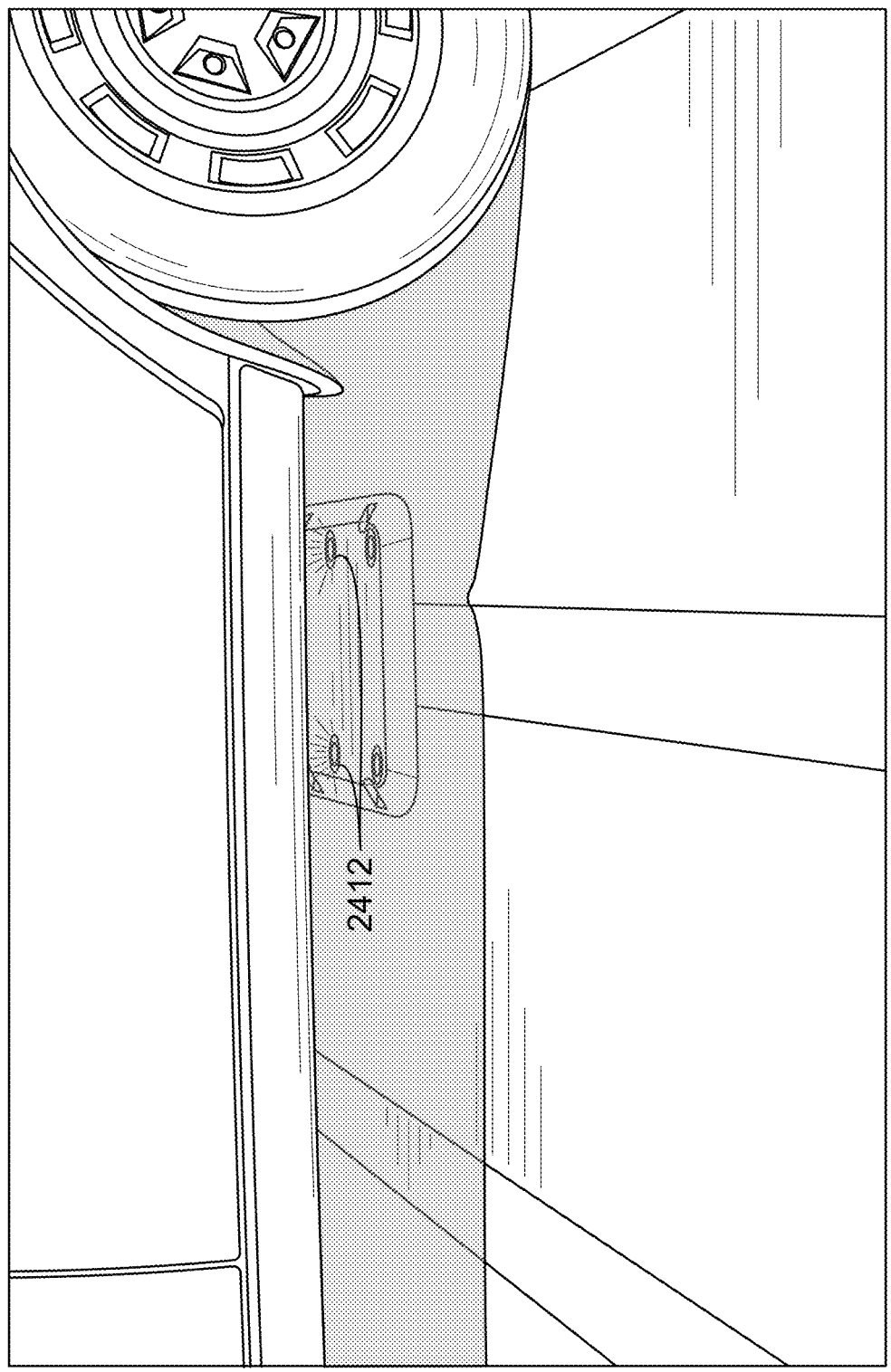

FIGS. 24A to 24F show an embodiment of a board illuminating an underside of a vehicle according to this disclosure. In particular, there is a system 2400 that has a board 2402, a first pair of walls 2404, a second pair of walls 2406, a dome 2408, and a set of light sources 2410, each of which may be configured as described above. The system 2400 also includes the system 2300, although the system 2300 may be omitted. As shown in FIG. 24A, there is an inner pair of light sources 2412 illuminated independent of others as a vehicle 2414 is approaching the board 2402, as described above. For example, the inner pair of light sources 2412 may correspond to the inner group 1602, as depicted in FIG. 16, although correspondence to the intermediate group 1604 or the outer group 1606 may be possible. As shown in FIG. 24B, the inner pair of light sources 2412 is not illuminating, which may be if the vehicle 2414 has not been detected, as described above. However, as shown in FIGS. 24C-24F, the inner group 1602 is illuminating, which may be based on the corresponding vehicular clearance information, as described above.

Figure 26A:
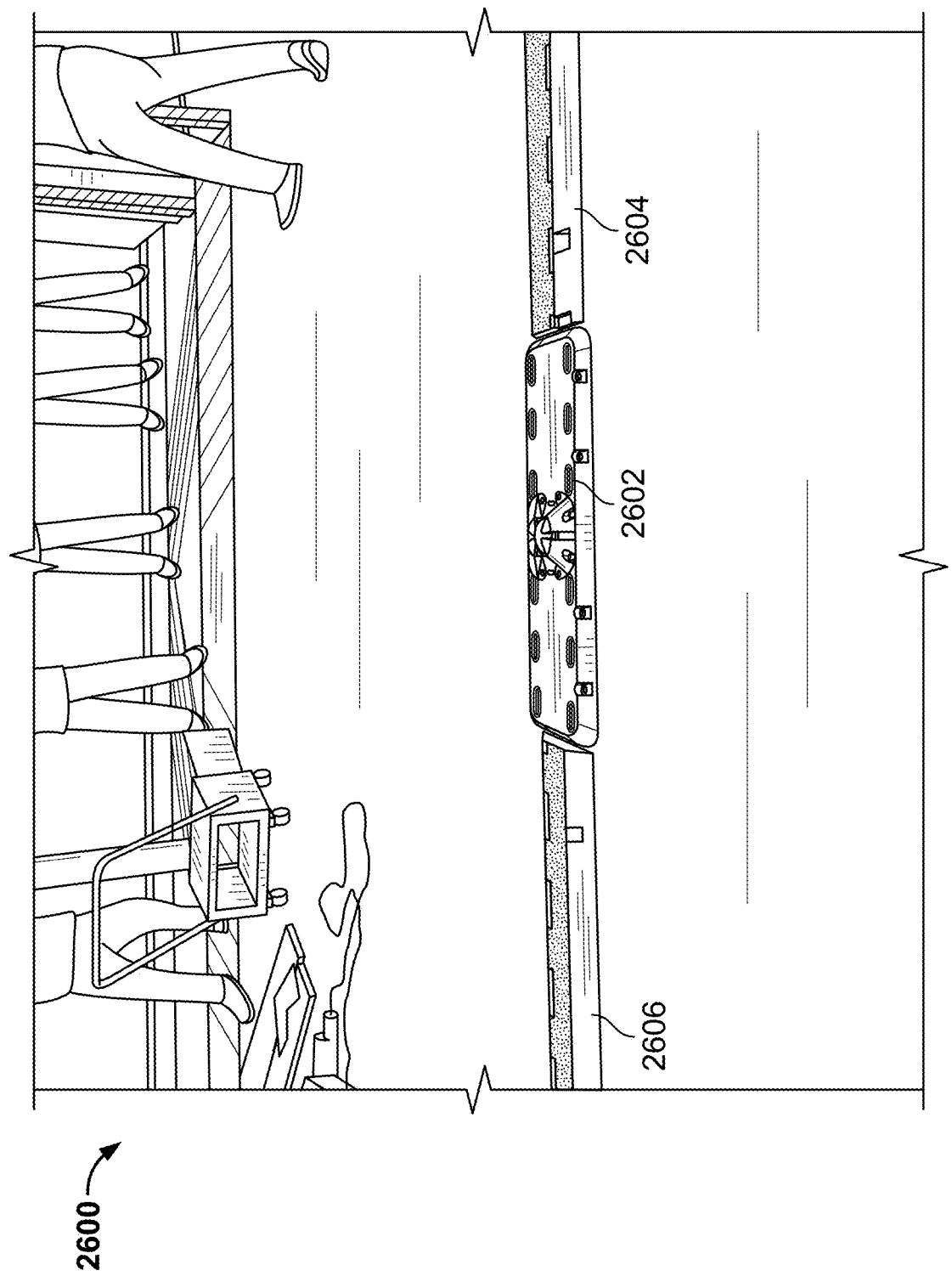
FIGS. 26A to 26B show an embodiment of a board interposed between a pair of strips in an indoor use according to this disclosure.
Figure 26B:

FIGS. 26A to 26B show an embodiment of a board interposed between a pair of strips in an indoor use according to this disclosure. In particular, there is a system 2600 including a board 2602 extending (e.g., interposed, spanning) between a first board 2604 and a second board 2606, collectively enabling a speed bump or a speed hump across which a vehicle may pass in an indoor environment (e.g., an indoor garage). The first board 2604 or the second board 2606 is not attached to the board 2602, although this configuration is possible (e.g., by sidewall-to-sidewall fastening, mating, adhering). There may be some cabling, wiring, harness, or tubing, as described above, that may extend within or underneath the first board 2604 or the second board 2606. The first board 2604 or the second board 2606 may host an input device (e.g., a load cell, a weight scale) or an output device (e.g., a light source, a sound source), each of which may be powered as described above, whether serial or parallel, whether independent or dependent, with the board 2602. The first board 2604 or the second board 2606 may rest on an indoor surface unsecured or secured to the indoor surface similar to the board 2602 (e.g., fastening, adhering), whether temporary or permanent. Although the indoor surface is shown to be defined by a coated surface (e.g., epoxy), this configuration is not required and any suitable indoor surface (e.g., asphalt, concrete, sand, grass, dirt, gravel, ice) for vehicular movement is possible.

Figure 27:
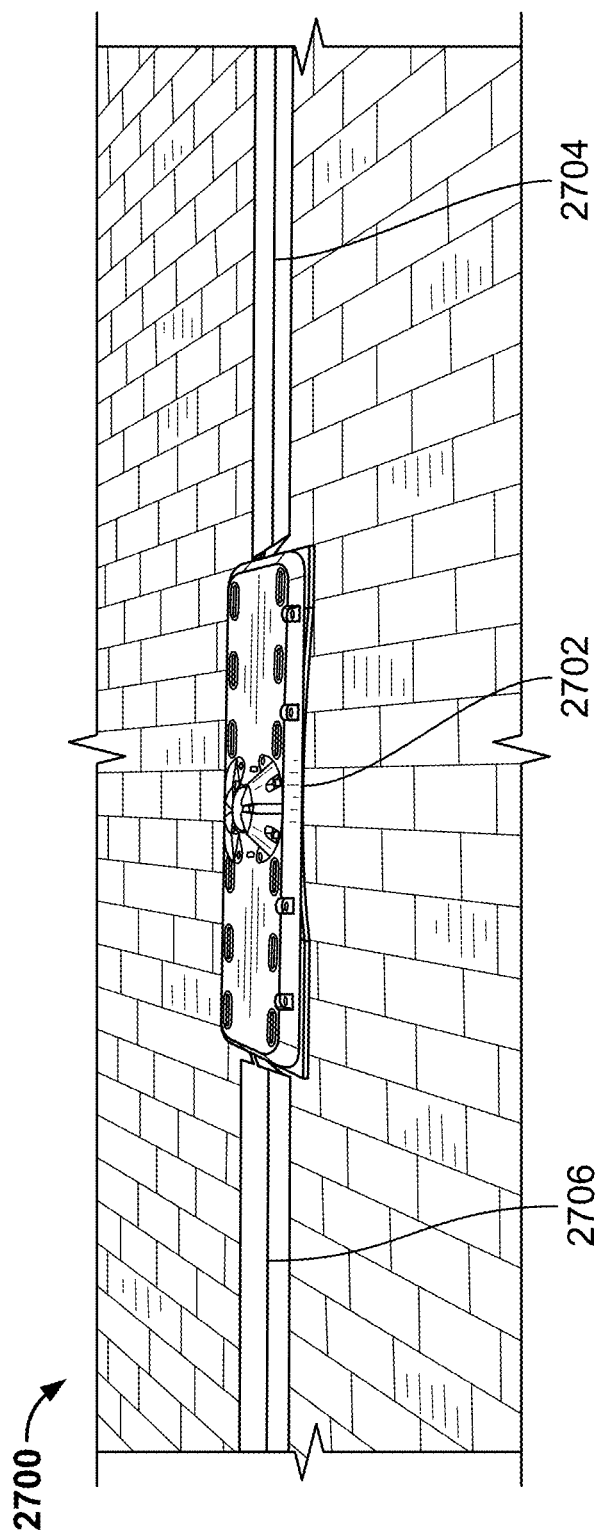
FIG. 27 shows an embodiment of an embodiment of a board interposed between a pair of strips in an outdoor use according to this disclosure.

FIG. 27 shows an embodiment of an embodiment of a board interposed between a pair of strips in an outdoor use according to this disclosure. In particular, there is a system 2700 including a board 2702 extending (e.g., interposed, spanning) between a first board 2704 and a second board 2706, collectively enabling a speed bump or a speed hump across which a vehicle may pass in an outdoor environment (e.g., a street). The first board 2704 or the second board 2706 is not attached to the board 2702, although this configuration is possible (e.g., by sidewall-to-sidewall fastening, mating, adhering). There may be some cabling, wiring, harness, or tubing, as described above, that may extend within or underneath the first board 2704 or the second board 2706. The first board 2704 or the second board 2706 may host an input device (e.g., a load cell, a weight scale) or an output device (e.g., a light source, a sound source), each of which may be powered as described above, whether serial or parallel, whether independent or dependent, with the board 2702. The first board 2704 or the second board 2706 may rest on an outdoor surface unsecured or secured to the outdoor surface similar to the board 2702 (e.g., fastening, adhering), whether temporary or permanent. Although the outdoor surface is shown to be defined by a set of bricks, cobblestones, or pavers, this configuration is not required and any suitable outdoor surface (e.g., asphalt, concrete, sand, grass, dirt, gravel, ice) for vehicular movement is possible.

As described above, there may be a system, comprising a board hosting a camera, a set of light sources, a dome, a first pair of walls spaced apart from each other, and a second pair of walls spaced apart from each other, where the dome encloses the camera and extends between the first pair of walls and the second pair of walls, where the camera images an undercarriage through the dome as the undercarriage is illuminated by the set of light sources when the undercarriage moves over the first pair of walls and the second pair of walls. The camera may image the undercarriage through the dome as the undercarriage is illuminated by the set of light sources when the undercarriage moves forward over the first pair of walls and the second pair of walls. The camera may image the undercarriage through the dome as the undercarriage is illuminated by the set of light sources when the undercarriage moves backward over the first pair of walls and the second pair of walls. The camera may image the undercarriage through the dome as the undercarriage is illuminated by the set of light sources when the undercarriage moves over the first pair of walls and the second pair of walls in a uniform speed. The camera may image the undercarriage through the dome as the undercarriage is illuminated by the set of light sources when the undercarriage moves over the first pair of walls and the second pair of walls in a varying speed. The camera may image the undercarriage through the dome as the undercarriage is illuminated by the set of light sources when the undercarriage is stopped over the first pair of walls and the second pair of walls. The camera may image the undercarriage through the dome as the undercarriage is illuminated by the set of light sources when the undercarriage is moving over the first pair of walls and the second pair of walls at a speed at about 30 kilometers per hour or lower where the undercarriage has a ground clearance of about 1000 millimeters or less. The camera may image the undercarriage through the dome as the undercarriage is illuminated by the set of light sources when the undercarriage is moving over the first pair of walls and the second pair of walls. The camera may image the undercarriage through the dome as the undercarriage is illuminated by the set of light sources when the undercarriage is moving over the first pair of walls and the second pair of walls and the board rests on a road that is not deepened (e.g., drilled). There may be at least one wall of the first pair of walls or the second pair of walls that has a topmost side and the board has an underside, wherein the topmost side and the underside are spaced apart from each other at about 3 inches or less. The camera may be a first camera and there may be a second camera imaging a vehicle hosting the undercarriage when the vehicle approaches the board and there may be an application program (e.g., a distributed application, a local application, a web application, a mobile application) that is programmed to detect the vehicle based on imaging from the second camera, activate the set of light sources, activate the first camera, and enable a presentation of a result formed based on imaging from the first camera and imaging the second camera such that an operator is able to take an action based on the result. The board, the first pair of walls or the second pair of walls may be able to withstand a mass of about 30 tons when a vehicle hosting the undercarriages collides with the board, the first pair of walls or the second pair of walls. The dome may be able to withstand a mass of about 3 tons when a vehicle hosting the undercarriages collides with the dome. The board may not externally host any moving parts. The board may not internally host any moving parts. The camera may image the undercarriage through the dome as the undercarriage is illuminated by the set of light sources when the undercarriage is moving over the first pair of walls and the second pair of walls at a speed of about 15 kilometers per hour or lower where the undercarriage has a ground clearance of about 100 millimeters. The camera may image the undercarriage through the dome as the undercarriage is illuminated by the set of light sources when the undercarriage moves over the first pair of walls and the second pair of walls at a resolution including 18 pixels per centimeter in a center of a field of view with a ground clearance of about 150 mm for a vehicle hosting the undercarriage. The camera may image the undercarriage through the dome as the undercarriage is illuminated by the set of light sources when the undercarriage moves over the first pair of walls and the second pair of walls for an application program (e.g., a distributed application, a local application, a web application, a mobile application) to detect an object hosted by the undercarriage having a size, a shape, a volume, or an area including 25 millimeters by 25 millimeters based on imaging from the camera. The camera may image the undercarriage through the dome as the undercarriage is illuminated by the set of light sources when the undercarriage moves over the first pair of walls and the second pair of walls and the undercarriage has a ground clearance from about 100 millimeters to about 1000 millimeters. The board may host a set of magnetic sensors, which may be even in number (e.g., two, four, six, eight, ten, twelve). The camera may image the undercarriage through the dome as the undercarriage is illuminated by the set of light sources when the undercarriage moves over the first pair of walls and the second pair of walls for an application program to form a composite image of the undercarriage in about three seconds or less and the undercarriage is hosted by a passenger vehicle (e.g., a personal automobile). The board may constitute an alloy, which may include aluminum. The board may be about 40 inches or less in length, about 13 inches or less in width, or about 20 kilograms or less in weight. The board may have an underside that is flat such that the underside is restable on a road facing the underside when the undercarriage moves over the first pair of walls and the second pair of walls and the board is not secured to the road. The board may have an edge portion that is inclined to be co-aligned with at least one of the first pair of walls or the second pair of walls, whether the edge portion is beveled, chamfered, filet, or sharp.

There may be a system having a board hosting a dome, as disclosed herein, where the dome may be heated by a defroster (e.g., a heating element, a wire, a film, a coating)

disposed (e.g., attached, adhered) on (internal or external) or embedded in the dome (similar to a defroster in a rear window of a passenger car), while minimizing interference with imaging, as disclosed herein. For example, the defroster may be sufficiently thin (e.g., less than about 1 millimeter in thickness) to minimize interference with imaging, colored to minimize interference with imaging, extending (e.g., helically, radially) to minimize interference with imaging, or other suitable techniques. The defroster may be heated, similar to a heater, as described above. There may be multiple defrosters, which may be arranged in a pattern, while minimizing interference with imaging. For example, the pattern may be a branching pattern, a parallel pattern, a radial pattern, a serpentine pattern, a helical pattern, a zigzag pattern, a sinusoidal pattern, an arcuate pattern, or any other suitable pattern, which may be positioned to maximize imaging, as disclosed herein. In situations when the defroster may interfere with imaging, as disclosed herein, then there may be an algorithm employed to filter, hide, ignore, or remove at least some imagery depicting the defroster from at least some imagery depicting the undercarriage, to further enable various algorithms, as disclosed herein. For example, at least some imagery depicting or estimated to depict a portion of the undercarriage may be inserted into that imagery that was filtered, hidden, or removed due to the defroster being imaged.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein. As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A system, comprising:
a board hosting a camera, a set of light sources, a dome, a first pair of walls spaced apart from each other, and a second pair of walls spaced apart from each other, wherein the dome encloses the camera, wherein the dome extends between the first pair of walls and the second pair of walls, wherein the camera images an undercarriage through the dome as the undercarriage is illuminated by the set of light sources when the undercarriage moves over the first pair of walls and the second pair of walls, wherein at least one of:
(a) the set of light sources contains a first subset of light sources and a second subset of light sources, wherein the dome extends between the first subset of light sources and the second subset of light sources, wherein each of the first subset of light sources and the second subset of light sources includes an inner group of light sources that oppose each other and illuminate simultaneously, an intermediate group of light sources that oppose each other and illuminate simultaneously, and an outer group of light sources that oppose each other and illuminate simultaneously, wherein each of the first subset of light sources and the second subset of light sources has the intermediate group of light sources positioned between the inner group of light sources and the outer group of light sources, wherein the inner group of light sources, the intermediate group of light sources, and the outer group of light sources illuminate independent of each other, wherein the inner group of light sources, the intermediate group of light sources, and the outer group of light sources illuminate independent of each other according to a first illumination modality or a second illumination modality activated based on an identifier associated with the undercarriage being selected responsive to the undercarriage approaching the board, or
(b) wherein the dome has an external surface, and further comprising: a source of a liquid, a source of a gas, a nozzle assembly positionable to direct the liquid from the source of the liquid and the gas from the source of the gas onto the external surface, such that the camera is capable of imaging the undercarriage through the dome after the liquid is expelled from the external surface or dried on the external surface by the gas, wherein at least one of: (i) and further comprising: a cover extending over the board between the first pair of walls or the second pair of walls, a first tube extending between the cover and the board such that the first tube conducts the liquid towards the nozzle assembly, and a second tube extending between the cover and the board such that the second tube conducts the gas towards the nozzle assembly, or (ii) the nozzle assembly directs the liquid such that the liquid flows off the external surface between one wall of the first pair of walls and one wall of the second pair of walls.

2. The system of claim 1, wherein the first pair of walls is a first monolithic piece assembled with the board, wherein the second pair of walls is a second monolithic piece assembled with the board.

3. The system of claim 1, wherein each wall of the first pair of walls or the second pair of walls has a sloped portion extending from the board towards the dome and a cantilevered portion extending from the sloped portion towards the dome over the board.

4. The system of claim 1, wherein the dome includes a borosilicate glass.

5. The system of claim 1, wherein the dome is detachable from the board without uninstalling the board from a road when the board is installed on the road.

6. The system of claim 1, further comprising:
a magnetic sensor hosted by the board;
a processing unit coupled to the camera, the set of light sources, and the magnetic sensor, wherein the processing unit is programmed to:
  receive a set of images from the camera, wherein the set of images depicts the undercarriage through the dome as illuminated by the set of light sources when the undercarriage moves over the first pair of walls and the second pair of walls;
  stitch the set of images such that a composite image is formed;
  receive a set of readings from the magnetic sensor when the undercarriage moves over the first pair of walls and the second pair of walls;
  form a magnetic field map based on the set of readings; and
  enable the magnetic field map to be superimposed or overlaid over the composite image when the magnetic field map and the composite image are simultaneously presented on an electronic display of a computing terminal associated with the board.

7. The system of claim 6, wherein the magnetic field map depicts a zone with a magnetic field higher than a preset baseline such that the zone is visually distinct relative other zones in the magnetic field map that are at or lower than the preset baseline.

8. The system of claim 1, wherein the dome hosts a defroster.

9. The system of claim 1, wherein the board hosts a set of wells and a set of covers covering the set of wells, wherein each well in the set of wells is frustum-shaped or cone-shaped, wherein the set of wells hosts the set of light sources such that the set of light sources illuminates the undercarriage through the set of covers when the undercarriage moves over the first pair of walls and the second pair of walls.

10. The system of claim 1, wherein the board has a beveled edge portion, a chamfered edge portion, a filet edge portion, or a sharp edge portion having a set of alcoves with a set of bores through which the board is fastened to a road by a set of fasteners when the board is installed on the road.

11. The system of claim 1, (a) wherein the set of light sources contains the first subset of light sources and the second subset of light sources, wherein the dome extends between the first subset of light sources and the second subset of light sources, wherein each of the first subset of light sources and the second subset of light sources includes the inner group of light sources that oppose each other and illuminate simultaneously, the intermediate group of light sources that oppose each other and illuminate simultaneously, and the outer group of light sources that oppose each other and illuminate simultaneously, wherein each of the first subset of light sources and the second subset of light sources has the intermediate group of light sources positioned between the inner group of light sources and the outer group of light sources, wherein the inner group of light sources, the intermediate group of light sources, and the outer group of light sources illuminate independent of each other, wherein the inner group of light sources, the intermediate group of light sources, and the outer group of light sources illuminate independent of each other according to the first illumination modality or the second illumination modality activated based on the identifier associated with the undercarriage being selected responsive to the undercarriage approaching the board.

12. The system of claim 11, wherein each of the inner group of light sources, the intermediate group of light sources, and the outer group of light sources for each of the first subset of light sources and the second subset of light sources is a pair of light sources.

13. The system of claim 11, wherein the identifier is an estimated clearance between the undercarriage and at least one of the board, the camera, at least one light source of the set of light sources, the dome, or a wall of the first pair of walls or the second pair of walls.

14. The system of claim 11, wherein the identifier is a type of a vehicle hosting the undercarriage, a make of a vehicle hosting the undercarriage, or a model of the vehicle.

15. The system of claim 1, wherein the board hosts a heater enclosed by the dome such that the dome is heated when the heater is active.

16. The system of claim 15, further comprising:
a sensor configured to sense a physical phenomenon based on which the heater is activated.

17. The system of claim 15, wherein the heater extends about the camera.

18. The system of claim 1, wherein the board has an edge portion that is inclined to be co-aligned with at least one of the first pair of walls or the second pair of walls.

19. The system of claim 1, further comprising:
a heating mat positioned underneath the board such that the board is heated when the heating mat is active.

20. The system of claim 19, further comprising:
a sensor configured to sense a physical phenomenon based on which the heating mat is activated.

21. The system of claim 1, wherein the board is a first board, and further comprising:
a second board positioned adjacent to the first board such that the first board and the second board collectively enable a speed bump or a speed hump.

22. The system of claim 1, (b) wherein the dome has the external surface, and further comprising: the source of a liquid; the source of a gas; and the nozzle assembly positionable to direct the liquid from the source of the liquid and the gas from the source of the gas onto the external surface, such that the camera is capable of imaging the undercarriage through the dome after the liquid is expelled from the external surface or dried on the external surface by the gas, wherein at least one of: (i) and further comprising: the cover extending over the board between the first pair of walls or the second pair of walls, the first tube extending between the cover and the board such that the first tube conducts the liquid towards the nozzle assembly, and the second tube extending between the cover and the board such that the second tube conducts the gas towards the nozzle assembly, or (ii) the nozzle assembly directs the liquid such that the liquid flows off the external surface between one wall of the first pair of walls and one wall of the second pair of walls.

23. The system of claim 22, wherein the nozzle assembly directs the liquid or the gas in a direction along a horizontal plane toward the undercarriage when the undercarriage approaches the board in a forward direction.

24. The system of claim 22, wherein the nozzle assembly extends between the first pair of walls or the second pair of walls.

25. The system of claim 22, (i) and further comprising: the cover extending over the board between the first pair of walls or the second pair of walls; the first tube extending between the cover and the board, wherein the first tube conducts the liquid towards the nozzle assembly; and the second tube extending between the cover and the board, wherein the second tube conducts the gas towards the nozzle assembly.

26. The system of claim 25, wherein the nozzle assembly directs the liquid such that the liquid flows off the external surface between the second pair of walls when the cover extends between the first pair of walls or between the first pair of walls when the cover extends between the second pair of walls.

27. The system of claim 22, (ii) wherein the nozzle assembly directs the liquid such that the liquid flows off the external surface between one wall of the first pair of walls and one wall of the second pair of walls.

28. The system of claim 22, wherein the nozzle assembly outputs the liquid or the gas based on (a) a schedule, (b) a user input into a computing terminal associated with the board, (c) a sensor sensing an ambient environmental condition, or (d) a detection of a vehicle hosting the undercarriage moving towards the board in a forward direction during a snow condition or a rain condition before the undercarriage moves over the first pair of walls and the second pair of walls.

29. The system of claim 22, wherein the nozzle assembly has an arcuate shape when viewed frontally or configured to direct the liquid or the gas in an arcuate pattern onto the external surface, thereby enabling the external surface to be at least partially cleaned.

30. The system of claim 1, wherein the board has an underside that is flat such that the underside is restable on a road facing the underside when the undercarriage moves over the first pair of walls and the second pair of walls, and further comprising:
   an adhesive adherable to the underside and the road such that the adhesive adheres the board to the road when the undercarriage moves over the first pair of walls and the second pair of walls.

* * * * *